United States Patent
Madanapalli et al.

(10) Patent No.: US 11,888,920 B2
(45) Date of Patent: Jan. 30, 2024

(54) PROCESS AND APPARATUS FOR ESTIMATING REAL-TIME QUALITY OF EXPERIENCE

(71) Applicant: Canopus Networks Pty Ltd, Eveleigh (AU)

(72) Inventors: Sharat Chandra Madanapalli, Eveleigh (AU); Hassan Habibi Gharakheili, Eveleigh (AU); Vijay Sivaraman, Eveleigh (AU)

(73) Assignee: Canopus Networks Pty Ltd, Eveleigh (AU)

( * ) Notice: Subject to any disclaimer, the term of this patent is extended or adjusted under 35 U.S.C. 154(b) by 0 days.

(21) Appl. No.: 17/611,529

(22) PCT Filed: May 15, 2020

(86) PCT No.: PCT/AU2020/050483
§ 371 (c)(1),
(2) Date: Nov. 15, 2021

(87) PCT Pub. No.: WO2020/227781
PCT Pub. Date: Nov. 19, 2020

(65) Prior Publication Data
US 2022/0239720 A1  Jul. 28, 2022

(30) Foreign Application Priority Data
May 16, 2019  (AU) .................. 2019901667

(51) Int. Cl.
*H04L 65/80* (2022.01)
*H04L 65/61* (2022.01)
(Continued)

(52) U.S. Cl.
CPC .......... *H04L 65/80* (2013.01); *H04L 41/5067* (2013.01); *H04L 43/0876* (2013.01); *H04L 65/61* (2022.05)

(58) Field of Classification Search
CPC ..... H04L 65/80; H04L 65/61; H04L 41/5067; H04L 43/0876
See application file for complete search history.

(56) References Cited

U.S. PATENT DOCUMENTS

2013/0148525 A1  6/2013  Cuadra Sanchez et al.
2017/0019454 A1  1/2017  Almohamedh
(Continued)

OTHER PUBLICATIONS

International Preliminary Report on Patentability (IPRP) for PCT/AU2020/050483, dated Mar. 30, 2021, in 5 pages.
(Continued)

*Primary Examiner* — Suraj M Joshi
(74) *Attorney, Agent, or Firm* — Knobbe Martens Olson & Bear LLP

(57) ABSTRACT

Disclosed are a process and apparatus for classifying video streams of an online streaming media service in real-time. The process includes processing data packets representing one or more video streams between a service provider and a user access network, generating flow activity data from the packets representing quantitative metrics of network transport activity, and applying a trained classifier to the flow activity data to classify each of the video streams as either a live video stream or a video-on-demand (VoD) stream.

23 Claims, 34 Drawing Sheets

(51) Int. Cl.
*H04L 41/5067* (2022.01)
*H04L 43/0876* (2022.01)

(56) References Cited

U.S. PATENT DOCUMENTS

| 2017/0093648 | A1* | 3/2017 | ElArabawy ......... H04L 43/0817 |
| 2018/0131593 | A1 | 5/2018 | Jain et al. |
| 2019/0037270 | A1 | 1/2019 | Arpirez Vega et al. |
| 2020/0099981 | A1* | 3/2020 | Zhang .................. H04N 21/647 |

OTHER PUBLICATIONS

Supplementary European Search Report received in Application EP 20805017 dated Dec. 12, 2022 in 15 pages.
Nossenson et al., "On-line flows classification of Video Streaming Applications" 2015 IEEE, 14th International Symposium on Network Computing and Applications.

* cited by examiner

PROCESS AND APPARATUS FOR ESTIMATING REAL-TIME QUALITY OF EXPERIENCE

TECHNICAL FIELD

The present invention relates to computer networking, and in particular to an apparatus and process for estimating, in real-time and at the network level, quality of experience (QoE) of online services that are sensitive to network congestion, such as online gaming and streaming media.

BACKGROUND

User-perceived quality of experience (commonly abbreviated by those skilled in the art as "QoE") of an online service is of paramount importance in broadband and cellular networks, be it for video streaming, teleconferencing, gaming, or web-browsing.

For example, streaming video continues to grow, accounting for about 58% of downstream traffic on the Internet. Further, Netflix is the top web service used in the Americas, and is in the top-10 in every region of the world, generating 15% of global Internet traffic to serve over 148 million subscribers world-wide. With this kind of reach and scale, it is no wonder that Internet Service Providers (ISPs) are keen to ensure that their subscribers experience good Netflix streaming quality over their broadband networks, so they can better retain existing customers and attract new ones.

However, ISPs are operating blind on streaming media user experience. Netflix, the world's largest streaming video provider, publishes a per-country monthly ranking of ISPs by prime-time Netflix speeds, but this is of limited value to ISPs since: (a) it is averaged across (a potentially large) user-base and does not give information on specific subscribers or streams; (b) it is retrospective and therefore cannot be addressed by immediate action; and (c) it is at best an indicator of video resolution (bit-rate), with no insights into the variation of quality during playback, or video start-up delays, factors that are central to user experience. With such limited knowledge, the only blunt instrument available to ISPs to improve user experience is to increase network capacity, which can be not only prohibitively expensive, but also its efficacy is difficult to measure and so it is difficult to justify the investment.

In addition to Video-on-Demand (VoD) streaming such as Netflix, live video streaming consumption grew by 65% from 2017 to 2018, and is expected to become a $70 billion industry by 2021. The term "live video" refers to video content that is simultaneously recorded and broadcast in real-time. Social media sites like Facebook since 2016 allow any user or company to broadcast live videos to their audience, and are being used to stream launch events, music concerts, and (unfortunately) even terror crimes. YouTube since 2017 allows the larger public to do live streaming, and is widely used for concerts, sporting events, and video games. Twitch (acquired by Amazon) and Mixer (acquired by Microsoft) are fast becoming highly popular platforms for streaming video games from individual gamers as well as from tournaments. Indeed, viewers of eSport are expected to rise to 557 million by 2021, and eSport tournament viewers already outnumber viewers of traditional sport tournaments such as the SuperBowl. ISPs, who largely failed to monetize video-on-demand (VoD) offerings from over-the-top (OTT) content providers, are keenly trying to make money from live video streaming by acquiring rights to stream sporting events (traditional sports like soccer and rugby, as well as eSports like League-of-Legends and Fortnite). ISPs therefore have strong incentives to monitor quality of experience (QoE) for live video streaming over their networks, and where necessary enhance QoE for their subscribers by applying policies to prioritize live streams over other less latency-sensitive traffic (including VoD).

Ensuring good QoE for live video streams is challenging, since clients per-force have small playback buffers (a few seconds at most) to maintain a low latency as the content is being consumed while it is being produced. Even short time-scale network congestion can cause buffer underflow leading to a video stall, causing user frustration. Indeed, consumers tolerance is much lower for live than for on-demand video, since they may be paying specifically to watch that event as it happens, and might additionally be missing the moments of climax that their social circle is enjoying and commenting on. In discussions with the inventors, one ISP has corroborated with anecdotal evidence that consumers do indeed complain most vociferously following a poor experience on live video streams.

However, network operators are unable to distinguish live streaming flows in their networks, let alone know the QoE associated with them. Content providers such as YouTube and Facebook use the same delivery infrastructure for live streaming as for on-demand video, making it difficult for deep packet inspection (DPI) techniques to distinguish between them. Indeed, most commercial DPI appliances use the DNS queries and/or SNI certificates to classify traffic streams, but these turn out to be the same for live and on-demand video (at least for Facebook and Youtube today), making them indistinguishable.

More generally, the best-effort delivery model of the Internet makes it challenging for service/content providers to maintain the quality of user experience, requiring them to implement complex methods such as buffering, rate adaptation, dynamic Content Delivery Network (CDN) selection, and error-correction to combat unpredictable network conditions. Network operators, also eager to provide better user experience over their congested networks, often employ middle-boxes to classify network traffic and apply prioritization policies. However, these policies tend to be static and applied on a per-traffic-class basis, with the benefits to individual services being unclear, while also potentially being wasteful in resources.

In view of the above, there is a general need for ISPs to be able to assess the quality of experience of online services, and where appropriate to be able to take steps to improve the quality of experience.

It is desired, therefore, to alleviate one or more difficulties of the prior art, or to at least provide a useful alternative.

SUMMARY

In accordance with some embodiments of the present invention, there is provided a computer-implemented process for estimating quality of experience (QoE) of an online streaming media or gaming service that is sensitive to network congestion in real-time, the process being for use by a network operator, and including:

processing packets of one or more network flows of the online service at a network location between a provider of the service and a user access network to generate flow activity data representing quantitative metrics of real-time network transport activity of each of the one or more network flows of the online service; and applying a trained classifier to the flow activity data to generate corresponding user experience data representing real-time quality of experience of the online service.

In some embodiments, the user experience data represents a corresponding quality of experience state selected from a plurality of quality of experience states.

In some embodiments, the plurality of experience states include a maximum bitrate playback state, a varying bitrate playback state, a depleting buffer state, and a playback stall state. In some embodiments, the plurality of quality of experience states include a server disconnection state and a restart state.

In some embodiments, the user experience data represents one or more quantitative metrics of quality of experience.

In some embodiments, the online service is a streaming media service, and the one or more quantitative metrics of quality of experience include quantitative metrics of buffer fill time, bitrate and throughput.

In some embodiments, the online service is a gaming service, and the one or more quantitative metrics of quality of experience include a quantitative metric of latency and/or responsiveness to user interaction.

In some embodiments, the online service is a Video-on-Demand (VoD) streaming media service (e.g., Netflix™).

In some embodiments, the online service provides live video streaming, and the one or more quantitative metrics of quality of experience include quantitative metrics of resolution and buffer depletion for live video streaming.

In some embodiments, the step of applying a trained classifier to the flow activity data includes applying the trained classifier to a time series of request packet counter values for the online service to determine whether the request packet counter values are indicative of live video streaming, and if so, then applying further classifiers to chunk features of the live video stream to generate corresponding user experience data representing real-time quality of experience of the online service.

The online service may be a Twitch™, Facebook™ Live, or YouTube™ Live, live streaming service.

In some embodiments, the process includes, in dependence on the user experience data, automatically reconfiguring a networking component to improve quality of experience of the online service by prioritising one or more network flows of the online service over other network flows.

In some embodiments, the process includes training the classifier by processing packets of one or more training network flows of the online service to generate training flow activity data and chunk metadata (for videos) representing quantitative metrics of network transport activity of each of the one or more training network flows of the online service; generating corresponding training user experience data representing corresponding temporal quality of user experience of the online service; and applying machine learning to the generated training flow activity data and the generated training user experience data to generate a corresponding model for the classifier based on correlations between the quantitative metrics of network transport activity and the temporal quality of user experience of the online service.

In accordance with some embodiments of the present invention, there is provided an apparatus for estimating, in real-time, quality of experience (QoE) of an online streaming media or gaming service that is sensitive to network congestion, the apparatus being for use by a network operator, and including:

a flow quantifier configured to process packets of one or more network flows of the online service at a network location between a provider of the service and a user access network to generate flow activity data representing quantitative metrics of real-time network transport activity of each of the one or more network flows of the online service; and a trained classifier configured to process the flow activity data and generate corresponding user experience data representing real-time quality of experience (QoE) of the online service.

In some embodiments, the user experience data represents a corresponding quality of experience state selected from a plurality of quality of experience states. In some embodiments, the plurality of experience states include a maximum bitrate playback state, a varying bitrate playback state, a depleting buffer state, and a playback stall state. In some embodiments, the plurality of quality of experience states include a server disconnection state and a restart state.

In some embodiments, the user experience data represents one or more quantitative metrics of quality of experience In some embodiments, the online service is a streaming media service, and the one or more quantitative metrics of quality of experience include quantitative metrics of buffer fill time, bitrate and throughput.

In some embodiments, the online service is a gaming service, and the one or more quantitative metrics of quality of experience include a quantitative metric of latency and/or responsiveness to user interaction.

In some embodiments, the online service is a Video-on-Demand (VoD) streaming media service (e.g., Netflix™).

In some embodiments, the online service provides live video streaming, and the one or more quantitative metrics of quality of experience include quantitative metrics of resolution and buffer depletion for live video streaming.

In some embodiments, the apparatus includes further classifiers; wherein the trained classifier is configured to process a time series of request packet counter values for the online service to determine whether the request packet counter values are indicative of live video streaming, and the further classifiers are configured to process chunk features of the corresponding live video stream to generate corresponding user experience data representing real-time quality of experience of the online service.

In some embodiments, the online service is a Twitch™, Facebook™ Live, or YouTube™ Live, live streaming service.

In some embodiments, the apparatus includes a user experience controller configured to, in dependence on the user experience data, automatically reconfigure a networking component to improve quality of experience of the online service by prioritising one or more network flows of the online service over other network flows.

In accordance with some embodiments of the present invention, there is provided at least one computer-readable storage medium having stored thereon processor-executable instructions that, when executed by at least one processor, cause the at least one processor to execute any one of the above processes.

In accordance with some embodiments of the present invention, there is provided an apparatus for estimating, in real-time, quality of experience (QoE) of an online streaming media or gaming service that is sensitive to network congestion, the apparatus being for use by a network operator, and including a memory and at least one processor configured to execute any one of the above processes.

Also described herein is a computer-implemented process for determining whether network flows of an online service represent live video streaming, the process being for use by a network operator, and including:

processing packets of one or more network flows of an online service at a network location between a provider of the service and a user access network to generate a time series of request packet counter values for the online service; and applying a trained classifier to the time series of request packet counter values for the online service to determine whether the request packet counter values are indicative of live video streaming.

BRIEF DESCRIPTION OF THE DRAWINGS

Some embodiments of the present invention are hereinafter described, by way of example only, with reference to the accompanying drawings, wherein:

FIG. 17 is a graph comparing QoE buffer health and bitrate as a function of time during Netflix™ streaming, illustrating quality degradation due to congestion (client behavior of Video1);

FIG. 18 is a graph of QoE buffer health and bitrate as a function of time during Netflix™ streaming, illustrating quality being maintained even with congestion (client behavior of Video2);

FIG. 19 is a graph comparing QoE throughput and the number of flows as a function of time during Netflix™ streaming, illustrating quality degradation due to congestion (client behavior of Video1);

FIG. 20 is a graph comparing QoE throughput and the number of flows as a function of time during Netflix™ streaming, illustrating quality being maintained even with congestion (network activity of Video2);

DETAILED DESCRIPTION

Figure 1:
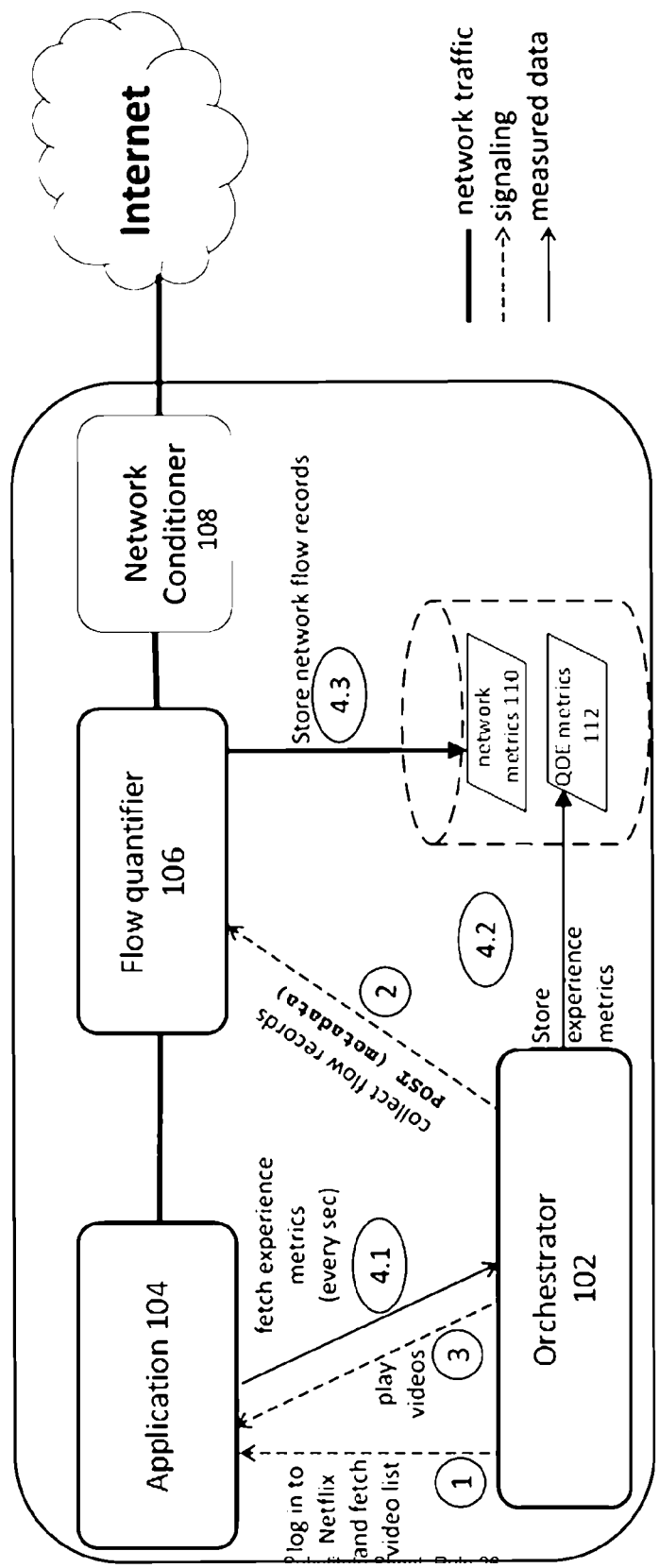
FIG. 1 is a block diagram of a training apparatus of an apparatus for estimating quality of experience (QoE) of an online service in accordance with an embodiment of the present invention.

In order to address the difficulties described above, embodiments of the present invention include an apparatus and process for estimating quality of experience (QoE) of an online service that is sensitive to network congestion. Examples of such services are well known to those skilled in the art, and include online gaming, teleconferencing, virtual reality, media streaming and web browsing, for example. The phrase "quality of experience" (QoE) is a term of art that refers to user-perceived quality of experience in so far as it relates to the user's experience of the temporal qualities of the service that is sensitive to network congestion. Accordingly, the QoE estimates are generated by measuring, at a network operator level, real-time network transport activity of network flows of the service, and using a trained classifier to map those network measurements to estimates of real-time user quality of experience, which would not otherwise be available at the network operator level.

It is important to appreciate that the apparatus and process described herein are operated by a network operator (e.g., by an Internet Service Provider (ISP) or by a content distribution network operator) and that the measurements of network activity are made at a network location between a provider of the service and a user access network (e.g., between the content distribution network (CDN) and the ISP's access gateway) and not, for example, by an end-user at a network end point (e.g., in a subscriber's home or office). This is significant because while QoE metrics may be available to individual subscribers, until the development of the invention described herein, they were not available upstream of the access network (e.g., at the ISP level), where broadband or cellular network congestion can be addressed.

The classifier is trained by applying machine learning to determine correlations between previously measured quantitative metrics of network transport activity of individual network flows of the service (which can be determined at the ISP level), and corresponding measures of user experience. The latter can be quantitative user experience metrics such as latency, buffer fill time, bitrate and throughput, or can be qualitative classifications or states of QoE such as good, bad, and intermediate. Of course, the quantitative metrics can be similarly correlated with (and/or mapped to or from) the qualitative measures.

In some embodiments, when the estimated user experience is considered unacceptable, then the apparatus and process automatically modifies, in real-time, network transport behaviour in order to improve the quality of experience for the corresponding service. The described apparatus can thus be considered to implement a self-driving network that addresses the difficulties described above through a combination of continuous network measurement, automated inferencing of application performance, and programmatic control to protect quality of experience.

Inferring Netflix Quality of Experience

An embodiment of the present invention will now be described, by way of example only, in the context of inferring or estimating real-time quality of experience (QoE) for the Netflix™ video streaming service over a broadband network using the Netflix™ web browser application. However, it will be apparent to those skilled in the art that the described apparatus and the processes that it executes can be readily adapted to estimate QoE for other online services.

As described above, embodiments of the present invention rely on machine learning, and for each online service whose QoE is to be estimated, it is first necessary to generate a corresponding model during a training phase, using a training apparatus such as that shown in FIG. 1, for example.

The training apparatus executes a training process that generates network flow activity data for each service of interest, and corresponding QoE data representing corresponding real-time metrics or measurements of user quality of experience for each service. This enables the network operator to train classifiers that can infer service QoE without requiring any explicit signals from either the service provider or the client application used to access the service (which for some services will be a standard web browser executing client application code for the corresponding service).

In the described embodiment, the high-level architecture of the training apparatus for generating this service dataset is shown in FIG. 1. It consists of three main components, namely an "Orchestrator" component 102, a service player or application 104, and a flow quantifier component 106. The flow quantifier (also referred to herein as the "Flow-Fetch" module) 106 generates flow activity data representing quantitative metrics of network transport activity of the network flows of the service. The orchestrator 102 performs two tasks: (a) it initiates and runs an instance of the service application 104 and keeps track of its behavioural state, and (b) signals the flow quantifier component 106 to record the corresponding network activities (e.g., a time-trace of flow counters or a time-trace of chunk-related metadata). An optional network conditioner component 108 can be used to impose (synthetic) network conditions such as limited bandwidth or extra delays to capture responsive behaviours of the service.

In the described embodiments, the apparatuses described herein are in the form of one or more networked computing systems, each having a memory, at least one processor, and at least one computer-readable non-volatile storage medium (e.g., solid state drive), and the processes described herein are implemented in the form of processor-executable instructions stored on the at least one computer-readable storage medium. However, it will be apparent to those skilled in the art that the processes described herein can alternatively be implemented, either in their entirety or in part, in one or more other forms such as configuration data of a field-programmable gate array (FPGA), and/or one or more dedicated hardware components such as application-specific integrated circuits (ASICs).

In the described embodiments, each of the main components 102, 104, 106 is packaged into a separate docker container, the service player/application 104 is a selenium browser instance, and the optional network conditioner 108 uses the tc linux tool to shape network traffic by synthetically changing network conditions in software. Containerizing the major components 102, 104, 106 eases deployment of the apparatus. A shared virtual network interface among the containers also ensures that packets flowing through the flow quantifier component 106 originate solely from the browser 104, eliminating other traffic on the machine where the flow quantifier component 106 runs.

The flow quantifier 106 is written in the Go open source programming language, and records flow-level network activity by capturing packets from a network interface. A flow is a transport-level TCP connection or UDP stream identified by a unique 5-tuple consisting of source IP, source port, destination IP, destination port and protocol. For a TCP/UDP flow, the flow quantifier 106 records (at a configurable granularity) network flow metrics in the form of cumulative byte and packet counts (these being more practical and storage-friendly than packet traces) into a network metrics data file 110 as comma separated values (CSV). For each flow, the flow quantifier 106 also identifies chunks of data being transferred, and stores metrics associated with each identified chunk of the flow, as described below. The flow quantifier 106 is also able to filter flows of interest using DNS queries specific to certain providers (e.g., Netflix). In the described embodiment, the flow quantifier 106 is configured to log flow records every 100 ms, and a DNS-based filter is employed to isolate network activity of flows from nflxvideo.net, being the primary domain responsible for delivery of Netflix video content.

Chunk Detection and Related Metadata Collection

It is well known in the literature that video streaming applications transfer media content (both video and audio) in a chunked fashion. Specifically, the Netflix™ browser video client 104 requests chunks of media (about 2-10 sec long) from the Netflix™ server sequentially, using multiple flows. Among the packets going from the client 104 to the server, the packets corresponding to the media requests are larger than other packets, the latter mostly being small acknowledgement packets. The FlowFetch tool 106 can identify such request packets using a packet length threshold ("PLT"), wherein a packet is tagged as a request packet if its packet.size>PLT. Immediately upon detecting a request packet, FlowFetch 106 sums the byte count and packet count of all the packets in the downstream direction (server to client 104) forming a chunk. For each chunk, the FlowFetch tool 106 extracts the following features: requestTime (i.e., the timestamp of the request packet), requestPacketLength, chunkStartTime and chunkEndTime (i.e., the timestamps of the first and the last downstream packets following the request (subtracting these two timestamps gives chunkDownloadTime)), and lastly chunkPackets and chunkBytes (i.e., the total count and volume of downstream packets corresponding to the chunk being fetched from the video server). These attributes form the chunk metadata which are later input to the machine learning based classification models.

The orchestrator 102 uses the Selenium client library in Python to interact with a remote Selenium browser instance (i.e., acting as a server to the Selenium client) for loading and playing Netflix videos. At the beginning of each measurement session, a browser instance (Firefox or Chrome) is spawned with no cache or cookies saved, and which loads the Netflix web-page and logs in to a user account by entering the user's credentials (shown by step ① in FIG. 1). The apparatus can operate in either of two ways to generate a video list: (a) from a fixed set of Netflix videos specified in a configuration file, or (b) by fetching the URLs of the (regularly updated) recommended videos on the Netflix homepage. Given the list, the apparatus plays the videos in the list sequentially. Prior to the playback of each video, the orchestrator 102 signals the flow quantifier 106 to start measuring network activity (shown by step ② in FIG. 1). Then, the orchestrator 102 signals the browser 104 to load the video and collects playback metrics (shown by steps ③ and 4.1 respectively in FIG. 1)—the Netflix player application offers a series of hidden menus that provide real-time streaming quality metrics, and can be used to diagnose any potential issues. The real-time metrics (which are refreshed every second) for audio and video media include the buffering/playing bitrates, buffer health (in seconds and bytes), and the CDN from which the stream is sourced. Additionally, the position and duration of playback, frame statistics (e.g., frame rate and frame drops), and throughput are also provided.

The orchestrator 102 stores these client playback metrics (every second) in CSV format into a corresponding QoE metrics file 112 (step 4.2) stored on a shared volume accessible from the orchestrator 102 and flow quantifier 106 docker containers. Simultaneously, the flow quantifier 106 stores the network activity (byte and packet counts measured every 100 ms) into the (co-located) network metrics file 110 (at step 4.3) when the total volume of a TCP/UDP flow exceeds a configurable export threshold (e.g., 2 MB) since the last export.

Figure 2:
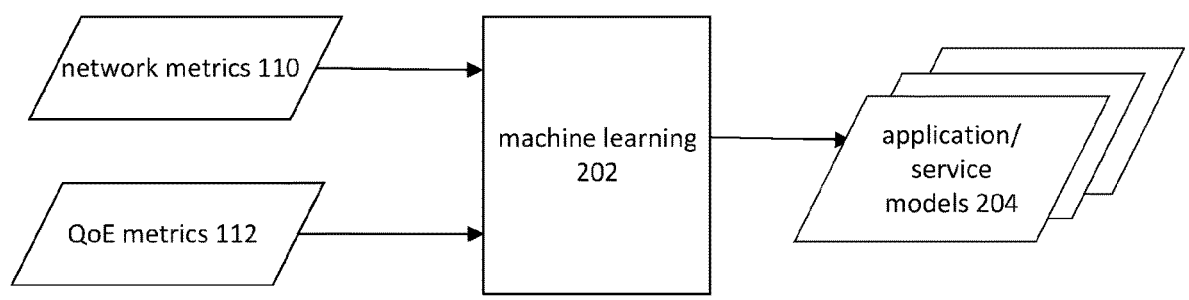
FIG. 2 is a block diagram illustrating the use of machine learning to generate application/service models from metrics of network flows and metrics of QoE generated by the apparatus of FIG. 1.
Figure 3:
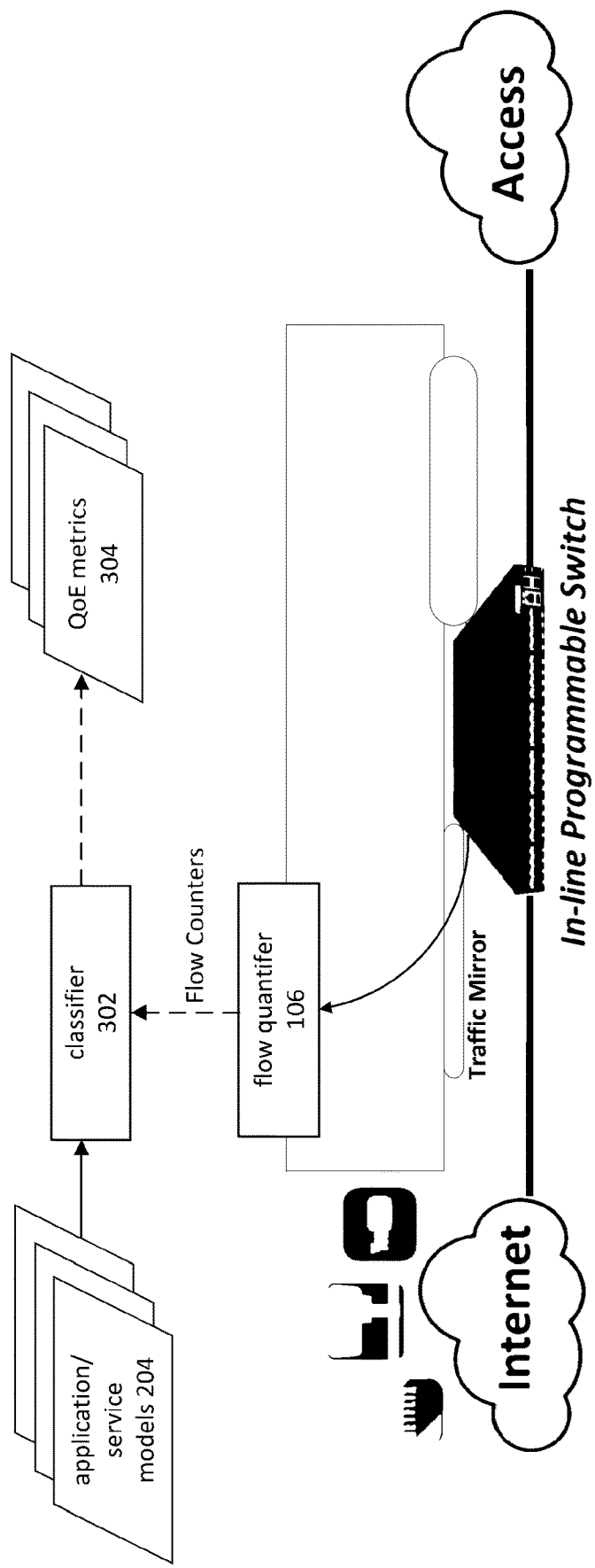
FIG. 3 is a block diagram of an apparatus for estimating quality of experience (QoE) of a user application from the application/service models of FIG. 2.

As described in detail below, and as shown in FIG. 2, the network metrics 110 and corresponding QoE metrics 112 are subsequently processed by a machine learning (ML) component 202 to generate a corresponding application/service model 204 for each application/service. After these models 204 have been generated, they can be used with a classifier component 302, as shown in FIG. 3, to define respective trained classifiers 302 that automatically generate QoE metrics 304 in real-time, these being corresponding real-time estimates for user Quality of Experience of the corresponding streaming service/application. These real-time estimates allow an ISP to accurately assess the real-time user experience of each online application/service (such as the Netflix™ application in this specific embodiment).

To demonstrate the performance of the described apparatus, the run-time apparatus of FIG. 3 was deployed both in the inventors' university lab and in the home networks of nine members of the inventors' research group. For the home networks, the apparatus was deployed without the network conditioning module 108, and was used to play both a fixed set and a recommended set of Netflix™ videos. In the lab setting, given the high bandwidth available in the university campus network, the network conditioner was used to synthetically impose bandwidth limits ranging from 500 Kbps to 100 Mbps.

It should be noted that although the complete training apparatus of FIG. 1 is needed to generate the machine learning models in the training phase, subsequently in the field, network operators, such as an ISP for example, need only deploy the flow quantifier 106 component to obtain real-time in-network measurements, and then use one or more classifiers 302 with the generated respective model(s) 204 to derive corresponding QoE metrics 304 from the network measurements 110, as shown in FIG. 3.

Dataset

A total of 8077 data instances for Netflix video streams was collected, as summarised in Table 1 below. Each instance consists of the corresponding pair of network metrics and QoE metrics files 110, 112 (i.e., one for network activity and one for corresponding client playback behaviour). For households, the data includes profiles for 1720 streams of 787 unique recommend titles and 919 streams of 11 unique titles from a fixed list. Each video stream in the household datasets played for a duration of 5 minutes, and the corresponding network activity was measured every 100 ms. The lab data is larger, with 5408 streams of recommended video titles along with 30 streams from the fixed list of video titles. Note that the lab data of recommended titles were collected for a duration of 2 minutes with a resolution of 500 ms—this was the first set of data collected prior to the household measurements for which both duration and resolution were increased.

TABLE 1

Summary of instances in the dataset.

| | List | # streams | # titles | Stream dur. | Data resol. |
|---|---|---|---|---|---|
| Households | Rec. | 1720 | 787 | 5-min | 100 ms |
| | Fix. | 919 | 11 | 5-min | 100 ms |
| Lab | Rec. | 5408 | 1842 | 2-min | 500 ms |
| | Fix. | 30 | 10 | 5-min | 100 ms |

The two CSV files 110, 112 corresponding to each instance of a video stream were named: (a) "flows.csv" (i.e., network activity) 110, and (b) "netflixstats.csv" (i.e., client playback metrics) 112. Each record of flows.csv 110 represents the measurements (at a temporal resolution of 100 ms or 500 ms) of individual TCP flows associated with a Netflix video stream, and consists of the fields timestampExport, timestampFlowMeasure, flowID, flow 5-tuple, and the threshold of flow volume at which the flow quantifier 106 exports fine-grained flow profile measurements: cumulative volume (Bytes), cumulative packetCount, and duration (ms). Each record of the netflixstats.csv file 112 represents the corresponding real-time measurements (i.e., one row per second) of all client playback metrics provided by the Netflix player, including: timestamp, movieID, CDNaudio, CDNvideo, playback position (seconds), movie duration (seconds), playing-bitrate-audio/video (kbps), buffering-bitrate-audio/video (kbps), buffer-size-bytes-audio/video, buffer-size-seconds-audio/video, and throughput (Kbps).

The flow quantifier 106 also generates a third type of output file ("videochunks.csv") containing timeseries data corresponding to the chunks being downloaded. Specifically, each row of this file contains chunk metadata (with the attributes described above) of each chunk downloaded by the client during the playback session.

Netflix Streaming: Analysis and Insights

A. Profile of a Typical Netflix Stream

Figure 4:
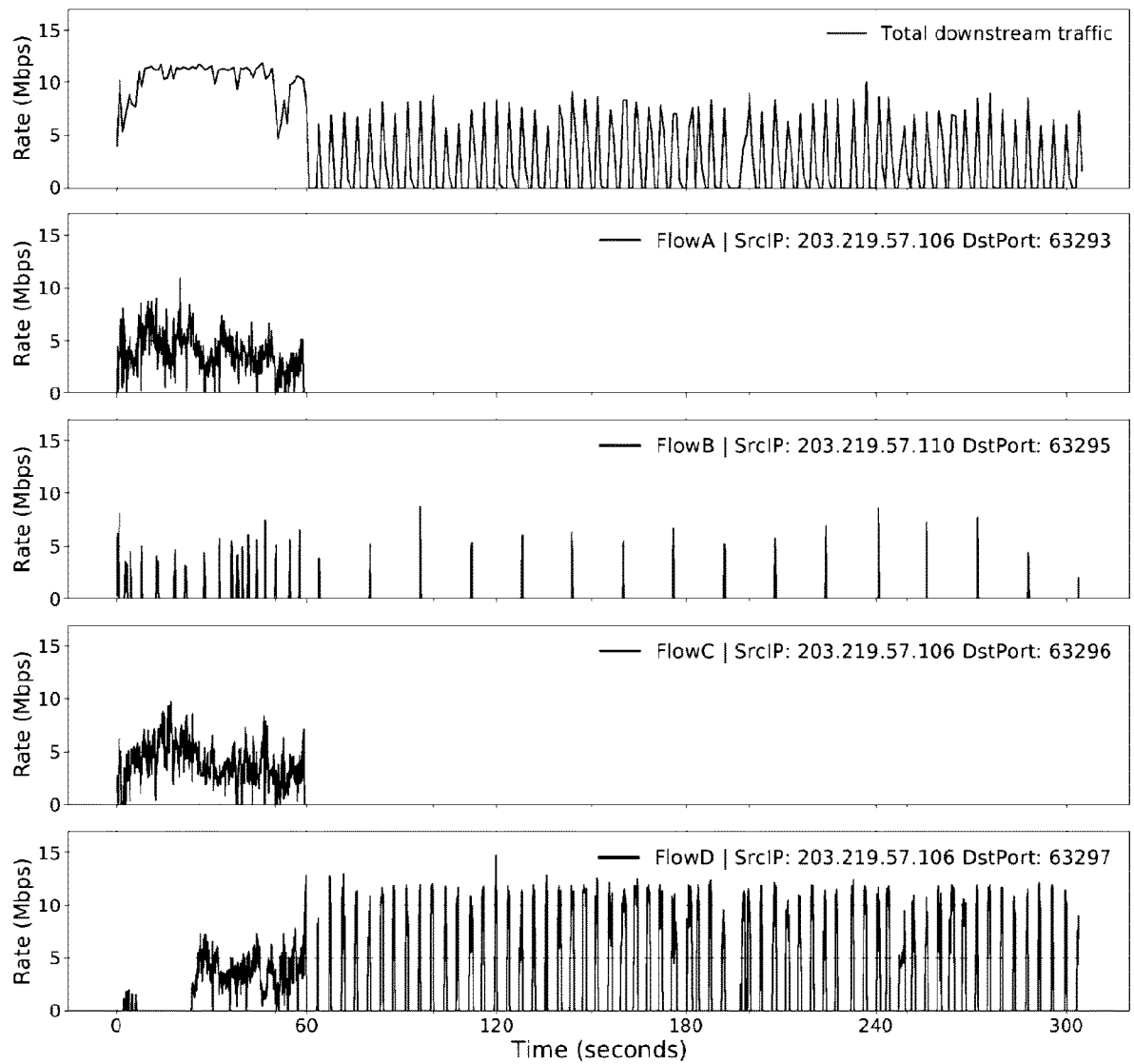
FIG. 4 is a set of four graphs of flow rates as a function of time for a typical Netflix video streaming session.

FIG. 4 is a set of four graphs of respective time-traces of network activity measured for a representative Netflix video stream played for 5 minutes with no interruption. The top graph shows the total downstream traffic profile for this stream, and the four graphs below show downstream traffic profile of each TCP flow associated with this stream. It is apparent that the Netflix client established four parallel TCP flows to start the video, three of them come from Netflix server 203.219.57.106, and one from 203.219.57.110. All four TCP flows actively transferred content for the first 60 seconds. Thereafter, two flows (A,C) became inactive (i.e., idle) for a minute before being terminated by the client (i.e., TCP FIN). It is seen that the remaining two active flows (B,D) changed their pattern of activity—FlowB has small spikes occurring every 16 seconds and flowD has large spikes occurring every 4 seconds.

Figure 5:
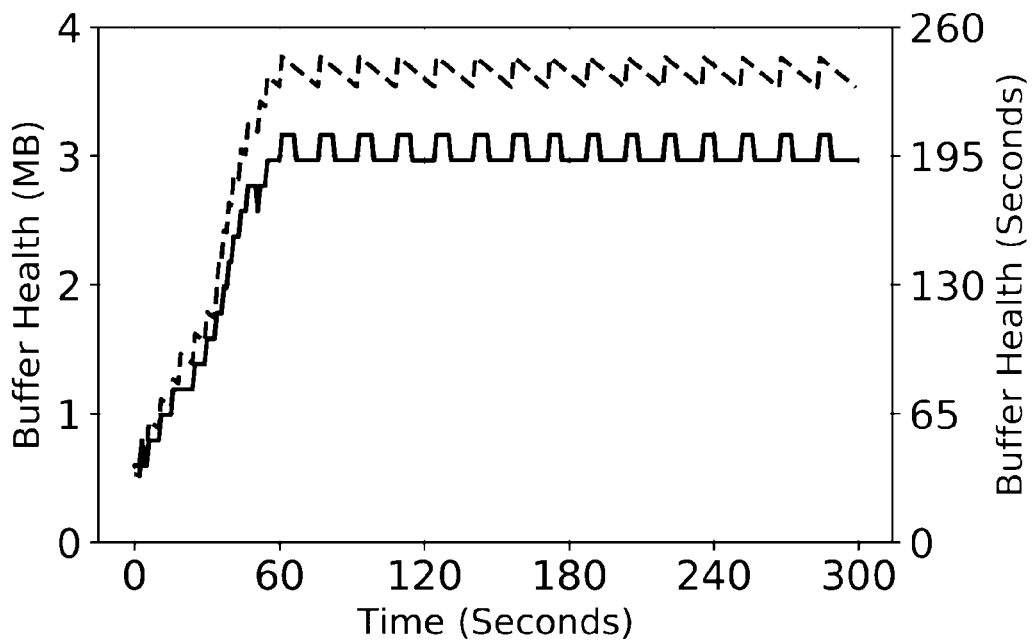
FIGS. 5 to 7 are respective graphs of QoE metrics generated by the Netflix streaming client application, specifically: audio buffer health, video buffer health, and throughput/buffering-bitrate of video, respectively.
Figure 6:
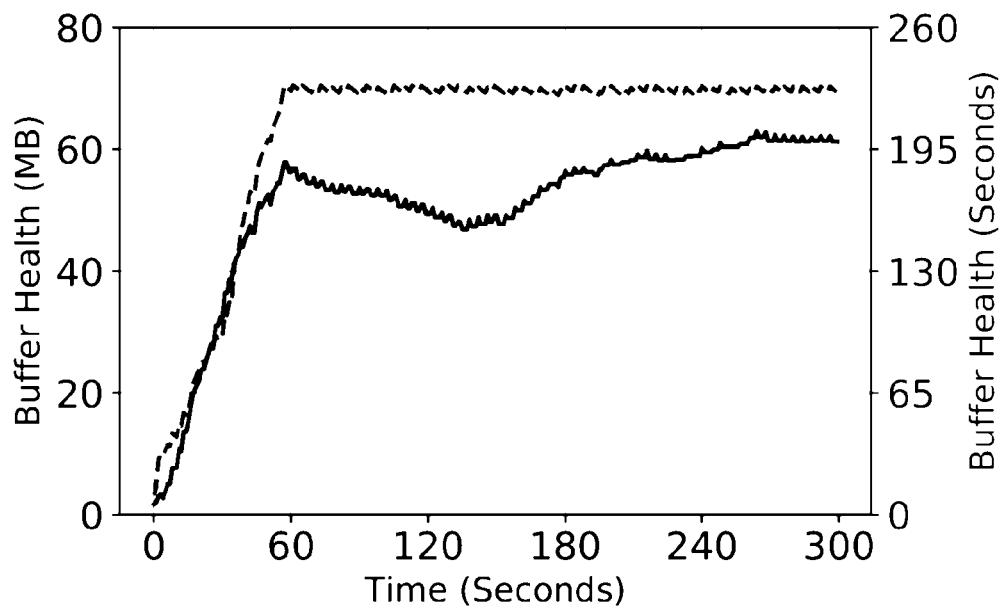

Corresponding QoE metrics offered by the Netflix client application for the same video stream are shown in FIG. 5. FIGS. 5 and 6 show the buffer health of audio and video, respectively, in terms of: (a) volume in bytes (shown by solid blue lines and left y-axis) and (b) duration in seconds (shown by dashed red lines and right y-axis). The buffer health in seconds for both audio and video ramps up during the first 60 seconds of playback, until it reaches a saturation level at 240 seconds of buffered content—thereafter, this level is consistently maintained by periodic filling. Note that the audio and video buffers are replenished every 16 and 4 seconds respectively, suggesting a direct contribution from the periodic spikes in network activity (observed in FlowB and FlowD).

Figure 7:
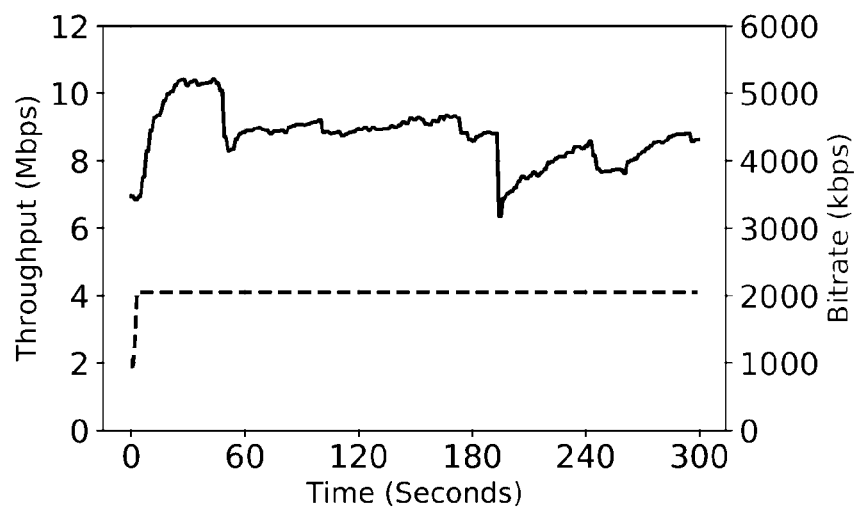

The Netflix client interface also reports a metric referred to as "throughput", and which is an estimate of the bandwidth available for the video stream. FIG. 3(c) shows the throughput (in Mbps, solid blue lines, on the left y-axis) and the buffering-bitrate of video (in Kbps, dashed red lines, on the right y-axis). The video starts at a low-quality bitrate of 950 Kbps, switches to a higher bitrate of 1330 Kbps after 2 seconds, and jumps to its highest bitrate of 2050 Kbps after another second. Note that it stays at this highest bitrate for the remainder of video playback, even though far more bandwidth is available. Additionally, FIG. 3(b) shows that the video buffer health in volume is variable, while the buffer in seconds and the buffering bitrate are both constant. This is due to variable bitrate encoding used by Netflix to process the videos, where each video chunk is different in size depending on scene complexity. In contrast, buffer health volume for audio in FIG. 5 stays at 3 MB with periodic bumps to 3:2 MB—this indicates a constant bitrate encoding used for audio content and bumps occur when a new audio chunk is downloaded and an old one is discarded from the buffer. For audio (not shown in the FIG. 7), a constant bitrate of 96 Kbps was observed throughout the playback.

Having analyzed streaming behavior on network and client individually, they were correlated. It is apparent that there are two distinct phases of video streaming: (a) the first 60 seconds of buffering, (b) followed by stable buffer maintenance. In the buffering phase, the client aggressively transferred contents at a maximum rate possible using four concurrent flows, and then in the stable phase it transferred chunks of data periodically to replenish the buffer using only two flows.

Figure 8:
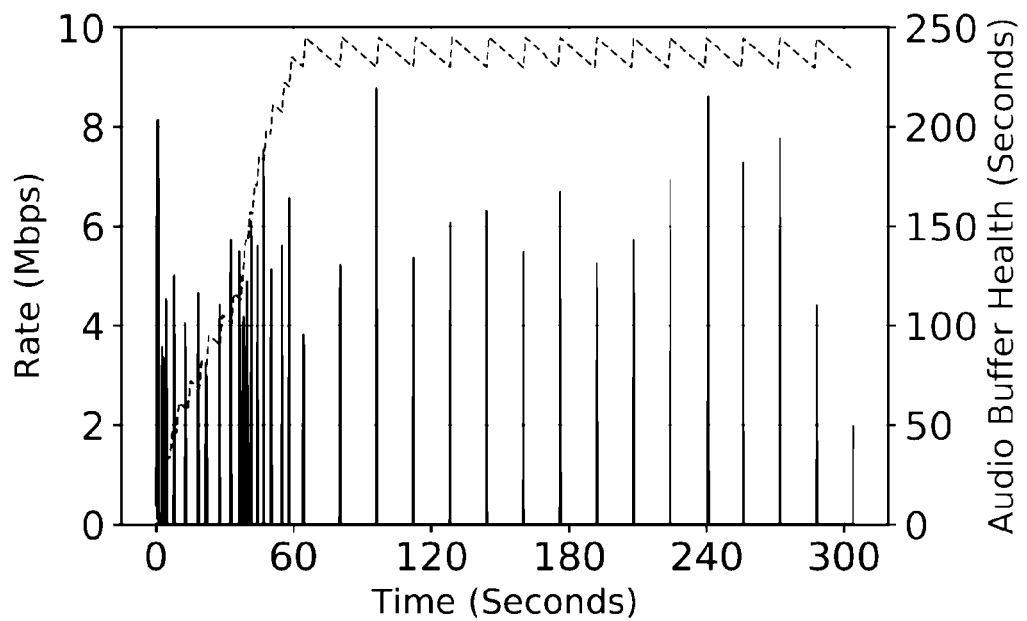
FIG. 8 is a graph illustrating the correlation of network flow activity and client audio buffer health.

Of the two flows active in stable phase, FlowB (with a spike periodicity of 16 seconds) displays a strong correlation between the spikes of its network activity and the replenishing audio buffer levels on the client, as shown in FIG. 8. This suggests that the TCP flow was used to transfer audio content right from the beginning of the stream. Isolating content chunks of this flow, the average chunk size was 213 KB with a standard deviation of 3 KB (1.4%). Every chunk transfer corresponds to an increase of 16 seconds in the client buffer level. Considering the fact that each chunk transferred 16 seconds (indicated by both periodicity and increase in buffer level) of audio and the buffering bitrate of audio was 96 Kbps, the size of audio chunk is expected to be 192 KB, which is very close to the computed chunk size of 213 KB which includes the packet headers. Additionally, for this specific flow, the server IP address differs from other flows (as shown in FIG. 4) and the Netflix client statistics also indicate that audio comes from a different CDN endpoint.

Figure 9:
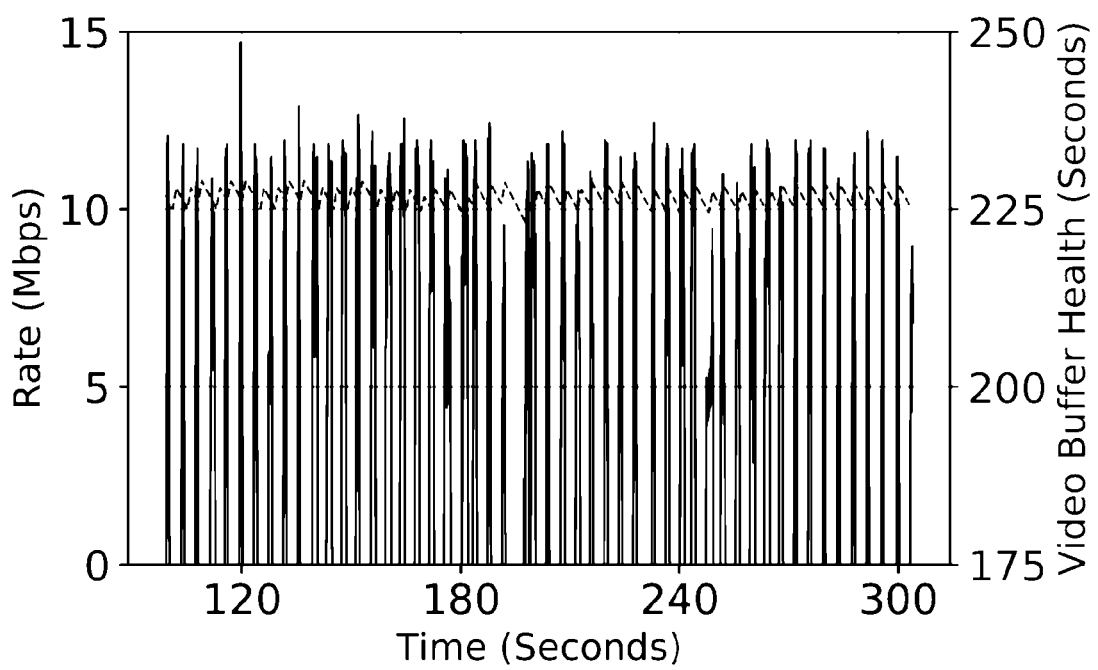
FIG. 9 is a graph illustrating the correlation of network flow activity and client video buffer health.

Further, FlowD (with a spike periodicity of 4 seconds) during the stable phase, displays a similar correlation between its network activity and the client buffer health of video, as shown in FIG. 9. The chunks of this flow have an average size of 1:15 MB and a standard deviation of 312 KB (27%). With each chunk constituting 4 seconds of video content and the video bitrate on client measured as 2050 Kbps, the actual chunk size is expected to be 1.00 MB which is close to the computed average chunk size while accounting for packet headers. Additionally, a high deviation in video chunks size also suggests that video is encoded using variable bitrate (in contrast, audio has a constant bitrate).

Trickplay

Trickplay is a term of art that refers to a mode of playback that occurs when the user watching the video decides to play another segment far from current seek position by performing actions such as fast-forward, or rewind. A trickplay is performed either within the buffered content (e.g., forward 10 seconds to skip a scene) or outside the buffered content (e.g., random seek to unbuffered point). In the former case (within buffer), the Netflix client uses existing TCP flows to fetch the additional content filling up the buffer up to 240 seconds. However, in the latter case, the client discards the current buffer and existing flows, and starts a new set of flows to fetch content from the point of trickplay. This means that trickplay outside the buffer is very similar to the start of a new video stream, making it difficult to determine whether the client has started a new video (for example, the next episode in a series) or has performed a trickplay. For this reason, a trickplay event is considered equivalent to starting a new video stream, and the experience metrics are calculated accordingly. Additionally, for a stream in the stable phase, trickplay results in transitioning back to the buffering phase until the buffer is replenished. As described below, trickplay is distinguished from network congestion that can cause a stream to transition into the buffering phase.

B. Analysis of Netflix Streams

Figure 10:
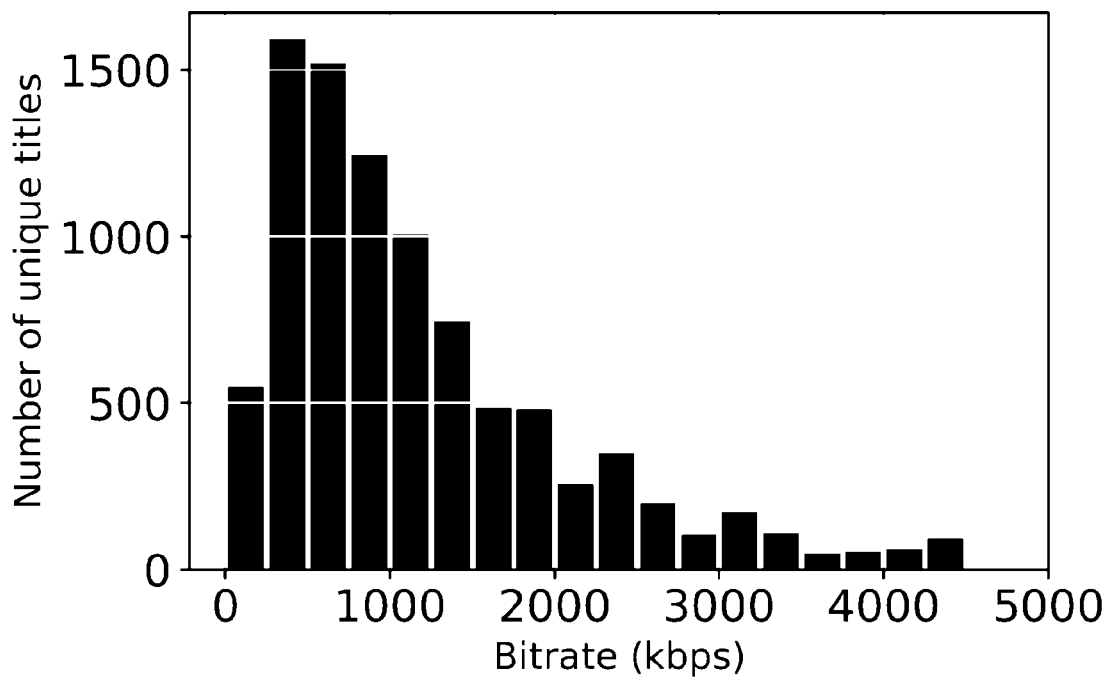
FIG. 10 is a histogram showing the statistical distribution of the available video quality (in terms of bit rate) of the video titles in the video set used to evaluate the apparatus.

Starting with the quality of streams across all instances in the dataset, FIG. 10 is a histogram (with 20 bins) of the number of unique titles for a given video bitrate—the x-axis is capped at 5000 Kbps for readability of the plot. Note that each title is played at multiple bitrate values during a stream, as explained above. It is apparent that Netflix videos are available in a fine granularity of bitrates in the range (i.e., [80, 6100] Kbps) of bitrate. The availability of Netflix videos in many bitrates across the range, combined with variable bitrate encoding, makes it nontrivial to map a chunk size observed on the network to a particular quality bitrate. It was also observed that all movie titles are available at lower bitrates (i.e., less than 1500 Kbps), while only 517 titles in the dataset were available (or played) at a high-quality bitrate (i.e., more than 3000 Kbps).

Figure 11:
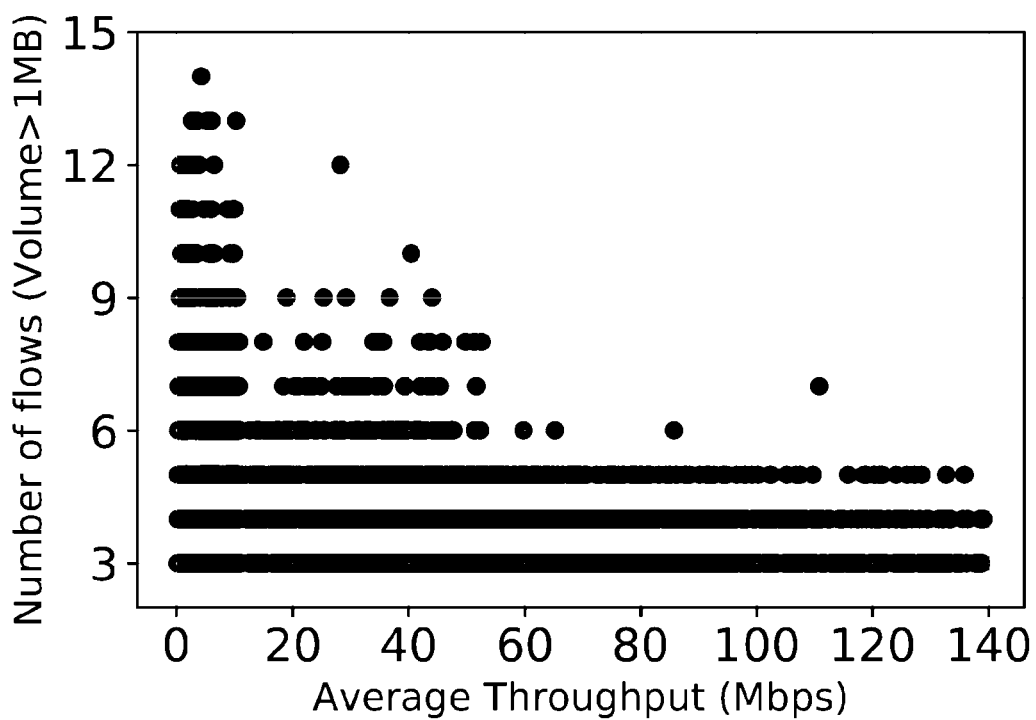
FIG. 11 is a scatterplot of flow count versus average throughput.
Figure 12:
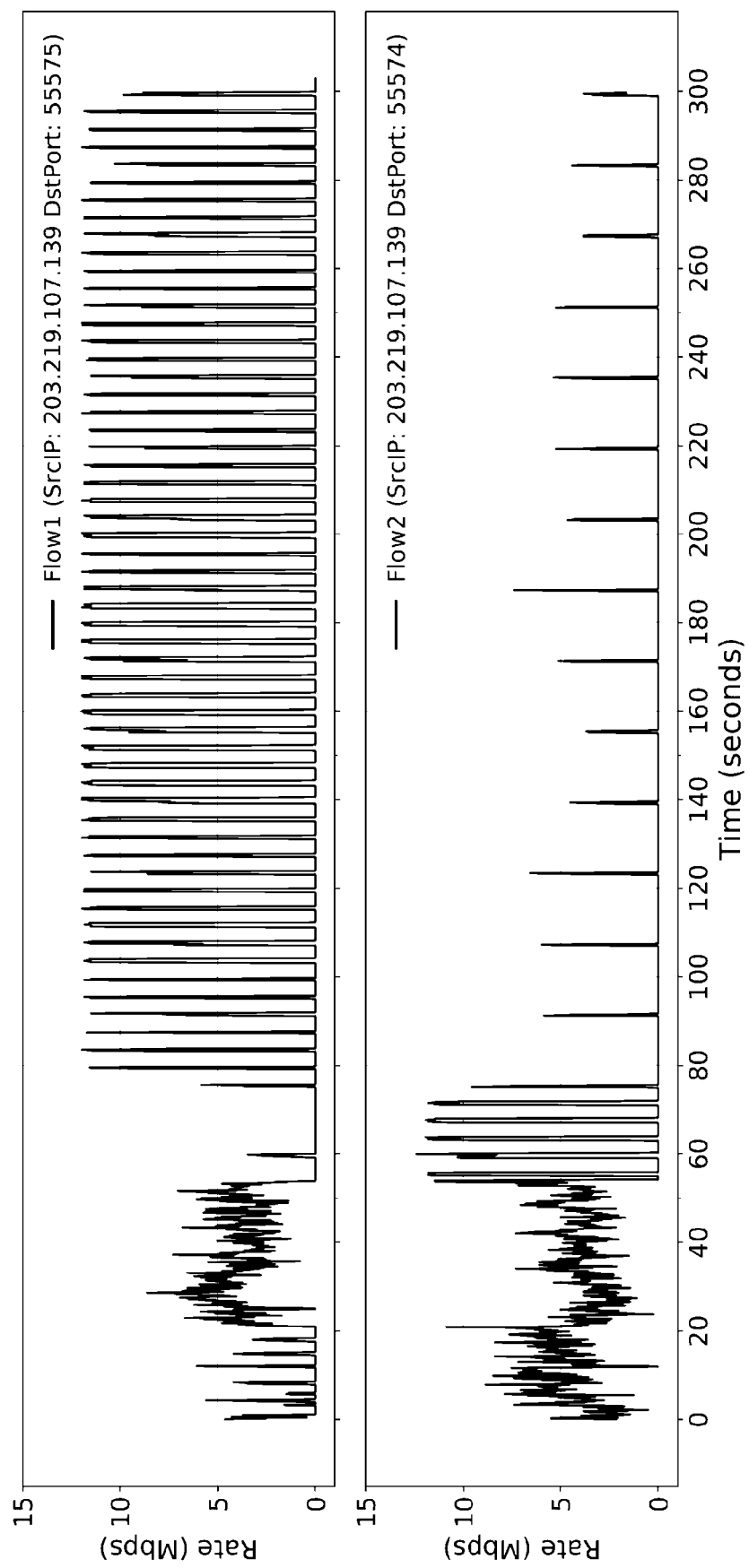
FIG. 12 includes two graphs that together illustrate the multiplexing of audio and video over two TCP flows of the Netflix application.

Moving to correlation of active flows and network condition, FIG. 11 is a scatter plot of the total number of TCP flows (those with volume more than 1 MB) per each stream versus the average throughput (as measured by the Netflix client application). For each stream, all TCP flows during both initial buffering and midstream (due to CDN switch or network congestion events) were counted. It is apparent that Netflix often uses 3 to 5 TCP flows for the entire range of measured throughput—upon commencement of the stable phase only a couple of flows remain generally. It was also observed that the number of flows can exceed 12 when the available bandwidth is relatively low (i.e., less than 8 Mbps)—this is not surprising as Netflix attempts to spawn multiple flows to quickly fetch required contents for smooth playback.

It is worth emphasising certain challenges in analyzing Netflix behaviour. It was found that some TCP flows carry both audio and video contents (audio content is identified by chunk sizes of about 220 KB and periodicity of 16 seconds in the stable phase)—both in an interleaved and alternating fashion. Also, each content type may switch TCP flows midstream—e.g., FIG. 6 shows that, in the stable phase of a sample stream, Flow1 carries audio and Flow2 carries video at the beginning, but after about 20 seconds video is carried in Flow1 and audio is carried in Flow2.

Therefore, the mapping of a flow to the content it carries is nontrivial to determine. The complex and sophisticated orchestration of flows and their content type/quality makes it challenging to accurately predict all the client playback metrics purely based on network activity. As described below, machine learning and statistical methods are used to compute a set of metrics (buffer-fill-time, average bitrate, and available throughput) per stream to infer quality of user experience (QoE) from network measurements.

V. Inferring Netflix QoE from Network Activity

A. Isolating Netflix Video Streams

Prior to video playback, the Netflix™ client sends a DNS query to fetch the IP address of Netflix streaming servers. To isolate flows corresponding to Netflix, the A-type DNS response packets are captured and inspected for the suffix nflxvideo.net—if present, the IP address is marked as that of a Netflix streaming server. In parallel, five tuple flows established to these streaming servers are tracked on a per-host basis. For example, given a user with IP address of 1.1.1.1, the connections from Netflix servers to this IP address are tracked in a separate data structure, thus grouping all flows established by this user to the Netflix streaming server. For now, it is assumed that one host plays at most one video at any time—described below is a method to detect households with multiple parallel Netflix sessions. It is noted that an ISP can equivalently use any other method to isolate Netflix traffic, e.g., an SNI field present in a server hello message sent during SSL connection establishment. DNS is used in the described embodiment because it is simpler to capture, and avoids the use of sophisticated deep packet inspection techniques required otherwise. However, it is acknowledged that the DNS information may be cached in the browsers, and thus every video stream may not have a corresponding query observed on the network. Nonetheless, maintaining a set of IP addresses (from previous DNS queries) will ensure that the video streams are captured.

B. Streaming Phase Classification

Having isolated the TCP flows of a stream, a machine learning-based model is used to classify the phase (i.e., buffering or stable) of a video streaming playback by using several waveform attributes.

Data Labeling

Each video streaming instance in the Netflix dataset is broken into separate windows of each 1-minute duration. A window of individual TCP flows associated with a stream is labelled with the client buffer health (in seconds) of that stream. For each window, three measures are considered, namely: the average, the first, and the last value of buffer health in that window. If both the average and last buffer values are greater than 220 seconds, then it is labelled as "stable". If both the average and the last buffer values are less than 220 seconds, but greater than the first buffer value, then the window is labelled as "buffering". Otherwise (e.g., transition between phases), the window is discarded and not used for training of the model.

Attributes

For each flow active during a window, two sets of attributes are computed. The first set of attributes computed from the flow activity data includes: (a) totalVolume—which is relatively high during buffering phase; (b) burstiness (i.e., $\mu 1\sigma$) of flow rate—captures the spike patterns (high during stable phase); (c) zeroFrac, the fraction of time that the flow is idle (i.e., transferring zero bytes)—this attribute is expected to be smaller in the buffering phase; (d) zeroCross, count of zero crossing in the zero-mean flow profile (i.e., [x-$\mu$])—this attribute is expected to be high in the buffering phase due to high activity of flows; and (e) maxZeroRun, maximum duration of being continuously idle—this attribute is relatively higher for certain flows (e.g., aging out or waiting for next transfer) in the buffering phase.

The second set of attributes is computed using the chunk metadata generated by the flow quantifier 106, including: (f) chunksCount; (g,h) average and standard-deviation of chunk sizes; and (i,j) average and mode of chunk request interarrival time. For instance, in the stable phase, a flow has fewer chunks, a higher inter-chunk time, and a higher volume of data in each chunk compared to the buffering phase. In total, for each flow in a window, ten attributes are computed (considering just the flow activity waveform profile and the chunk metadata, independent of available bandwidth) for each training instance (i.e., 1-min window of a TCP flow).

Classification Results

Figure 13:
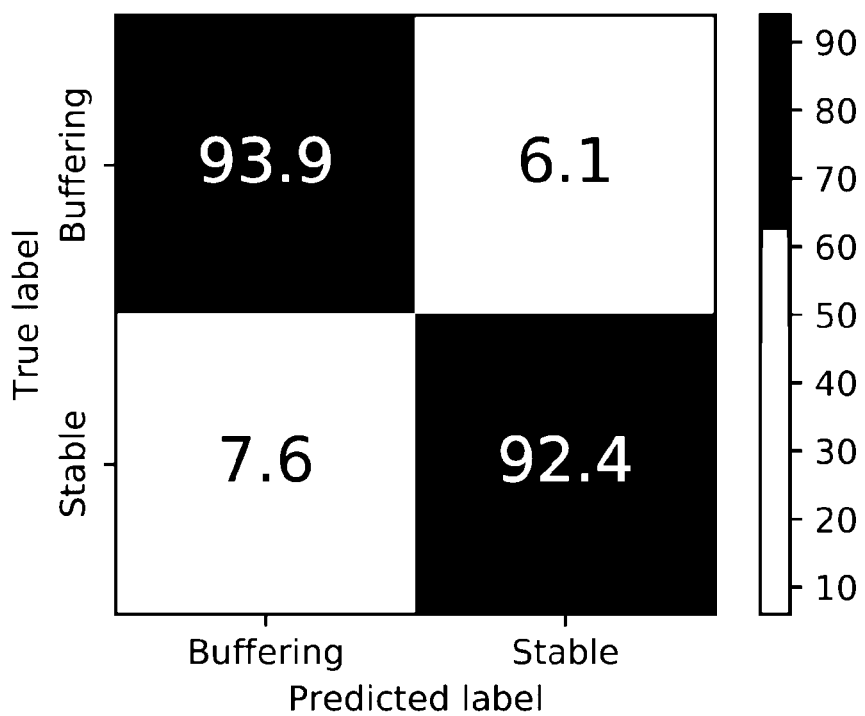
FIG. 13 is a confusion matrix illustrating the performance of phase classification by the apparatus.
Figure 14:
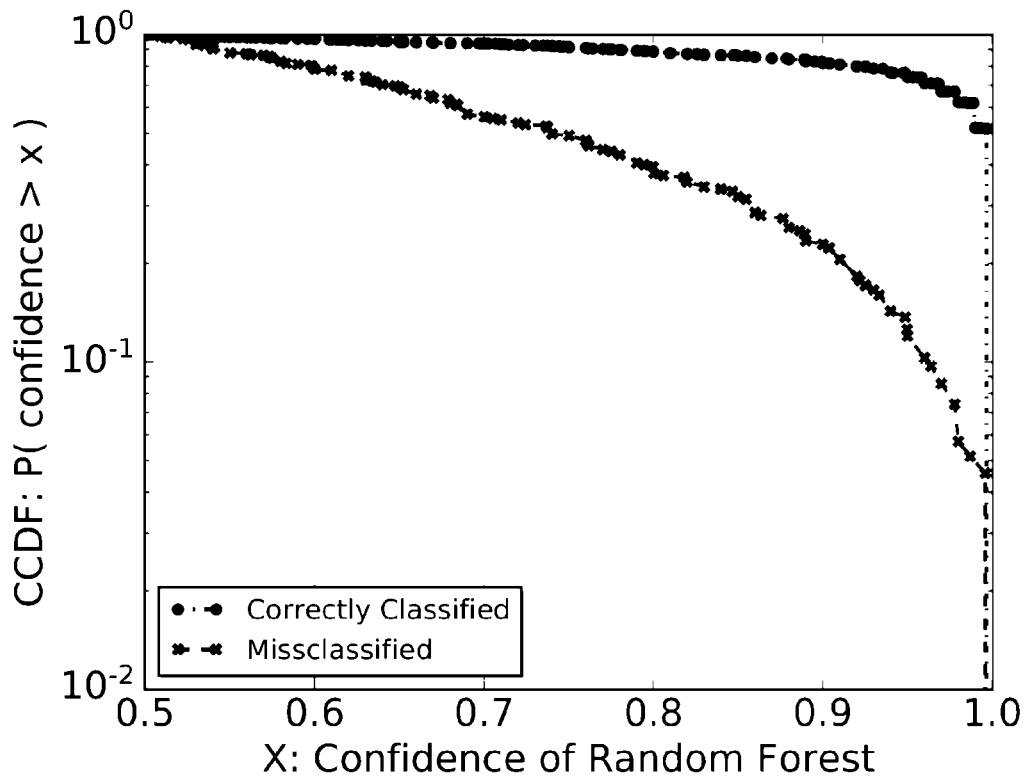
FIG. 14 is a graph illustrating the performance of phase classification by the apparatus in terms of the complementary cumulative distribution function (CCDF) of confidence-level for correctly classified and misclassified phases.

In the described embodiments, the machine learning (ML) component 202 is provided by the RandomForest ML algorithm known to those skilled in the art and available in the Python scikit-learn library. The model was configured to use 100 estimators to predict the output along with a confidence-level of the model. The labeled data of 12,340 instances was divided into training (80%) and testing (20%) sets. The performance of the classifier was evaluated using the testing set, indicating a total accuracy of 93:15%, precision of 94:5% and recall of 92:5%. FIG. 13 shows the confusion matrix of the classifier, indicating that 93:9% of buffering and 92:4% of stable instances are correctly classified. FIG. 14 illustrates the CCDF of the model confidence for both correctly and incorrectly classified instances. The average confidence of the model is greater than 94% for correct classification, whereas it is less than 75% for incorrect classification-setting a threshold of 80% on the confidence-level would improve the performance of the classification.

Use of Classification

For each TCP flow associated with a streaming session, the trained model was invoked to predict the phase of video playback. As described above, multiple flows are expected especially at the beginning of a stream. The outputs of the classifier for individual flows was subjected to majority voting to determine the phase of the video stream. In the case of a tie, the phase with maximum sum confidence of the model is selected. In addition to the classification output, the number of flows in the stable phase (i.e., two flows) is used to check (validate) the phase detection. This cross-check method also helps detect the presence of concurrent video streams for a household in order to remove them from the analysis—having more than two Netflix flows for a household IP address, while the model indicates the stable phase (with a high confidence), likely suggests parallel playback streams.

C. Computing User Experience Metrics

The following three key metrics together were found to be useful for inferring Netflix user experience.

1) Buffer Fill-Time: As explained above (and with reference to FIGS. 5 and 6), Netflix streams tend to fill up to 240 seconds worth of audio and video to enter into the stable phase—a shorter buffer fill-time implies a better network condition and hence a good user experience. Once the stream starts its stable phase, the process begins by measuring bufferingStartTime when the first TCP flow of the stream was established. The process then identifies bufferingOnly flows: those that were active only during the buffering phase, go inactive upon the completion of buffering, and are terminated after one minute of inactivity (FlowA and FlowC shown in FIG. 4). Next, the process computes bufferingEndTime as the latest time when any bufferingOnly flow was last seen active (ignoring activity during connection termination (e.g., TCP FIN)). Lastly, the buffer fill-time is obtained by subtracting bufferingEndTime and bufferingStartTime.

Fill-Time Results

To quantify the accuracy of computing buffer fill-time, the client data of video buffer health (in seconds) is used as ground-truth. The results show that the process achieved 10% relative error for 75% of streams in the dataset—the average error for all streams was 20%. In some cases, a TCP flow starts in the buffering phase and (unexpectedly) continues carrying traffic in the stable phase for some time, after which it goes idle and terminates. This causes the predicted buffer fill-time to be larger than its true value, thereby underestimating the user experience.

Bitrate

A video playing at a higher bitrate brings a better experience to the user. The average bitrate of Netflix streams is estimated using the following heuristics. During the stable phase, Netflix replaces the playback buffer by periodically fetching video and audio chunks. This means that over a sufficiently large window (say, 30 seconds), the total volume transferred on the network would be equal to the playback buffer of the window size (i.e., 30 seconds) since the client tends to maintain the buffer at a constant value (i.e., 240 seconds). Therefore, the average bitrate of the stable stream is computed by dividing the volume transferred over the window by the window length. During the buffering phase, Netflix client downloads data for the buffer-fill-time and an additional 240 seconds (i.e., the level maintained during the stable phase). Thus, the average bitrate of the buffering stream is computed by dividing total volume downloaded by sum of buffer fill-time and 240 seconds.

By tracking the average bitrate, it is possible to determine the bitrate switches (i.e., rising or falling bitrate) in the stable phase. As discussed earlier, there are a range of bitrates available for each video. For example, the title "Eternal Love" was sequentially played at 490, 750, 1100, 1620, 2370, and 3480 Kbps during a session in the dataset. It was found that Netflix makes bitrates available in a non-linear fashion—bitrate values step up/down by a factor of ~1.5 to their next/previous level (e.g., 490×1.5 approximately indicates the next bitrate level 750). This pattern was used to detect a bitrate switch when the measured average bitrate changes by a factor of 1.5 or more.

Bitrate Results

The accuracy of bitrate estimation was evaluated using the client data as ground-truth. For the average bitrate in buffering phase, the estimation resulted in a mean absolute error of 158 Kbps and an average relative error of 10%. The estimation errors for average bitrate in stable phase, were 297 Kbps and 18%, respectively. These errors arise mainly due to the fact that Netflix client seems to report an average bitrate of the movie, but due to variable bitrate encoding, each scene is transferred in different sizes of chunks, hence a slightly different bitrate is measured on the network. Nonetheless, the detection of bitrate switch events will be accurate since the average bitrate would change by more than a factor of 1.5 in case of bitrate upgrade/downgrade.

Throughput

Figure 15:
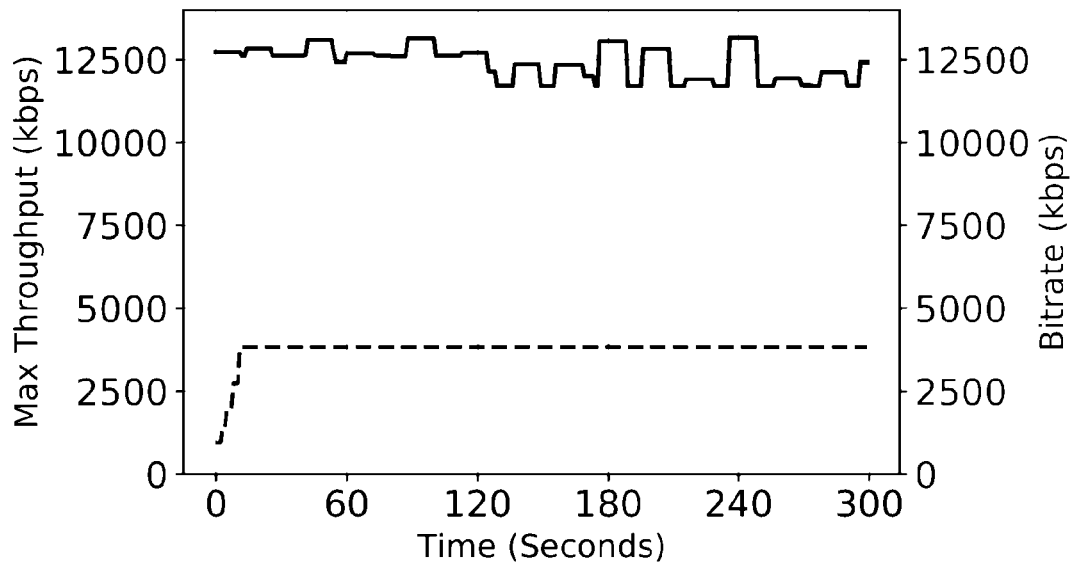
FIG. 15 is a graph showing the relationship between max throughput of a network flow and QoE bitrate under good QoE conditions (the bitrate saturates, despite more bandwidth remaining available)

The process first computes the aggregate throughput of a stream by adding the throughputs of individual flows involved in that stream. The process then derives two signals over a sliding window (of, say, 5 seconds) of the aggregate throughput: (a) max throughput, and (b) average throughput—note that the flow throughput is measured every 100 ms. Throughput captures the following very important experience states: Playback at maximum available bitrate: For a video stream, if the gap between the max throughput and the computed average bitrate is significantly high (say, twice the bitrate being played), then it implies that the client is not using the available bandwidth because it is currently playing at its maximum possible bitrate (i.e., max-bitrate playback event), as shown in FIG. 15 for a good experience.

Figure 16:
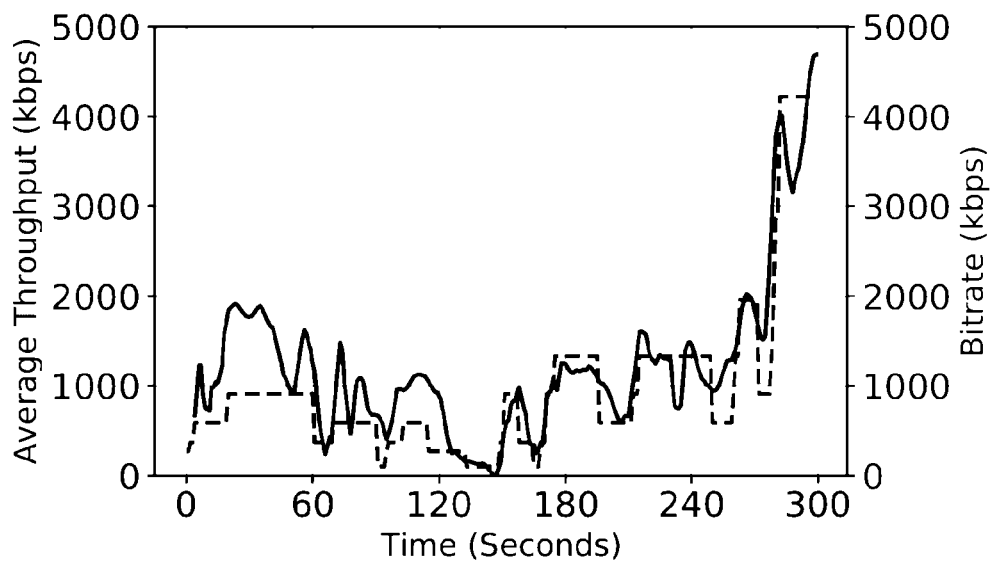
FIG. 16 is a graph showing the relationship between max throughput of a network flow and QoE bitrate under bad QoE conditions (the bitrate follows the stream throughput closely)

Playback with varying bitrates: If the max throughput measured is relatively close to the bitrate ranges of Netflix (up to 5000 kbps) and is highly varying, it indicates likely bitrate switching events. In this case, the actual bitrate strongly correlates with the average throughput signal, as shown in FIG. 16 for a bad experience as the average throughput keeps fluctuating (i.e., standard deviation is high, more than 20% of its average), and the stream is unable to enter into the stable phase.

D. Detecting Buffer Depletion and Quality Degradation

Bad experiences in terms of buffer health and video quality are detected using the metrics described above. To illustrate the detection process, an experiment was conducted in the inventors' lab, whereby the available network bandwidth was capped at 10 Mbps. First, a Netflix video was played on a machine, and one minute after the video went into the stable phase (i.e., 240 seconds of buffer filled on client) UDP downstream traffic (i.e., CBR at 8 Mbps using iperf tool) was used to congest the link. For videos, two Netflix movies were chosen: Season 3 Episode 2 of "Deadly 60" with a high quality bitrate available up to 4672 Kbps (Video1), and Season 1 Episode 1 of "How I Met Your Mother" with a maximum bitrate of 478 Kbps (Video2). FIG. 9 shows the Netflix™ client behaviour (top plots) and network activity (bottom plots) for the two videos.

Figure 17:
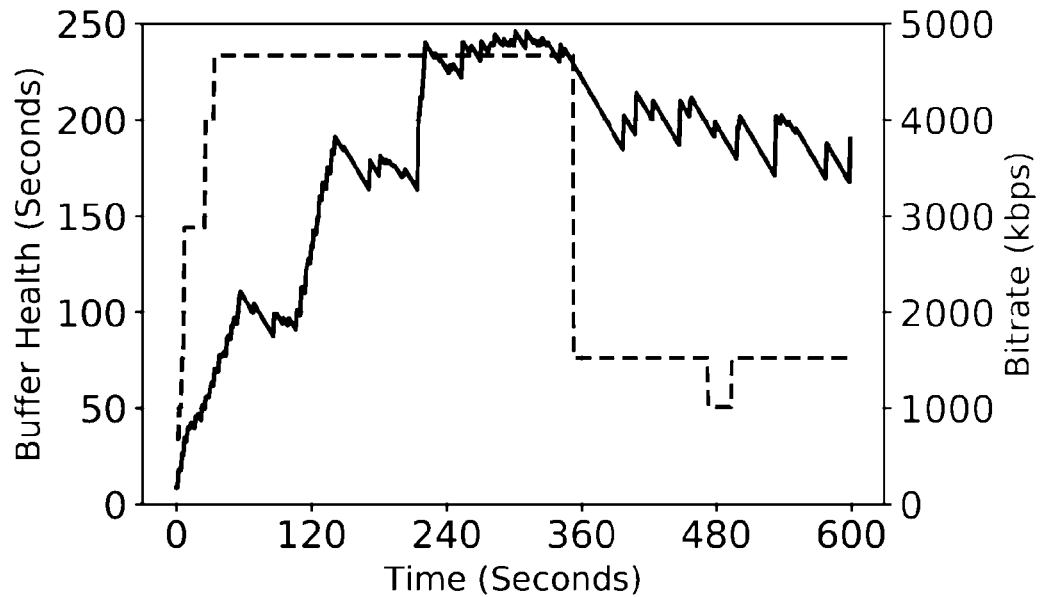
FIGS. 17 to 20: detecting quality degradation for users.
Figure 19:
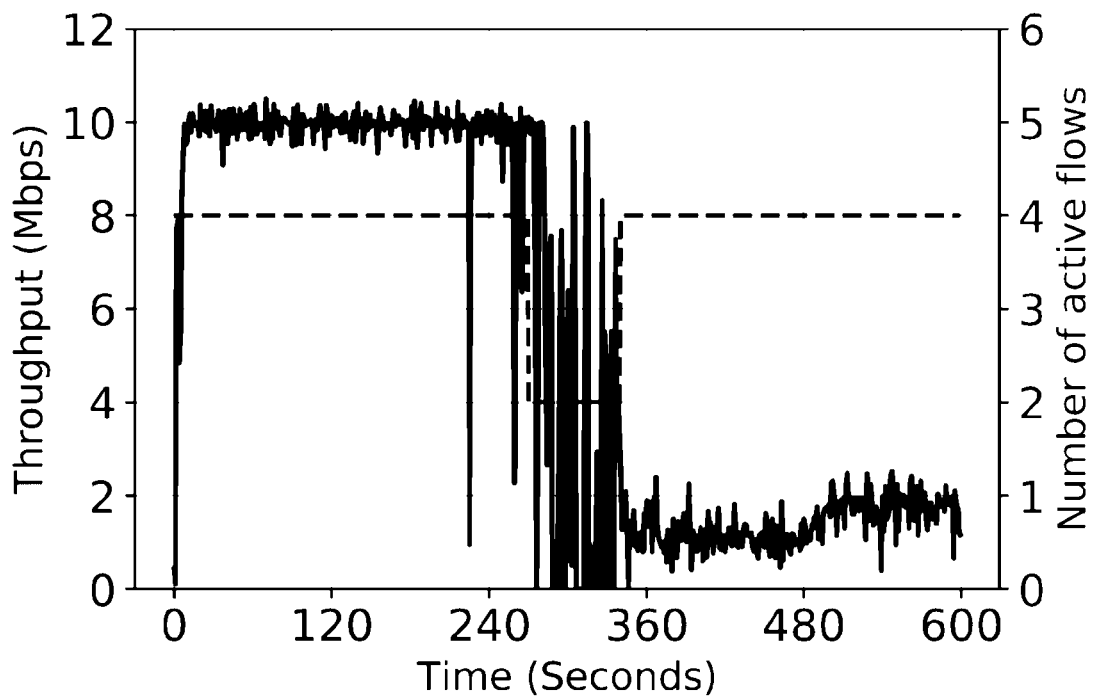

Considering FIG. 17 for Video1, it is seen that the stream started at 679 Kbps bitrate (dashed red lines), quickly switched up, and reached to the highest possible value 4672 Kbps in 30 seconds. It continued to play at this bitrate and entered into the stable phase (at second 270) where only two flows remained active, as shown in FIG. 19, and the buffer health (solid blue lines) reached to its peak value of 240 seconds. Upon commencement of congestion (at second 340), the buffer started depleting, followed by a bitrate drop to 1523 Kbps. Moving to the network activity in FIG. 19, two new flows spawned, the stream went to the buffering phase, and the network throughput fell below 2 Mbps. The change of phase, combined with a drop in throughput, indicates that the client experiences a buffer depletion—a bad experience. The phase detection process described above detected a phase transition (into buffering) at second 360, and deduced the bitrate from the average throughput (as explained earlier in FIG. 16), ranging from 900 Kbps to 2160 Kbps. This estimate shows a significant drop (i.e., more than a factor of 1:5) from the previously measured average stable bitrate (i.e., 3955 Kbps). Additionally during the second buffering phase, a varying average throughput was observed, with a mean of 1:48 Mbps and a standard-deviation of 512 Kbps (i.e., 35% of the mean), indicating a fluctuating bitrate on the client. Although a transition from stable to buffering can result from a trickplay (as described above), a bad experience was not detected because the maximum throughput did not change.

Figure 18:
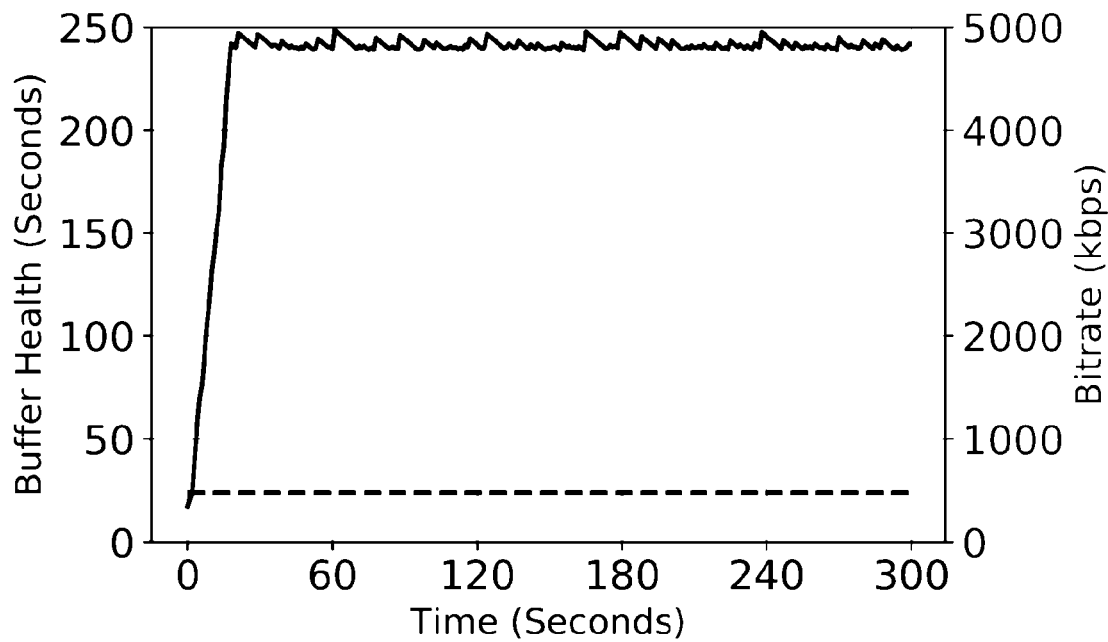
Figure 20:
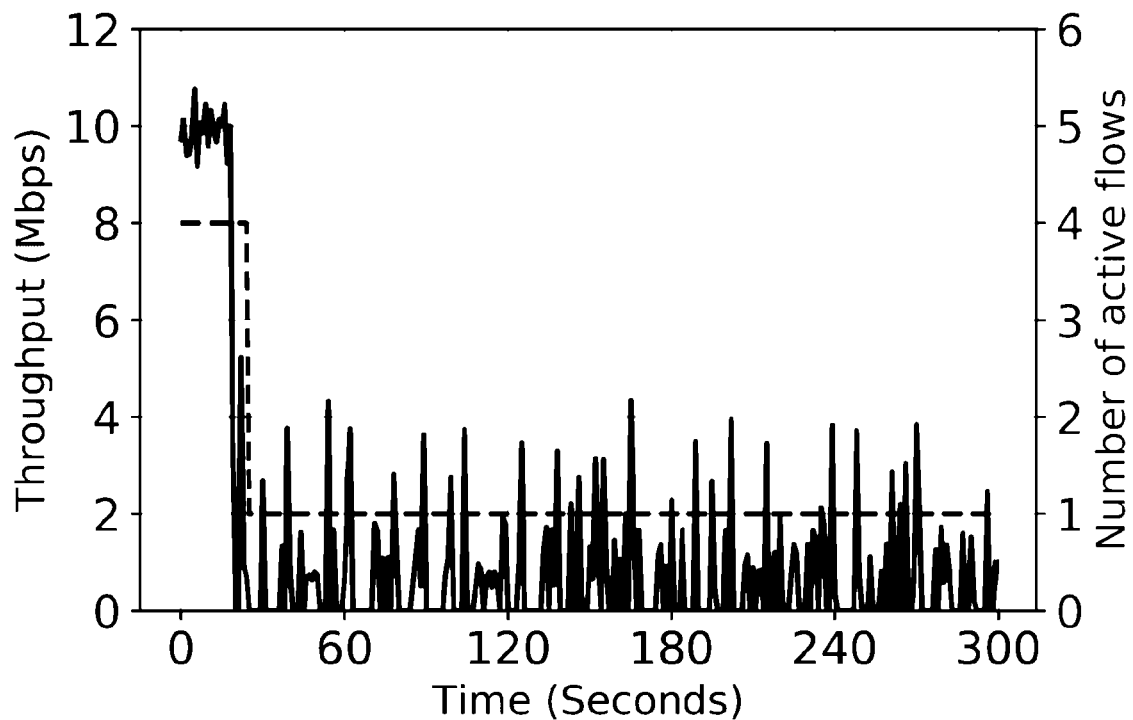

Moving to FIGS. 18 and 20 for Video2, the stream played consistently at the bitrate 478 Kbps, and quickly transitioned into the stable phase within about 20 seconds. It started with 4 active flows with aggregate throughput of 10 Mbps, but only one flow remained active after entering into the stable phase—this flow was responsible for both audio and video contents. Upon arrival of UDP traffic (at second 80), no change was observed in the playback. The process estimated a buffer fill time of 17:5 seconds, and an average buffering bitrate of 652 Kbps, and correctly predicted the stream to be in the stable phase, with bitrate reported every minute as 661, 697, 658, and 588 Kbps. Additionally, the max throughput was accurately predicted to drop from 10 Mbps to 4 Mbps. It is noted that, even though the bitrate and throughput are relative low during the stable phase, the playback is smooth and the experience is not bad. The described stream phase detection, combined with estimation of bitrate and throughput, enables the process to distinguish a good experience from a bad experience which could arise due to quality bitrate degradation and buffer depletion events.

The embodiment described above generates quantitative estimates of QoE for the Netflix streaming application/service from broadband network measurements in real-time.

It is worth mentioning that, unlike embodiments of the present invention, prior art methods for inferring Netflix streaming video experience are not usable by network operators such as ISPs. These methods require either extraction of statistics from packet traces and/or HTTP logs, or visibility into encrypted traffic (that carry URLs and manifest files), neither of which are easy for an ISP to achieve for Netflix. While some prior works have studied video streaming in the mobile context, the behaviour in broadband networks is different, and moreover mechanisms employed by Netflix in terms of using HTTPS, non-discretized bitrates, encrypted manifest files and urls, render such earlier studies obsolete. In contrast, an ISP can easily deploy the processes and apparatuses described herein into their existing network infrastructure to gain real-time visibility into per-stream Netflix user experience at scale.

The embodiment described above infers Netflix quality of experience in terms of the quantitative QoE metrics of buffer-fill time, average video bitrate, and available bandwidth to the stream. In some embodiments, as described below, QoE of Netflix and other networked applications or services is represented in terms of different states of a state machine. Additionally, in some embodiments these states are used to automatically control network transport characteristics in order to control QoE.

Live Video Streaming

The embodiments described above are able to estimate QoE for online services that provide Video-on-demand (VoD) streaming services to their users. However, as described above in the Background section, live video streaming is becoming an increasingly popular form of media streaming. Live video streaming refers to video content that is simultaneously recorded and broadcast in real-time. The content uploaded by the streamer sequentially passes through ingestion, transcoding, and a delivery service of a content provider reaching the viewers. The streamer first sets up the upload of a raw media stream pointing to the ingest service of the provider. The ingest service consumes the raw media stream and passes it on to the transcoder for encoding in various resolutions to support playback in different network conditions. The encoded stream is then delivered to multiple viewers using the delivery service. HTTP Live Streaming (HLS) is now widely adopted by content providers to stream live content to viewers. In HLS, the viewer's video client requests the latest segments of live video from the server and adapts the resolution according to the network conditions to ensure best playback experience. In live streaming, the client maintains a short buffer of content so as to keep the delay between content production and consumption to a minimum. This increases the likelihood of buffer underflow as network conditions vary, making live videos more prone to QoE impairments such as resolution drop and video stall.

In contrast, VoD streaming uses HTTP Adaptive Streaming (HAS) and involves the client requesting segments from a server which contains pre-encoded video resolutions. This not only enables use of sophisticated multi-pass encoding schemes which compress the segments more efficiently thus making segment sizes smaller, but also lets the client maintain a larger buffer and hence becomes less prone to QoE deterioration. Subsequently, the VoD client fetches multiple segments in the beginning to fill up the large buffer and thereafter tops it up as the playback continues.

Download Activity Analysis

Figure 27:
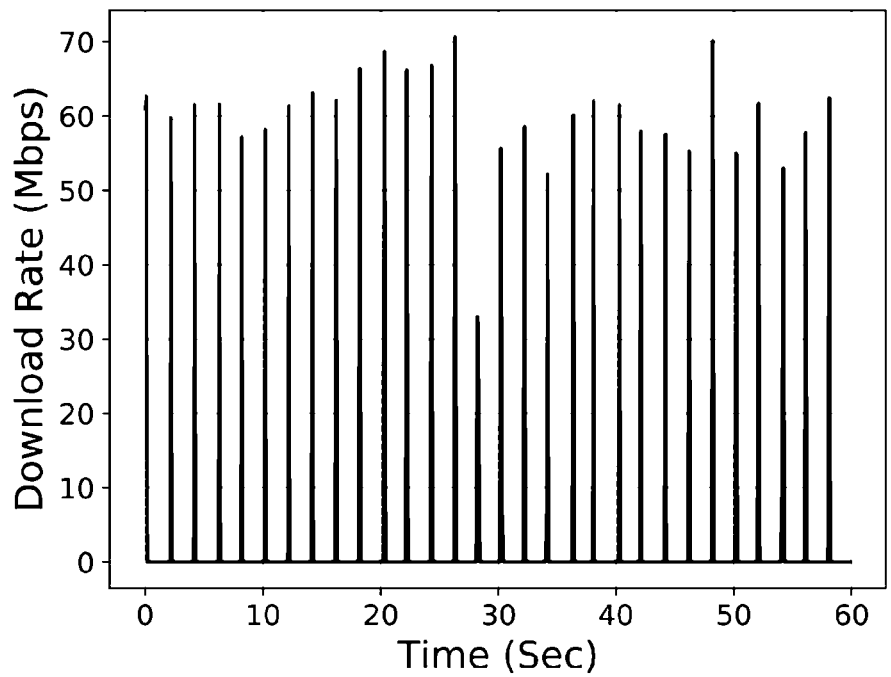
FIGS. 27 and 28 are graphs of Twitch download rate as a function of time, respectively for live video streaming and video-on-demand (VoD)
Figure 28:
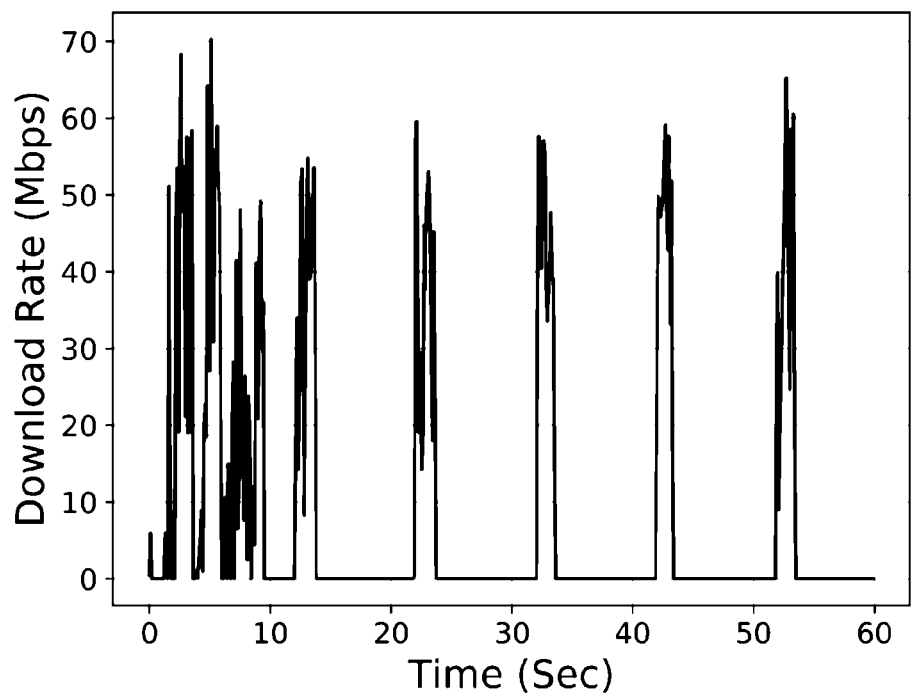

In work leading up to the invention, the network activities of live video and VoD streams were investigated to identify significant differences in their behaviours. FIGS. 27 and 28 show the client's network behavior (download rate collected at 100 ms granularity) of live and VoD streams (both from Twitch), respectively. It can be clearly seen how the two time-trace profiles differ. The live streaming client downloads video segments every two seconds. In contrast, the VoD client begins by downloading multiple segments to fill up a long buffer, and then fetches subsequent segments every ten seconds. Thus, the periodicity of segment downloads seems to be a relevant feature to distinguish live from VoD streams.

Figure 29:
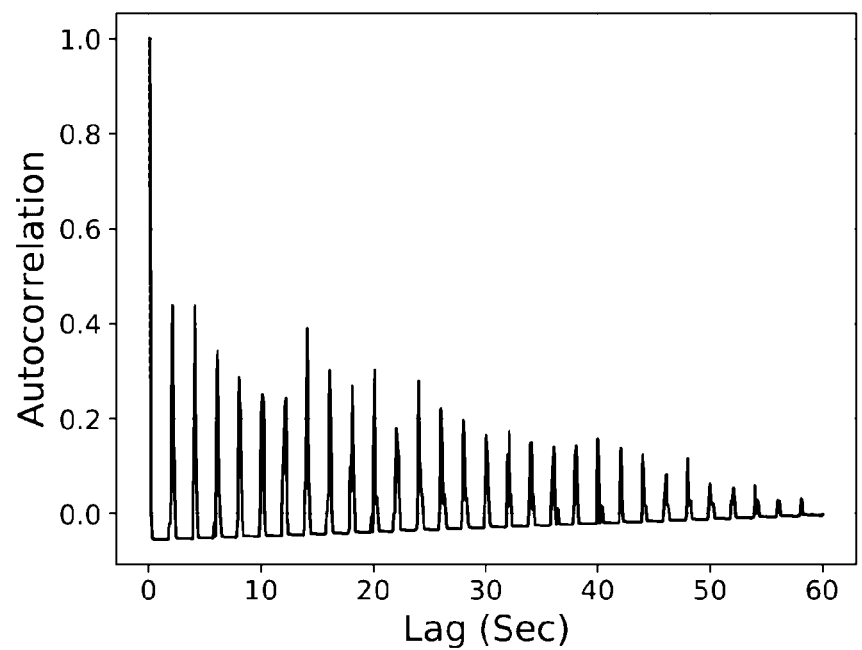
FIGS. 29 and 30 are graphs of the auto-correlation of the Twitch download rates as a function of time lag, respectively for live video streaming and video-on-demand (VoD)
Figure 30:
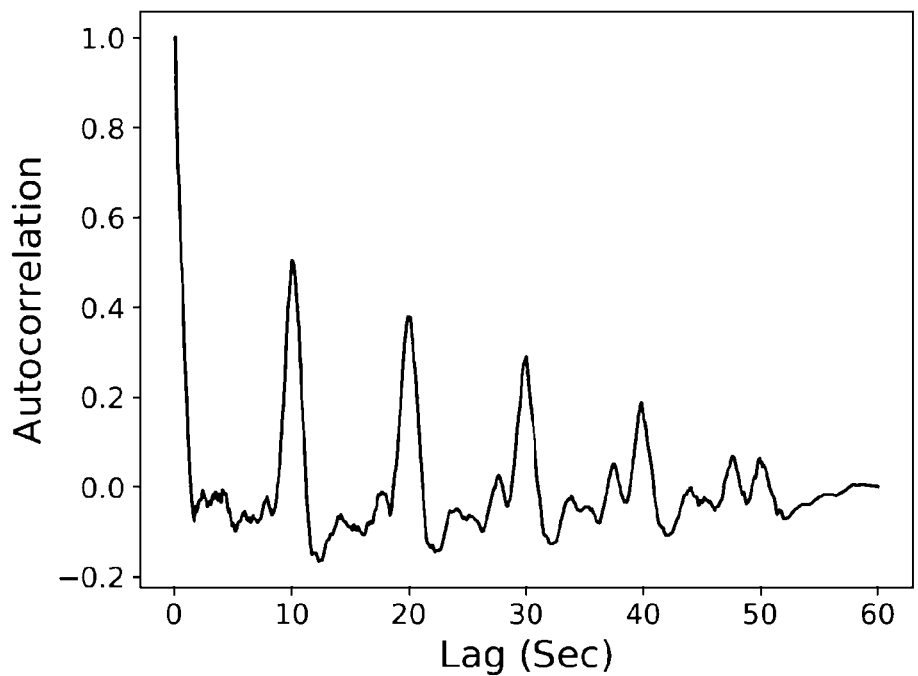
Figure 31:
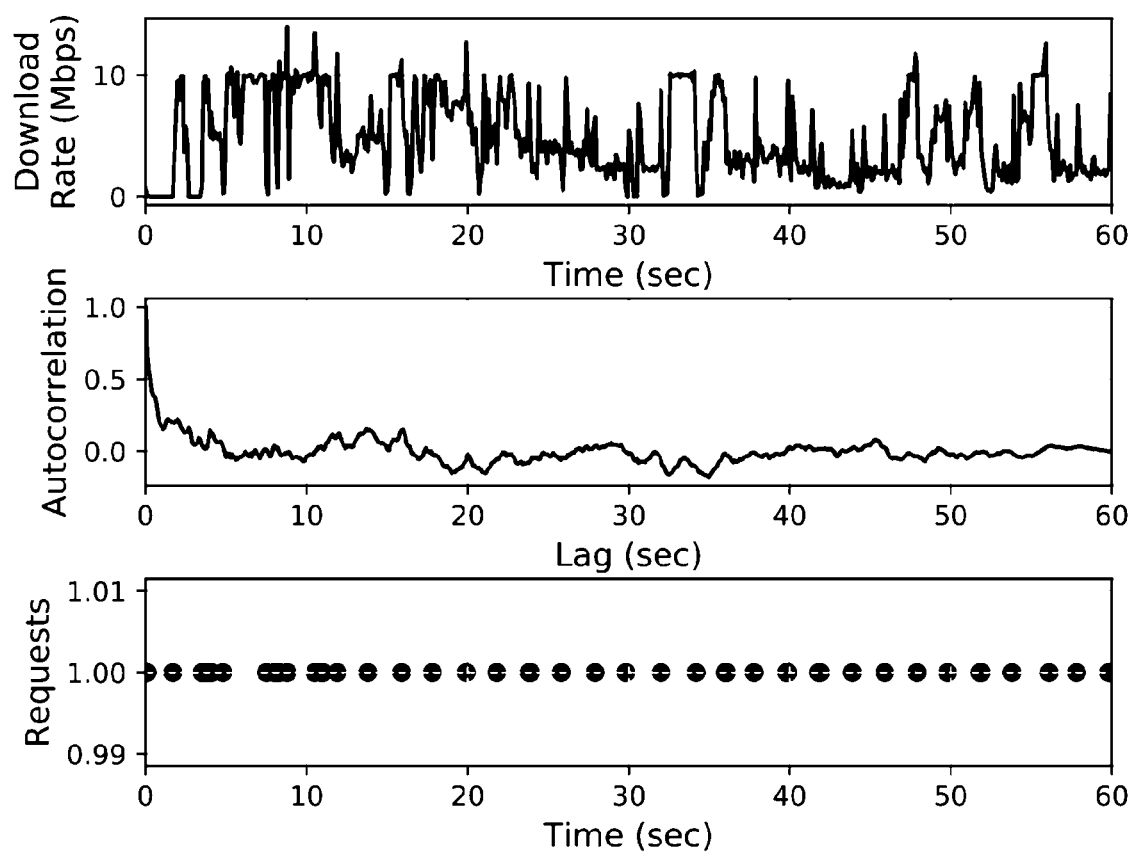
FIGS. 31 to 33 are respective sets of graphs respectively for YouTube live streaming, Facebook live streaming, and Facebook VoD, each set of graphs including graphs of download rate as a function of time, autocorrelation of download signals as a function of lag time, and the number of download requests as a function of time.
Figure 32:
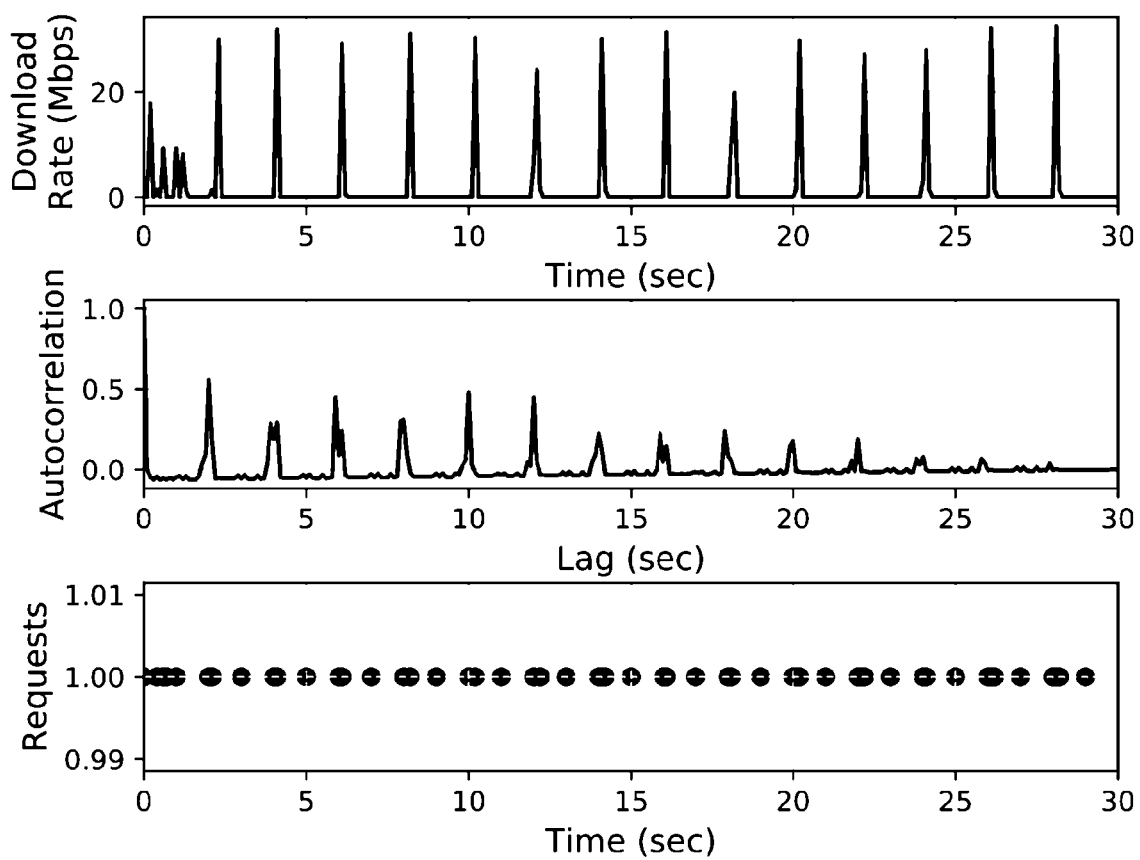
Figure 33:
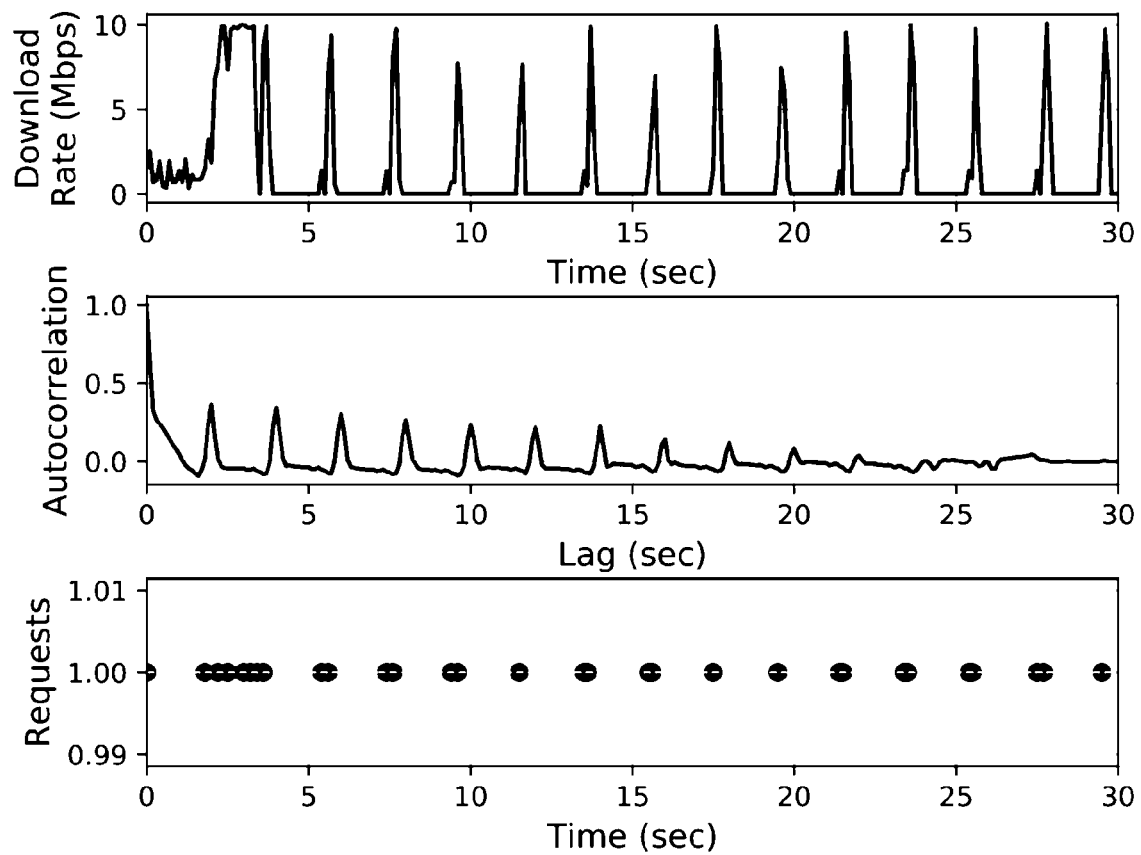

Based on these observations, the periodicity of download signals was estimated by applying an auto-correlation function, followed by peak detection. FIGS. 29 and 30 show the resulting auto-correlation values at different time lags (integral multiple of a second) for the live and VoD Twitch streams, respectively, of FIGS. 27 and 28. The auto-correlation sequence displays periodic characteristics just the same as the signal itself, i.e., lag=2 s for live Twitch and lag=10 s for VoD Twitch, with peaks at multiples of the periodicity value. Therefore, one may attempt to classify video streams as either live or VoD using the lag values at which the auto-correlation signal peaks. Accordingly, the first three lag values that resulted in auto-correlation peaks were used to train a Random Forest binary classifier, which achieved a classification accuracy of about 89.5% for Twitch videos. However, this method failed when extended to other content providers due to several challenges (highlighted in FIGS. 31 to 33). First, varying network conditions causes the auto-correlation to fail in identifying the periodicity, as shown in FIG. 31 for a sample of YouTube live streaming. Second, this approach is fundamentally unsuitable for Facebook streams as both live and VoD segments are fetched every 2 seconds, as shown in FIGS. 32 and 33, respectively. Lastly, user triggered activities like trick-play for VoD seem to distort the time-trace signal, causing it to be misclassified as a live stream.

Detailed Packet Analysis

To better understand the delivery mechanism of live videos, the inventors collected client playback data such as latency modes, buffer sizes, and resolutions, and used the network debugging tools available in the Google Chrome browser and in Wireshark (configured to decrypt SSL) to gain insights into protocols being used, patterns of content and manifests being fetched, their periodicity, and latency modes, as shown in Table 2 below. The following observations can be made for each provider.

TABLE 2

Fetch mechanisms of Twitch, Facebook and YouTube video streaming.

| Provider | Video Type | Protocol | Manifest | Periodicity | Latency modes |
|---|---|---|---|---|---|
| Twitch | VoD | HTTP/2 | Once | 10 s | — |
|  | Live | HTTP/1.1 | Periodic on a different flow | 2/4 s | Low, Normal |
| Facebook | VoD | HTTP/2 | Once | 2 s | — |
|  | Live | HTTP/2 | Periodic on the same flow | 2 s | — |
| YouTube | VoD | HTTP/2 + QUIC | Once | 5-10 s | — |
|  | Live | HTTP/2 + QUIC | Manifestless | 1/2/5 s | Ultra Low, Low, Normal |

Starting from Twitch, the VoD client uses HTTP/2, and fetches chunks with extension .ts (audio and video combined) from a server endpoint with the SNI "vod-secure.twitch.com".

The URL pattern in the HTTP GET request seems quite simple, providing the user ID, resolution, and chunk sequence number. Twitch live, however, uses HTTP/1.1, and fetches audio and video contents separately (on the same TCP flow) from server endpoint with SNI matching "videoedge*.abs.hls.ttv.net" (indicative of CDNs and edge compute usage) with an obfuscated URL pattern. Additionally, it requests manifest updates from a different server endpoint with name prefix video-weaver which also seems to be distributed using CDNs. The periodicity of chunk fetches is around 10 seconds for VoD, and around 2 seconds for live streams, corroborating the observation above. For a few sessions, chunks were fetched at a periodicity of 4 seconds—such cases are discussed below, and accounted for when predicting video QoE metrics. Additionally, Twitch offers two modes of latency, i.e., Low and Normal. The differences between these modes include: (a) technology of delivery: Low latency mode delivers the live video content using CMAF technology, and (b) client buffer capacity is higher (around 6-8 seconds) for the normal latency mode compared to around 2-4 seconds for the low latency mode.

Turning now to Facebook, both VoD and live clients use HTTP/2, by which audio and video chunks are fetched on one TCP flow with a periodicity of 2 seconds from a server endpoint with the name matching regex "video.*.fbcdn.net"—also indicating the use of CDNs. However, in the case of live video, manifest files are also periodically requested by the client from the same service on the same TCP flow.

Lastly, YouTube primarily uses HTTP/2 over QUIC (a transport protocol built on top of UDP by Google) for both VoD and live streams, fetching audio and video segments separately on multiple flows (usually two in case of QUIC). These flows are established to the server endpoint with name matching pattern "*.googlevideo.com". If QUIC protocol is disabled or not supported by the browser (e.g., Firefox, Edge, or Safari), YouTube falls back to HTTP/1.1 and uses multiple TCP flows to fetch the video content. In case of VoD, after filling up the initial buffer, the client typically tops it up at a periodicity of 5-10 seconds. It was observed that the buffer size and periodicity can vary, depending on the resolution selected and network conditions. In case of live streaming, however, the buffer health and periodicity of content fetch will depend on the latency mode of the video. There are three modes of latency for YouTube live including Ultra Low (buffer health: 2-5 sec, periodicity: 1 sec), Low (buffer health: 8-12 sec, periodicity: 2 sec), and Normal (buffer health: 30 sec, periodicity: 5 sec). It was found that live streaming in normal latency mode displays the same network behavior as VoD, and hence is excluded from consideration—this mode of streaming is not as sensitive as the other two modes. Further, YouTube live operates in manifestless mode (as indicated by the client playback statistics), and thus manifest files were not seen to be transferred on the network. Additionally, from the network usage patterns, ultra low latency mode in YouTube seemed use the CMAF to deliver content.

As described above, patterns in requests for video content (made by the client) fundamentally differ between live and VoD streaming across the three providers. In other words, capturing the client requests for video contents would help differentiate live and VoD streaming. Request packets are sent over HTTP, but obviously are hidden due to use of TLS. Upstream packets that contain a payload greater than 26 bytes—as the minimum size of an HTTP payload is 26 bytes—are isolated. FIGS. 31 to 33 clearly show how the request packets correlate with the video segments being fetched—however, the described auto-correlation approach failed to capture this. It was found that the time-trace signal of request packets: (a) is periodic and indicative of the streaming type, even in varying network conditions, (b) is less prone to noise in case of user triggered activities, and (c) can be well generalized across content providers.

After isolating the request packets, it is still necessary to identify features to train a classifier. As mentioned earlier, since both VoD and live clients of Facebook fetch content every 2 seconds, purely relying on periodicity is insufficient to distinguish Facebook live and VoD streams. However, it was noted that there are other differences (in addition to periodicity) in the way video contents are fetched among the two classes (live and VoD). For example, Facebook live requests manifest updates on the same flow, and thus have a higher request packet count. Therefore, instead of hand-crafting these provider-specific features, a neural network-based model capable of automatic feature extraction from raw data is used.

Classification:

Live Versus VoD Streaming

Having identified request packets as a key feature to distinguish live from VoD streams, data of over 30,000 video streams was collected across the three providers. Two tools were built to: (a) automate the playback of video streams, and (b) collect data of video streams from the inventors' campus network. A neural network model was designed and trained on the collected data to classify streams as either live or VoD, based on a time-series vector consisting of request packets count.

Dataset

Data is required to develop models for distinguishing live stream from VoD streams, as well as quantifying the QoE of live video playback sessions from the network behavior of their traffic flows. To this end, the flow quantifier component 106 described above and shown in FIG. 1 is used as the first tool mentioned above.

A similar training apparatus as described above for Netflix videos is used to collect the dataset via automatic playback of videos. For both live video and VoD streaming, the orchestrator 102 signals a selenium-based browser instance to fetch the top trending videos from a particular provider. It then performs the following steps for each video in the video list: step 2: signals the flow quantifier 106 component to start collecting network data, step 3: plays the video on the browser, step 4.1: collects the experience metrics reported by the player such as resolution, buffer level, and step 4.2: stores them in the QoE metrics file 112. After the video is played for a fixed amount of time (2 minutes in the described embodiment), the orchestrator 102 signals the flow quantifier 106 to stop collecting data, and skips to the next video to follow the same sequence of steps again.

The flow quantifier tool 106 can read packets from a pcap file, a typical network interface, or an interface with DPDK (Intel's Data Plane Development Kit) support for high speed packet processing. The flow quantifier tool 106 collects telemetry for a network flow identified by a 5-tuple (SrcIP, DstIP, SrcPort, DstPort, and Protocol). There can be multiple telemetry functions associated with a flow and are fully programmable. Two functions used in this embodiment are request packet counters and chunk telemetry. The first function exports the number of request packets (identified by conditions on the packet payload length) observed on the flow every 100 ms. The second function is based on the chunk detection algorithm described in Craig Gutterman et al. 2019. Requet: Real-Time QoE Detection for Encrypted YouTube Traffic. In Proc. ACM MMSys. Amherst, Massachusetts ("Gutterman"), and exports metadata for each video chunk, including chunkSize (in bytes and packets) and timestamps such as chunkRequest, chunkBegin, and chunkEnd (further described below).

In order to isolate network flows corresponding to the video stream, the flow quantifier tool 106 performs regex matches on the Server Name Indication (SNI) field captured in the TLS handshake of an HTTPS flow. In the case of Twitch, although flows carrying VoD and Live streams can be distinguished using the SNI (with prefixes vod-secure and video-edge), it might soon change the delivery infrastructure to become similar to YouTube or Facebook, where SNI cannot distinguish between the two video classes. Thus, a model that classifies video streams independent of their SNI is required. Along with network telemetry data collected for each video, the orchestrator 102 collects playback metrics, including resolution and buffer health from the video player. Twitch and YouTube expose an advanced option which displays (when enabled) an overlay with all the playback metrics. Facebook's player, however, only reports the resolution of the video being played and the buffering events are recorded by using JavaScript functions executed on the video element of the web page. These playback metrics that are stored along with the network telemetry data will form a collocated time series dataset for each playback session. The playback metrics are used as ground-truth for developing the QoE inference models.

Figure 34:
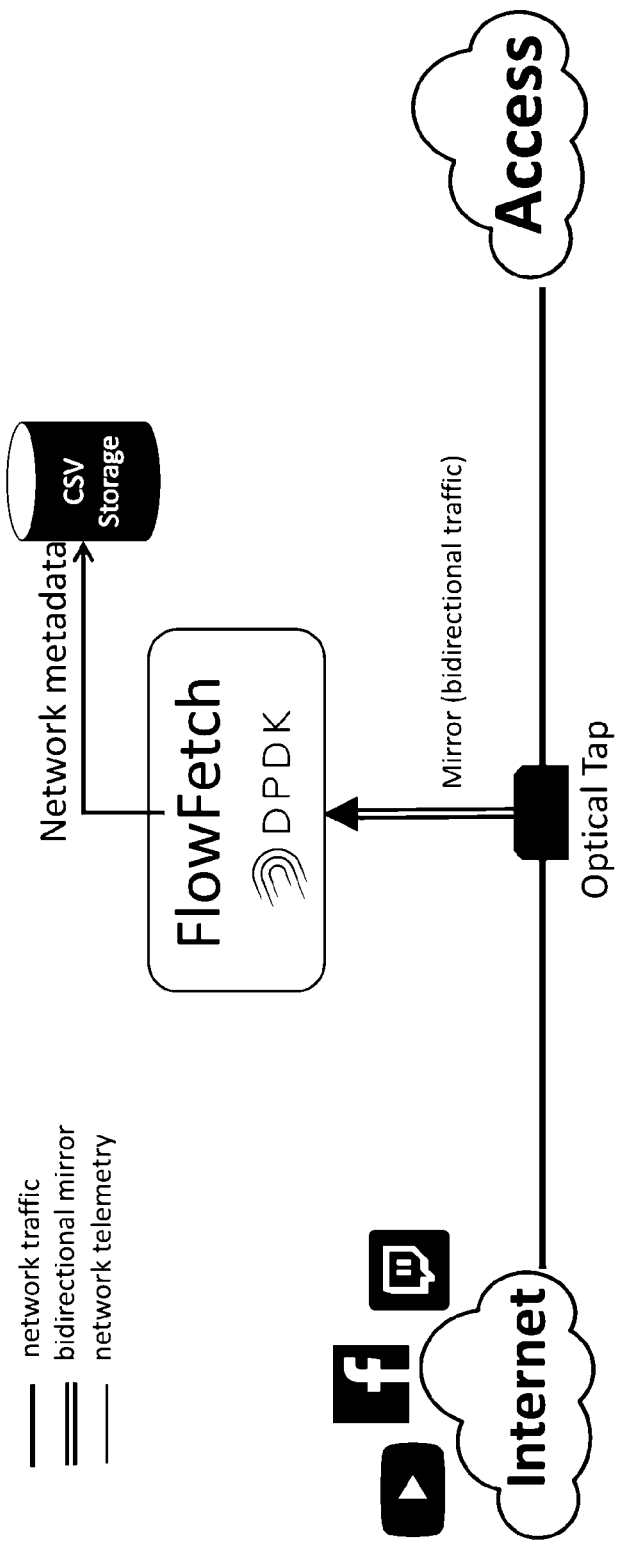
FIG. 34 is a schematic diagram showing the architecture of a data collection apparatus used to mirror and store network traffic data from the inventors' university campus network.

In addition to the data collected by the flow quantifier tool 106, data for Twitch videos was collected from the inventors' university campus traffic. As shown in FIG. 34, a mirror of the entire campus traffic is received and stored on a server, and the flow quantifier tool 106 is used to process data of real user-generated Twitch live and VoD flows. Using SNI regex matches described above, the flow quantifier tool 106 filters and tags the collected flow as Live or VoD.

However, this data set can only be used for classification purposes, as none of the playback metrics such as resolution etc. are available since there is no control over the device/user streaming the videos.

Table 3 below shows the number of video sessions collected across providers using the flow quantifier tool 106 and from the campus traffic. Although the flow quantifier tool 106 was limited to playing the videos for 2 minutes, the data collected from the campus was not limited by time. In total, over 1000 hours of playback of videos were collected across different providers. As described below, the dataset was used to train models which can infer the QoE of video in terms of resolution and buffer depletion events, using just the chunk telemetry data obtained from the network. The client playback metrics collected for each session consisting of resolutions and buffer sizes are used as ground-truth. Prior to QoE estimation, first the dataset is used to train models for classifying live and VoD streams across providers using request packets telemetry obtained from the network.

TABLE 3

Summary of the dataset: number of streams.

|  | Twitch | | YouTube | | Facebook | |
| --- | --- | --- | --- | --- | --- | --- |
|  | Live | VoD | Live | VoD | Live | VoD |
| Tool | 2587 | 2696 | 4076 | 4705 | 2841 | 1818 |
| Campus | 12534 | 1948 | — | — | — | — |

LSTM Model Architecture

As described above, the requests made for video content over a network flow form patterns that are evidently different in live streaming compared to VoD streaming. This feature is captured in the dataset wherein the count of requests is logged every 100 ms for a given network flow. The first 30 seconds of the playback is used as a time window over which the stream is to be classified. As a pre-processing step, fine-grained requests are aggregated every 500 ms, thus obtaining 60 data-points as denoted by:

$$\vec{X} = [x_1, x_2, \ldots, x_{59}, x_{60}] \quad (1)$$

As shown in FIG. 31, live streams display more frequent data requests, distinguishing their network behavior across various providers. For example, in case of Twitch where data is requested every two seconds, the corresponding pattern $$(\vec{X})$$

is approximately expected to be in the form of "$x_1 000 x_5 000 \ldots x_{57} 000$"—non-zero values occur every four data points (a two-second interval). Such patterns can be extracted by features such as zeroFrac i.e. fraction of zeros in the window, maxZeroRun i.e. maximum consecutive zeros and so on, and be used to train a machine-learning model. However, features (types and their combination) would differ across various providers, and hence instead of handcrafting features identified and extracted from $\vec{x}$, the classification model should derive higher level features automatically from training data. Further, $\vec{x}$ is a vector of raw time-series data, inherently capturing all temporal properties of video requests—unlike the lag values of top peaks in the auto-correlation function described above. In order to automatically derive features of the temporal dimension, the Long Short Term Memory (LSTM) neural network time series model is used, as described in Sepp Hochreiter and Jürgen Schmidhuber, *Long Short-Term Memory*, Neural Comput. 9, 8 (November 1997), 1735-1780.

Figure 35:
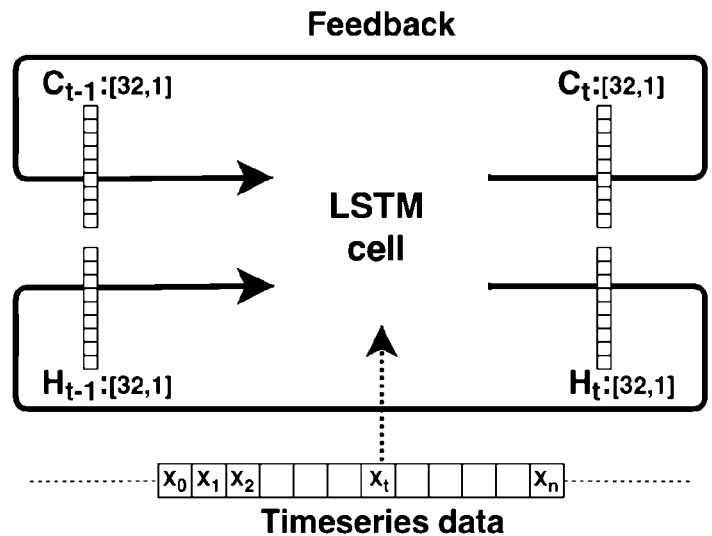
FIGS. 35 and 36 are schematic diagrams respectively illustrating an LSTM cell, and a LSTM to MLP network of a model used for binary classification.

An LSTM maintains a hidden state $$(\vec{h_t})$$

and a cell state $$(\vec{c_t}),$$

shown as upper and lower channels respectively in FIG. 35. The cell state of the LSTM acts like a memory channel, selectively remembering information that will aid in the classification task. In the context of our work, this could be the analysis of periodicity and/or the pattern by which $x_i$s vary over time. The hidden state of the LSTM is an output channel, selectively choosing information from the cell state required for classifying a flow as live or VoD. FIG. 35 shows that at epoch t the input $x_t$ is fed to the LSTM along with the previous hidden state $h_{t-1}$ and cell state $c_{t-1}$, obtaining current ht and ct—at every epoch, information of the previous steps is combined with the current input. Using this mechanism, an LSTM is able to learn an entire time series sequence with all of its temporal characteristics.

Figure 36:
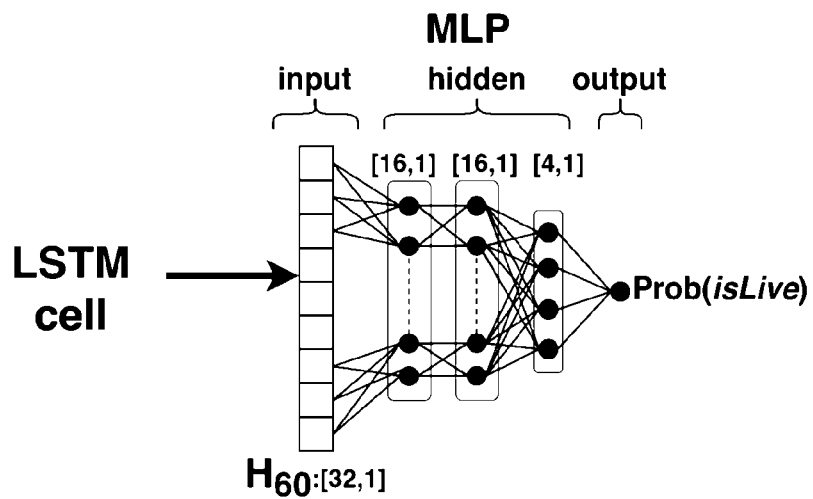

As detailed above, each $x_i$ from $\vec{x}$ is input into the LSTM sequentially to obtain the final hidden state $$(\vec{h_{60}})$$

which retains all the necessary information for the classification task.

$$(\vec{h_{60}})$$

is then input to a multi-layer perceptron ("MLP") to make the prediction, as shown in FIG. 36. The final output of the MLP is the posterior probability of the input time-series being an instance of live streaming.

Ideally, the MLP is expected to predict a probability of 1 when fed by an instance of live streaming and a probability of 0 otherwise. However, in practice, a probability of more than 0.5 is used for predicting the flow as a live stream. In the described architecture, the LSTM network has one layer consisting of a hidden vector and a cell vector, each with size of 32×1, followed by an MLP with three hidden layers having dimensions of 16×1, 16×1, and 4×1, respectively.

It should be noted that, irrespective of the provider, the described architecture remains the same. It is found that a simple architecture of one layer LSTM and hidden state and cell state vectors of length 32 are sufficient for the task, as increasing either the layer count or the state vector size does not improve prediction accuracy. Thus, the simplicity of the described model ensures that it has very low training times and faster prediction with a low memory footprint.

Training and Results

The neural network architecture is consistent across providers, thus indicating the generality of the described approach to classify live and VoD streams. Hereinafter, the combination of LSTM and MLP is referred to as model. Although request patterns are distinct across different providers, our model automatically derives higher level features from the requests data for the classification task using back-propagation and optimization techniques. While training, multiple minibatches of the training data are created, with each batch holding 128 streams. Each batch is passed through the model to obtain the predicted probabilities (^y). The binary cross entropy loss function (BCE), as shown in Eq. 2 below, is used to obtain the prediction error with respect to the groundtruth (y). Once the error is computed, back propagation is performed, followed by Adam optimization to modify the weights in the model. A weight decay of $10^{-3}$ was used for the MLP weights to prevent overfitting, and a learning rate $\alpha$ of $10^{-3}$. When trained on a Nvidia GeForce GTX 1060 GPU, the model occupies a 483 MB memory footprint.

$$BCE(y,\hat{y})=-(1-y)*\log(1-\hat{y})-y*\log(\hat{y}) \quad (2)$$

With the training parameters mentioned above, the model (across the three providers) achieves an acceptable accuracy, as shown in Table 4, which also compares the model accuracy with that of obtained from a random forest classifier fed by the 3-lag values of the auto-correlation function described above, demonstrating the superiority of the LSTM-based model.

TABLE 4

Accuracy (%) of models trained per provider.

| Provider | 3-Fold best accuracy | |
| --- | --- | --- |
| | Auto-correlation peaks | Model |
| Twitch | 89.50 | 97.12 |
| YouTube | 68.93 | 99.60 |
| Facebook | 60.90 | 99.67 |

TABLE 5

Accuracy (%) varies by monitoring duration.

| Provider | Monitoring duration (sec) | | | | | |
| --- | --- | --- | --- | --- | --- | --- |
| | T = 5 | T = 10 | T = 15 | T = 20 | T = 25 | T = 30 |
| Twitch | 90.73 | 94.60 | 95.30 | 96.12 | 96.16 | 97.12 |
| YouTube | 97.79 | 98.25 | 98.73 | 99.38 | 99.60 | 99.43 |
| Facebook | 99.53 | 99.45 | 99.60 | 99.67 | 99.53 | 99.48 |

Figure 37:
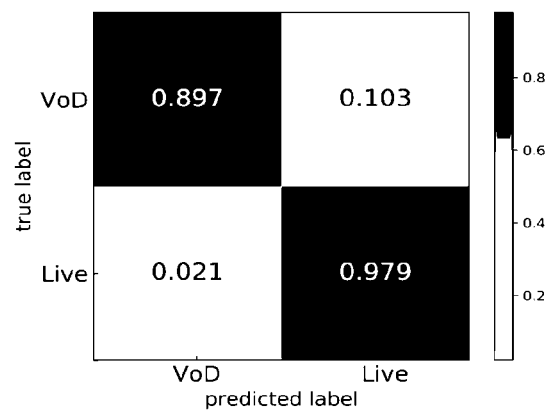
FIGS. 37 to 39 are confusion matrices of binary classifiers for the respective providers Twitch, YouTube, and Facebook.
Figure 38:
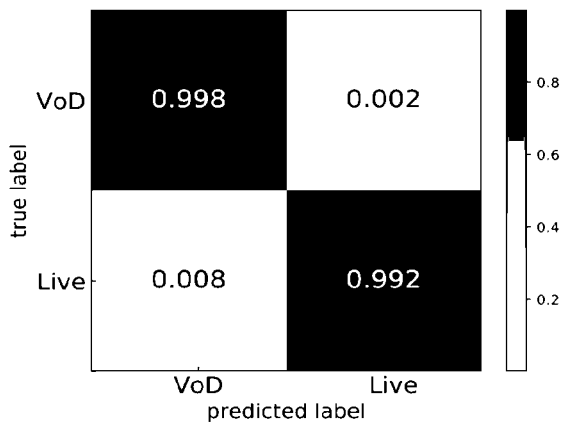
Figure 39:
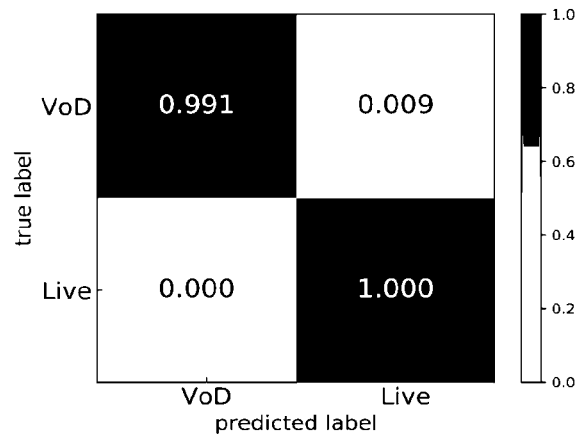
Figure 40:
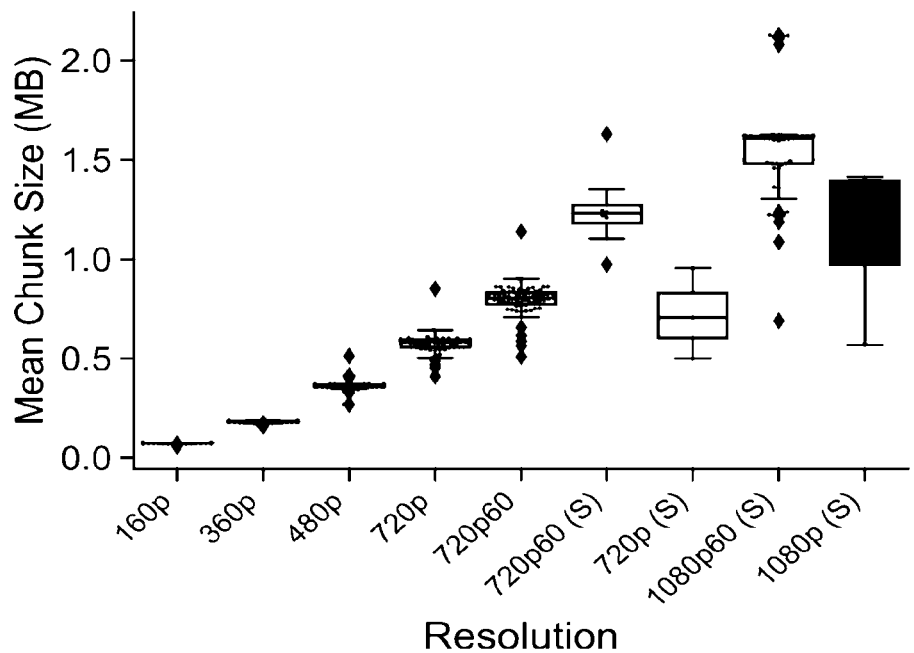
FIGS. 40 to 42 are graphs showing the distribution of chunk sizes as a function of actual video resolution, respectively for Twitch, YouTube, and Facebook.
Figure 41:
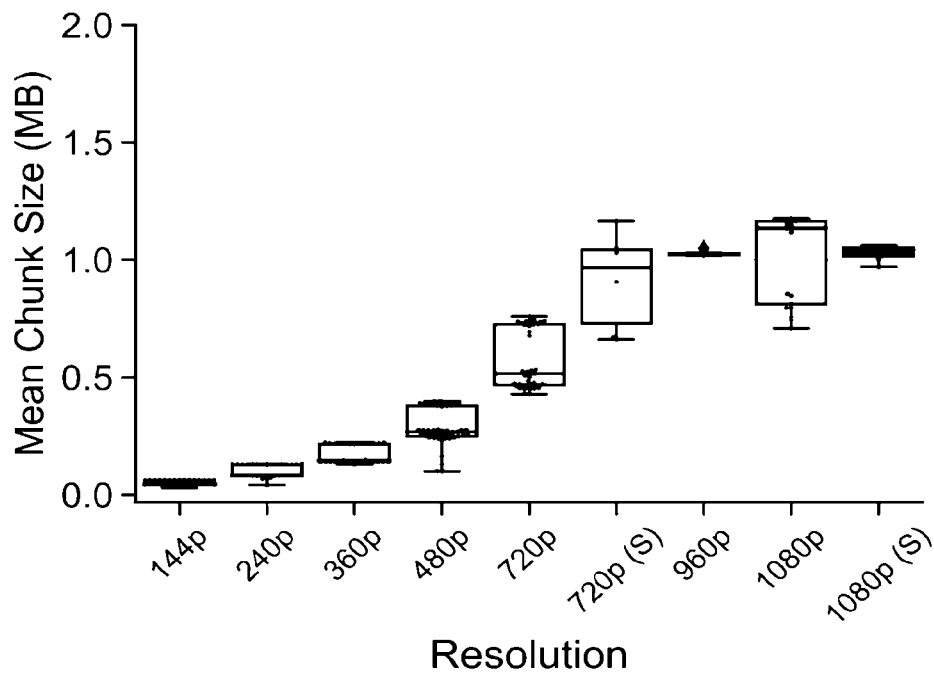
Figure 42:
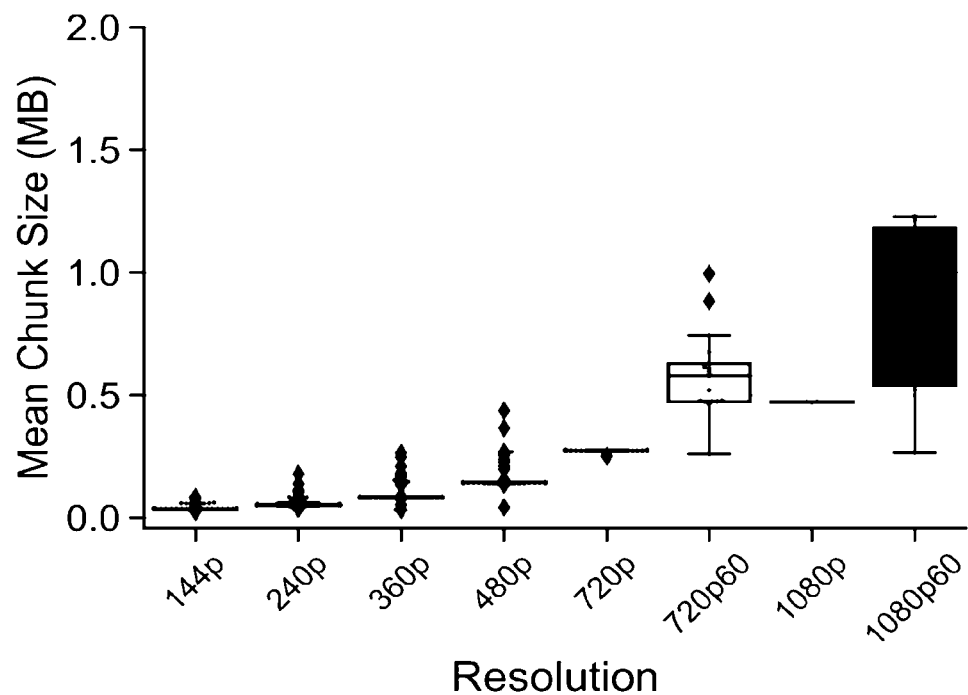
Figure 43:
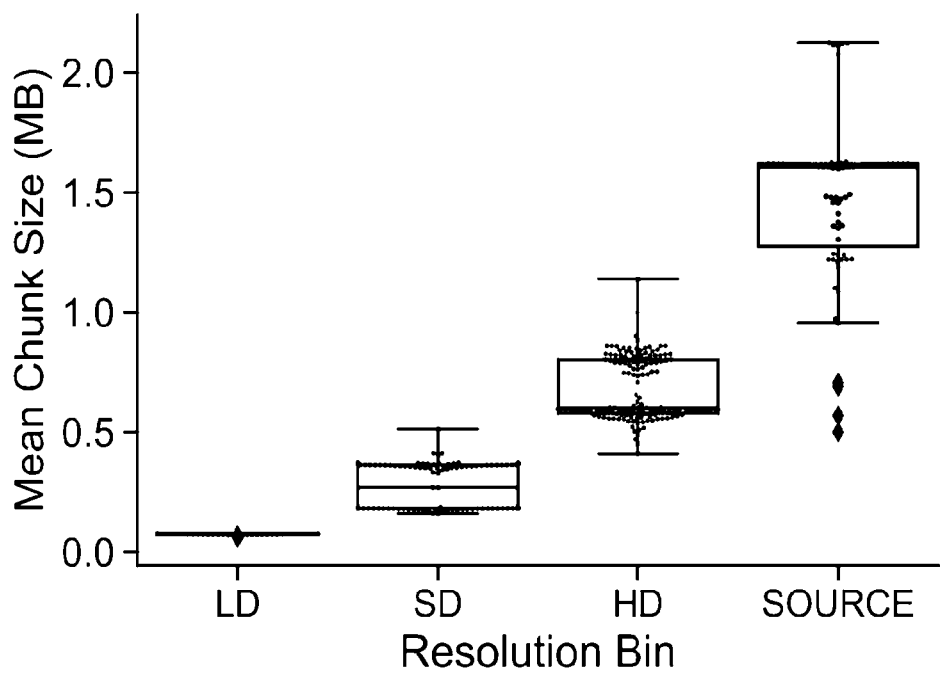
FIGS. 43 to 45 are graphs showing the distribution of chunk sizes as a function of video resolution bin, respectively for Twitch, YouTube, and Facebook.
Figure 44:
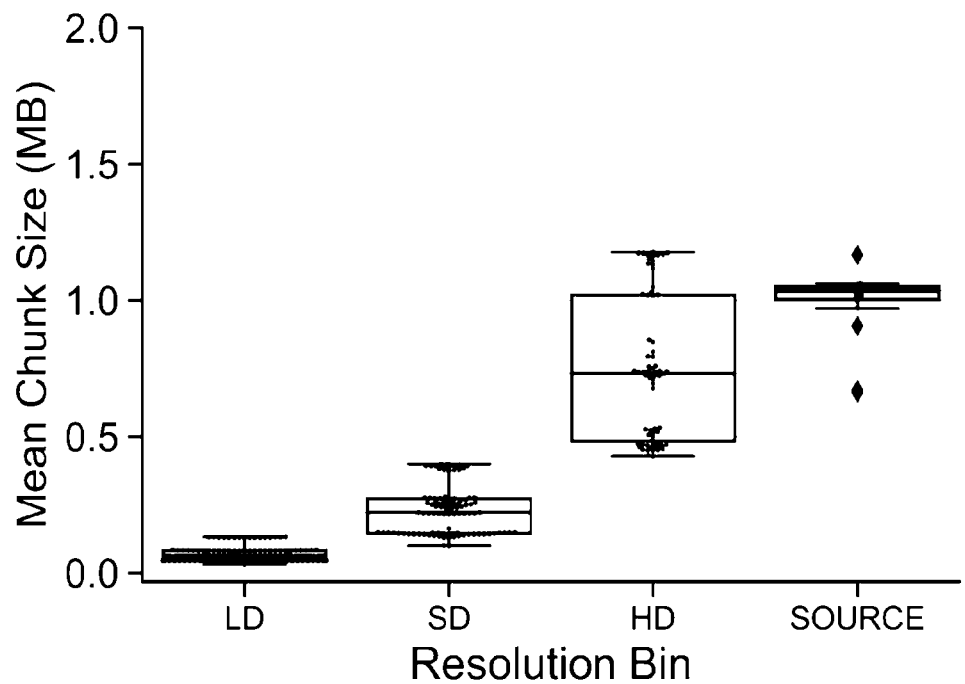
Figure 45:
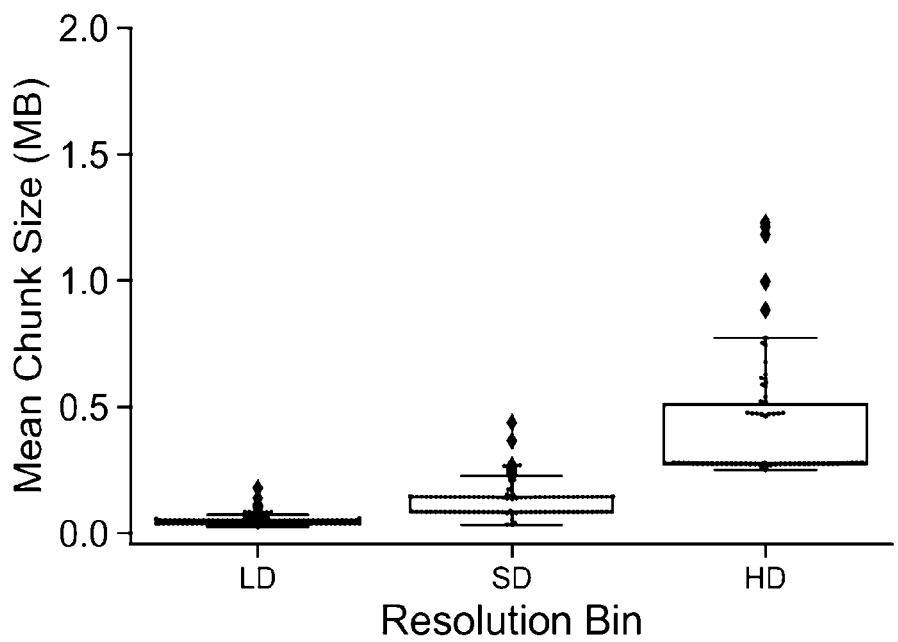

FIGS. 37 to 39 show the confusion matrices of binary classifiers across the three providers, respectively. It is evident from the confusion matrices that for Facebook and YouTube, the true positive rates are almost 100% which is not the case for Twitch. The inventors believe this is because the Twitch data consists of real users generated streams collected from the campus network (a wild environment), unlike data of YouTube and Facebook wherein their data is generated in our lab using our automated tools.

In particular, a lower true positive rate is observed for Twitch VoD—this is mainly caused due to VoD instances in low-bandwidth conditions where the client occasionally makes spurious video requests. The inventors believe that by enriching the dataset with many such instances, the model will be able to better learn those scenarios.

To further understand the impact of monitoring duration on the model accuracy, experiments were performed where different amounts of data were fed to the model, ranging from the first 5 seconds to the first 30 seconds with 5-sec steps. The results of the model for varying amounts of data are shown in Table 5. It can be seen that for Twitch, the model achieves an accuracy of 90.73% when fed with data from the first 5 seconds. This accuracy improves by increasing the amount of data—the highest accuracy is 97.12% when T=30. This seems intuitive as the model makes more informed decisions when it is fed with more data. For YouTube, a similar trend was observed, but with no further increase in accuracy after T=25. However, in case of Facebook, the model seems to well distinguish the two classes using just the first 5 seconds of data.

Estimating QoE of Live Video

The QoE of a live video stream can be captured by two major metrics, namely: video quality and buffer depletion (which can lead to stalls). Video quality is a subjective term, and can be measured using: (a) resolution of the video, (b) bitrate (no. of bits transferred per sec), and (c) more complex perceptual metrics known to those skilled in the art, for example MOSS and VMAF. Described herein is a method to estimate the resolution of the playback video, since the ground-truth data is available across the three providers. Also, resolution is typically reported (or available to select) in any live streaming. In addition to live video resolution, a method to detect the presence of buffer depletion is described, which is more likely to occur in the case of live streaming (compared to VoD), since a smaller buffer size is maintained on the client to reduce the latency.

Network-Level Measurement

For live QoE, it is necessary to collect more data from the chunk being fetched. For each chunk, the following features are extracted: requestTime, i.e., the timestamp of the request packet, requestPacketLength, chunkStartTime and chunkEndTime, i.e., timestamps of the first and the last downstream packets following the request (subtracting these two timestamps gives chunkDownloadTime), and lastly chunkPackets and chunkBytes, i.e., total count and volume of downstream packets corresponding to the chunk being fetched from the video server. During the playback of a live video stream, the chunk telemetry function operates on a per-flow basis in the flow quantifier component 106, which exports these features for every chunk observed on five-tuple flow(s) carrying the video. In addition, as described above, resolution and buffer health metrics reported by the video client were also collected.

Estimating Resolution

The resolution of a live video stream indicates the frame size of a video playback—it may also sometimes indicate the rate of frames being played. For example, a resolution of 720 p60 means the frame size is 1280×720 pixels while playing 60 frames per sec. For a given fixed size video segment, the video chunk size increases in higher resolutions as more bits need to be packed into the chunk. Note that the chunk size of a particular resolution can vary depending on the type of video content and the transcoding algorithm used by each content provider.

In work leading up to the invention, over 500 sessions of live video streaming played for each of the three content providers were analysed to better understand the distribution of chunk sizes across various resolutions. Four bins of resolution were considered, namely: Low Definition (LD), Standard Definition (SD), High Definition (HD), and Source (originally uploaded video with no compression, only available in Twitch and Facebook). The bins are mapped as follows, anything less than 360p is LD, 360p and 480p belong to SD, 720 p and beyond belongs to HD. If the client tags a resolution (usually 720 p or 1080 p) as Source, it is binned into Source. Such binning serves two purposes: (a) account for the similar visual experience for a user in neighboring resolutions and (b) provides a consistent way to analyze across providers. FIGS. 40 to 45 show the distributions of chunk sizes versus resolutions, as described further below. The resolution is estimated in two steps: (a) first, separating the video chunks, and (b) then, developing an ML-based model to map the video chunks size to resolution.

Separation of Video Chunks

Network flows corresponding to a live stream carry video chunks, audio chunks, and manifest files (e.g., for Facebook), and hence the video component needs to be separated out. Moreover, the flow quantifier component 106 also picks up some other small stray chunks that are not actual HTTP GET responses. A simple method was used to separate the stray chunks, namely by ignoring a chunk less than a threshold size (say, 5 KB)—both audio and video chunks are larger than 5 KB across content providers. The method to separate out audio chunks, however, depends on the provider—it can be developed by analyzing a few examples of streaming sessions and/or by decrypting SSL connections and analyzing the request urls.

Twitch usually streams both audio and video chunks on the same 5-tuple flow for live video streaming, and manifest files are fetched in a separate flow. Audio is encoded in fixed bitrate, and thus its chunk size is consistent ($\approx$35 KB). Further, Twitch video chunks of the lowest available bitrate (160 p) have a mean of 76 KB. Thus, video chunk separation is fairly simple for Twitch live streams, i.e., all chunks more than 40 KB in size. Facebook live video stream runs on a 5-tuple TCP flow which downloads manifest files, audio chunks, and video chunks. Manifests are very small files ($\approx$1.5 KB) and can be ignored safely using a threshold. Audio chunks, however, seem to be varying in size from 13 KB to 42 KB. Further, the mean chunk size of a 144 p video segment is about 60 KB, but it varies up to a lower bound of 40 KB. This means that the process cannot just ignore the chunks less than a threshold, say 45 KB as they might also be video chunks. However, with 144 p video, the audio chunks tend to be towards the smaller size ($\approx$13-17 KB). Thus, to isolate the video chunks, the simple k-means clustering algorithm (with k=2) was used to cluster the chunk sizes, and the cluster with highest mean was selected as representing the video chunks.

YouTube live usually uses multiple TCP/QUIC flows to stream the content consisting of audio and video chunks—Youtube operates manifestless. As described above, Youtube live operates in two modes, i.e., Low Latency (LL) with 2 sec periodicity of content fetch, and Ultra Low Latency (ULL) with 1 sec periodicity of content fetch. It was found that the audio chunks have a fixed bitrate (i.e., chunk size per second is relatively constant) regardless of the latency mode—audio chunk size of 28-34 KB for the ULL mode, and 56-68 KB for the LL mode. However, separating the video chunks out is still nontrivial as video chunks of 144 p and 240 p sometimes tend to be of smaller size than the audio chunks. To separate the audio chunks, Gutterman used the requestPacketLength as they observed that the audio segment requests were always smaller than the video requests. A similar approach was used for TCP flows, but it was found to be inaccurate in case of UDP QUIC flows as the audio chunk requests are sometimes larger than video chunk requests. To overcome this challenge, the k-means clustering model (with k=2) is used to cluster the request packet lengths, which results in two clusters. The mean chunk size of each cluster is then computed. Since, the mean audio chunk size per second should be (28-34 KB), the cluster whose mean chunk size falls within that range is deemed to represent the audio chunks, and the other cluster is deemed to represent the video chunks.

Analysis and Inference

After separating the video chunks for each provider, the distribution of chunk sizes across various resolutions at which the video is played is determined. FIGS. 40 to 45 are respective scatter plots of mean video chunk size in MB versus the resolution (i.e., actual value or binned value) in categorical values. Note that the mean chunk size is computed for individual playback sessions of duration 2 to 5 minutes. Further, the label (S) on the X axis represents that the client tagged it to be a Source resolution.

The following observations can be made from FIGS. 40 to 45: (a) video chunk size increases with resolution across the three providers; (b) chunk sizes are less spread in lower resolutions; and (c) chunk sizes of various transcoded resolutions (i.e., not the source resolution) do not overlap much with each other for Twitch, however overlap of neighboring resolutions becomes more evident in Facebook and YouTube. Such overlaps make it challenging to estimate the resolution.

TABLE 6

Accuracy of resolution prediction.

| | 5-fold cross validation. | |
|---|---|---|
| Provider | Resolution | Resolution bin |
| Twitch | 90.64% | 97.62% |
| Facebook | 89.85% | 94.07% |
| YouTube | 75.17% | 90.08% |

The Random Forest algorithm is used for mapping chunk sizes to the resolution of playback. The Random Forest model is able to create overlapping decision boundaries using multiple trees and use majority voting to estimate the best possible resolution by learning the distribution from the training data. Using the mean chunk size as input feature, two models are trained, i.e., one estimating the exact resolution, and the other estimating the resolution bin. 5-fold cross validations were performed on the dataset with 80-20 train-test split, and the results are shown in Table 6.

Results and Caveats

Overall, the resolution bin for every provider can be estimated with an accuracy of 90+%—obviously predicting the exact resolution gives a lower accuracy due to overlaps amongst the classes. In the cases of Twitch and Facebook, excluding Source resolution instances (which are widely spread) from the training dataset boosts the accuracy in predicting the exact resolution up to 95+%—the implication of doing so is that during the testing phase Source resolution instances are classified as the nearest transcoded resolution, which is still 720 p/1080 p. It can be seen that YouTube has the lowest accuracy among the three providers, possibly due to the use of variable bitrate encoding that causes significant amount of overlap in chunk sizes. For example, in one of our recorded sessions, it was observed that a 1080 p session fetched smaller chunks (very similar to 360 p sessions) which when investigated revealed that the session was filled with black screens and constant backgrounds which were being efficiently compressed and contained fewer bits corresponding to the same segment length in time. Further, as described above, there exist a few cases when Twitch client fetches segments every 4 seconds and YouTube client fetches segments every second in Ultra Low Latency mode (not shown). The chunk sizes for Twitch corresponding to a 4 second segment were double the chunk sizes corresponding to 2 second segment across all resolutions. However, the chunk sizes in case of YouTube were not halved and were varied across resolutions too—probably due to variable bitrate encoding. These caveats and challenges present in YouTube resulted in lower accuracies and require further study and building sophisticated and specific models to estimate with higher accuracy.

The models described above estimate the resolution (or bins) of the three providers by separating video chunks from the chunk telemetry data and passing the mean chunk size as input to the trained model. It is important to note that for a new provider, the telemetry logic and the model architecture remains the same, and only the video chunk filtration process would require manual analysis.

Predicting Buffer Depletion

Figure 46:
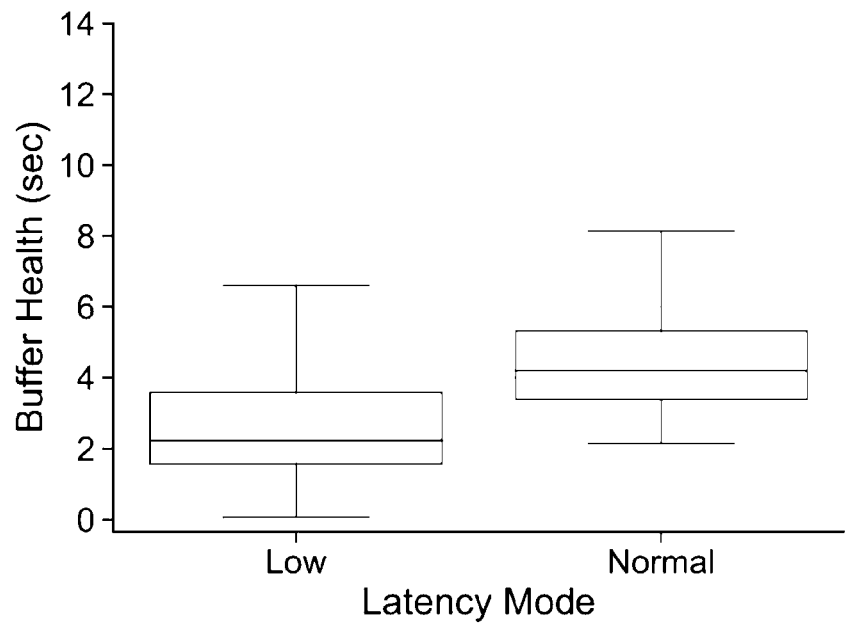
FIGS. 46 and 47 are graphs of buffer health (in seconds) for different latency modes, respectively for Twitch and YouTube live streaming.
Figure 47:
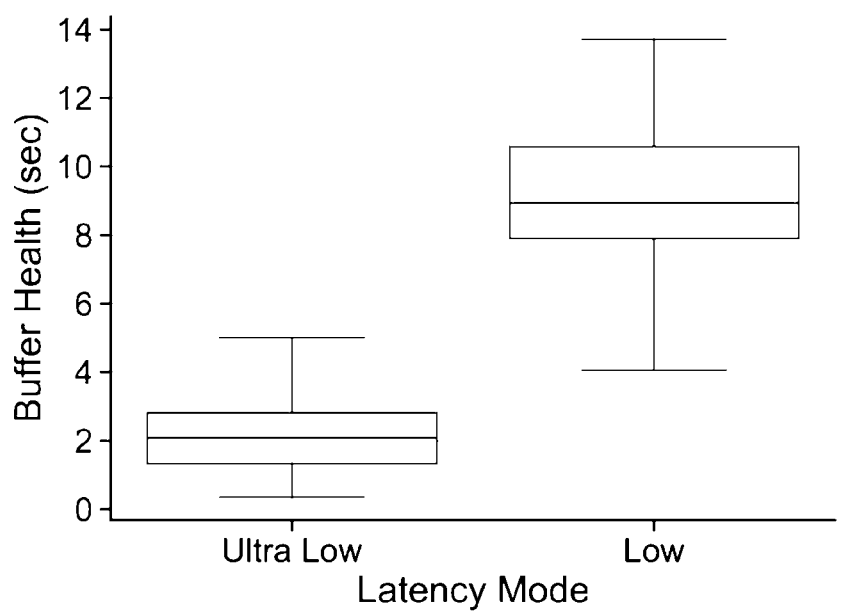

Buffer depletion occurs when the playback buffer draining is faster than filling up. Continued depletion of buffer leads to a video stall. It is an important QoE metric, especially for live streaming. FIGS. 46 and 47 show the client buffer health of Twitch and YouTube live streaming, respectively. It is seen that the buffer size corresponds to less than 4 seconds for Twitch Low-latency and YouTube Ultra-Low-latency. This means that even an unstable network for a few seconds can cause the buffer to deplete, leading to a stall event causing viewer frustration. To understand the mechanisms of buffering in live video streaming across the three providers, the flow quantifier component 106 was used to collect data for live streaming sessions (≈10 min) while imposing synthetic bandwidth caps using the network conditioner component 108 described above.

The network conditioner component 108 caps the download/upload bandwidth at a random value (between 100 Kbps to 10 Mbps) every 30 seconds. Live videos being played in the browser are accordingly affected by these bandwidth switches. It was found that if videos are played at auto resolution then the client (across all the three providers) avoids stalls most of the time by switching to lower resolutions. Therefore, the video streams were forced to play at one of the available HD resolutions (1080 p or 720 p) to gather data for buffer depleting events. Simultaneously, the chunk attributes from corresponding network flows were collected using the flow quantifier component 106.

TABLE 7

Accuracy of predicting buffer depletion.

| Provider | 5-fold cross validation |
| --- | --- |
| Twitch | 92.64% |
| Facebook | 85.13% |
| YouTube | 84.34% |

Figure 48:
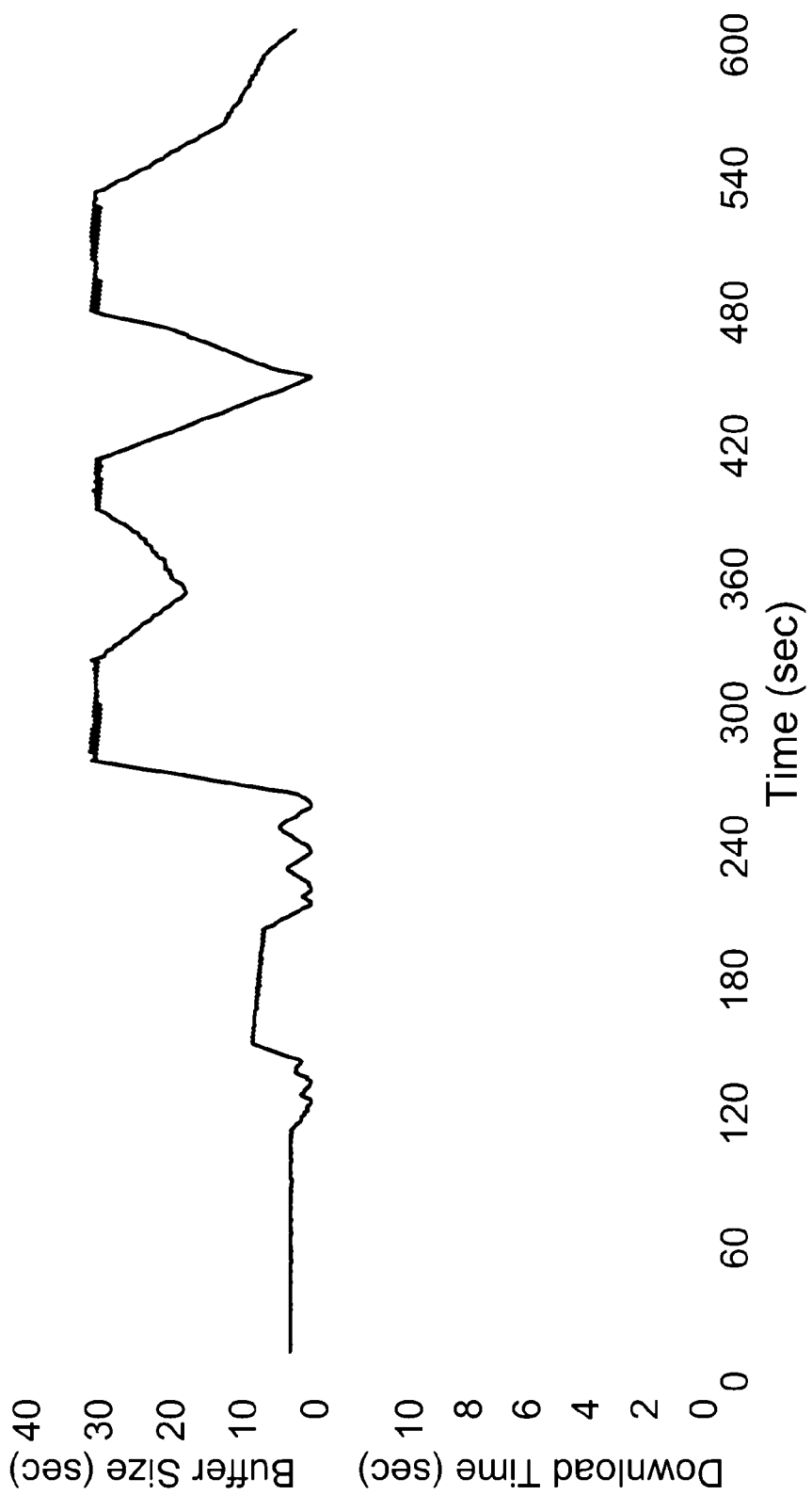
FIG. 48 is a set of two graphs of buffer size and chunk download time as a function of time for a Twitch live stream.

FIG. 48 depicts an example of live streaming from Twitch, and shows time traces of the buffer size and the chunkDownloadTime during playback. As Twitch live downloads segments every 2 seconds, the download time of each chunk must be less than or equal to 2 seconds. In the beginning, it is observed that the stream maintains a buffer size of 5 seconds with smooth playback during the first 100 seconds when the download times are very close to 2 seconds. Subsequently, due to change in network conditions between t=110 s and t=130 s, the download time displays several spikes up to values about 3 seconds. Consequently, the buffer size starts to deplete and hits zero, causing stalls. Shortly afterwards, when the network conditions improve, the buffer size rises to about 10 seconds, and the chunks are downloaded faster.

Another depletion event occurs between t=200 s and t=260 s with download times increasing to more than 4 seconds. Following that, the buffer size is increased to 30 seconds when the network conditions improve. It is important to note that even though increasing the buffer size causes higher latency, the video client does so to accommodate for future network inconsistencies. It can be seen that the depletion event between t=330 and t=360 does not cause stall due to sufficient buffer available. However, on the network, the download time continued to increase. Such instances are repeatedly observed each time the buffer depletes. Thus, it can be concluded that during bad network conditions, the chunks will take more time to download—this attribute is used to estimate the presence of a buffer depletion (probably leads to a stall). Further, sometimes the client stops responding for a while and does not download any chunk. To capture such behavior, the interChunkRequestTime, i.e., time difference between successive chunks requests was considered. Although this is for Twitch, the depletion events can be well captured using the above two attributes across other providers.

To predict the presence of buffer depletion, a labeled dataset of windowed instances was created from the playback sessions, and used to train random forest models. Each window (of duration 20 seconds) consists of the chunk metadata extracted via FlowFetch and a label indicating depletion. The window is labeled as depleting if the buffer size values obtained from the video player indicate depletion. Twitch and YouTube report their buffer size (in sec) on the client video statistics which can be enabled. Facebook, however, has no client reporting, and thus javascript functions were used to get the buffer value from the HTML5 video object that plays the live content. Across the three providers, the same two attributes were used: (a) chunkDownloadTime, and (b) interChunkRequestTime as input features. Similar to the models trained to predict resolution, three instances of RandomForestClassifiers were trained using the scikitlearn library in python to predict the presence of buffer depletion, given the chunk attributes collected on the network.

The dataset was divided into 80% training and 20% testing portions, and a 5-fold cross validation was performed to obtain the accuracy, the results being presented in Table 7. It can be observed that the model is able to detect buffer depletion for Twitch with a higher accuracy when compared to Facebook and YouTube. This is due to several behavioral caveats that Facebook and YouTube exhibit. It was observed that upon significant network degradation, Facebook starts requesting smaller chunks for the same resolution while YouTube creates new TCP flows that attempt to fetch chunks in parallel. Such behaviors cause the attributes to look normal, and hence the model gets confused. This clearly shows that predicting buffer depletion/stalls with a very high accuracy is a non-trivial task and requires more sophisticated methods (future work) to address these caveats in each of various providers.

The models described above use the chunk attributes collected from the network flows to predict resolution and buffer depletion of live video streams. The inventors emphasize that the model architecture does not depend on the providers, as the same input attributes are used to predict the QoE metrics across Twitch, Facebook, and YouTube, and thus it can be extended to other providers.

Figure 49:
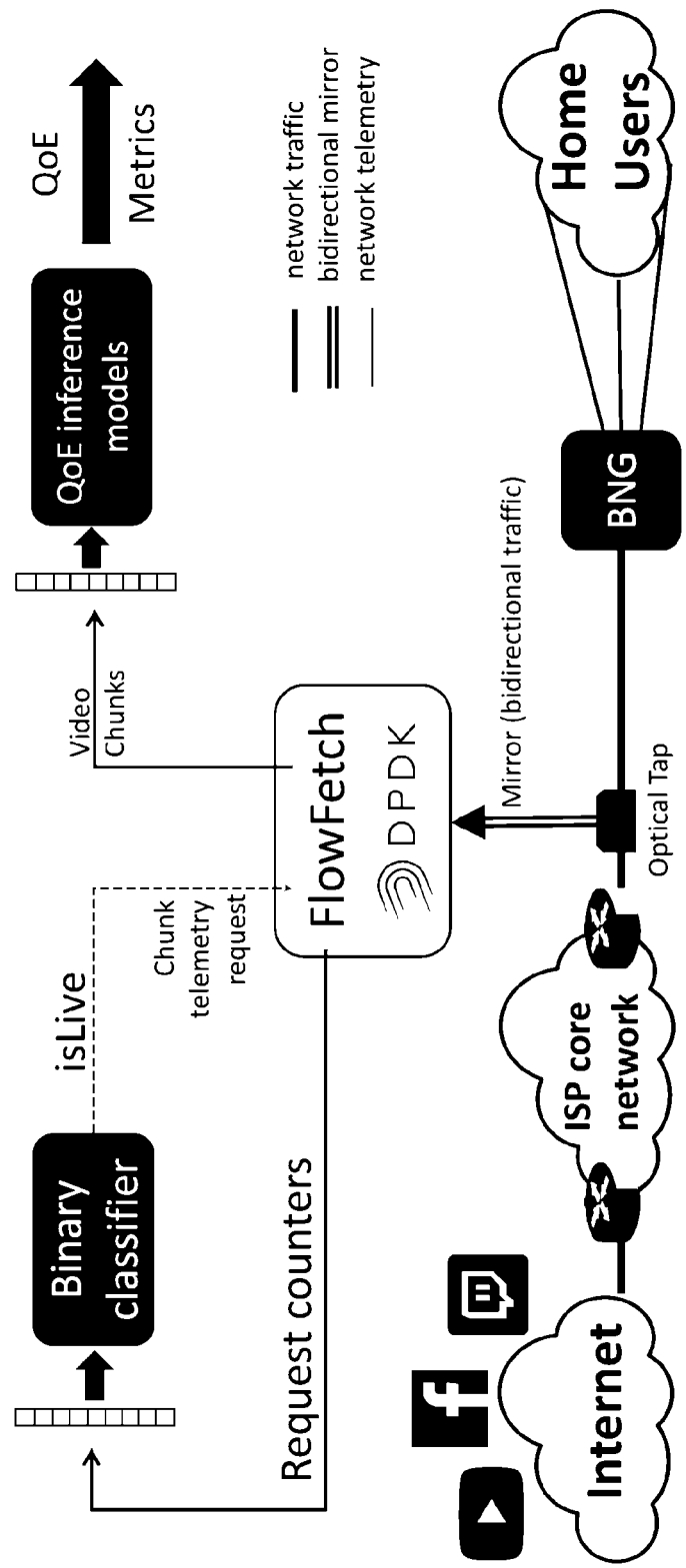
FIG. 49 is a schematic diagram showing the architecture of an apparatus for estimating QoE of a live video streaming service in accordance with an embodiment of the present invention installed in an ISP network.

FIG. 49 is a schematic diagram showing the architecture of an apparatus for estimating, in real-time, quality of experience (QoE) of a live video streaming service. This apparatus is deployed in an ISP network serving over 2,200 home subscribers. The ISP installed an optical tap between their core network and a Broadband Network Gateway (BNG) that aggregates traffic from about 2200 residences in a particular neighborhood. The apparatus works off this tap traffic, thereby receiving a copy of every packet to/from these residences, without introducing any risk to the operational network. Upstream and downstream traffic is received on separate optical tap links, and the aggregate bidirectional rate was observed to be no more than 8 Gbps even during peak hours. The traffic is processed by a Linux server running Ubuntu 18.04 with DPDK support for high speed packet processing. The flow quantifier component 106 interacts with DPDK to fetch raw packets, and executes the telemetry functions described above to export request packet counters and chunk features. Since the same tool was used during training, no further processing is required to use the described models on the data collected in real-time.

The operational flow of events in the apparatus is as follows: First, flows carrying video streams originating from Twitch, Facebook, and YouTube are detected by performing pattern matches on the SNI field present in the TLS handshake (as explained above). Every such flow is allocated the first telemetry function as described above, which exports the request packet counter values every 100 ms. This data is batched up in time (e.g. 30 sec for Twitch) to form the input vector for the LSTM-based binary classifiers and the model corresponding to the content provider is called. The resulting classification is reported back to the flow quantifier component 106, which then subsequently updates the telemetry function. If it is a live video, the second telemetry function is attached to the same flow to start exporting chunk features (as described above) to measure the QoE metrics. If the flow is classified as a VoD, the telemetry functions are turned off in this embodiment.

In order to report real-time QoE, the video chunks are batched up for a window of suitable size (as described below), and then the QoE inference models proceed to estimate resolution and predict buffer depletion for that window. As described above, the video chunks are first isolated using an algorithm specific to the provider, and then the mean chunk size of the window is computed and passed on to its corresponding random forest classifier, which predicts the resolution bin. For the described field trial, the inventors chose to predict the resolution bin (rather than the exact resolution) as it gives better accuracy and also presents a consistent view of QoE across providers. The same window of chunks is passed on to the models that detect buffer depletion. Predicted resolution and buffer depletion are then stored in a database, and can be visualized in real-time or post-processed for network resource provisioning. The window length is a parameter which needs to be chosen by the network operator considering the following tradeoff. A larger window (say 30 seconds or more) makes the system less responsive (takes longer time to predict), but produces a more accurate prediction of resolution since it averages out variability in the chunk sizes. On the other hand, a small window (say 5 seconds or less) enables the system to respond quickly, but would affect the detection of buffer depletion since a very few number of chunks will be present in the window. In the described embodiment, the system window length was empirically tuned to 20 seconds, which ensures that enough chunks are captured to make a reasonably accurate prediction of both QoE metrics.

TABLE 8

User engagement with live and VoD streaming.

| Provider | # streams | | Avg. duration (sec) | |
| --- | --- | --- | --- | --- |
| | Live | VoD | Live | VoD |
| Twitch | 17,044 | 1,234 | 404 | 296 |
| Facebook | 29,078 | 266,540 | 271 | 142 |

Insights

Data was gathered in the field over a one week period spanning 3 am on the 1st of January 2020 to 3 am on the 8th of January 2020. Of the 2245 active customers during that period, approximately 10% watched Twitch totaling 2,014 hours spanning 18,278 sessions, while about 99% watched Facebook video totaling 12,702 hours spanning 295,618 sessions. The apparatus was able to analyze the traffic in real-time to distinguish live video streams and measure their QoE. Key insights obtained from the field trial are described below in terms of model accuracy, user engagement, and performance of live streams in terms of QoE metrics over the one week. First, the classification accuracy of the model in the wild is evaluated for Twitch, using the ground truth obtained from SNIs for live and VoD streams. The LSTM-based model classified the 18,278 Twitch video streams and was able to isolate live video streams with an accuracy of 96.52%. Since Facebook SNIs do not distinguish between live and VoD streams, the ground truth is unknown and hence the accuracy of the classifier models cannot be validated for Facebook.

Second, the models show that the usage of live streaming content on Twitch and Facebook is substantial. As shown in Table 8, Twitch carries 15 times more live streams than VoD (as expected), with an average duration per live stream of around 6.7 minutes, and 95-th percentile of 26.7 minutes. In the case of Facebook, there are many more VoD than live sessions; however live streams are watched for almost twice as long on average and have a 95-th percentile of 13.4 minutes, indicating higher user engagement. Further, it was found that an average viewer watches 76 minutes of Twitch per day indicating a very high user engagement with this live streaming platform. These observations emphasize the fact that live streaming is becoming an increasingly important Internet application, requiring ISPs to become more aware of live streaming traffic patterns and associated experience for their subscribers.

Figure 50:
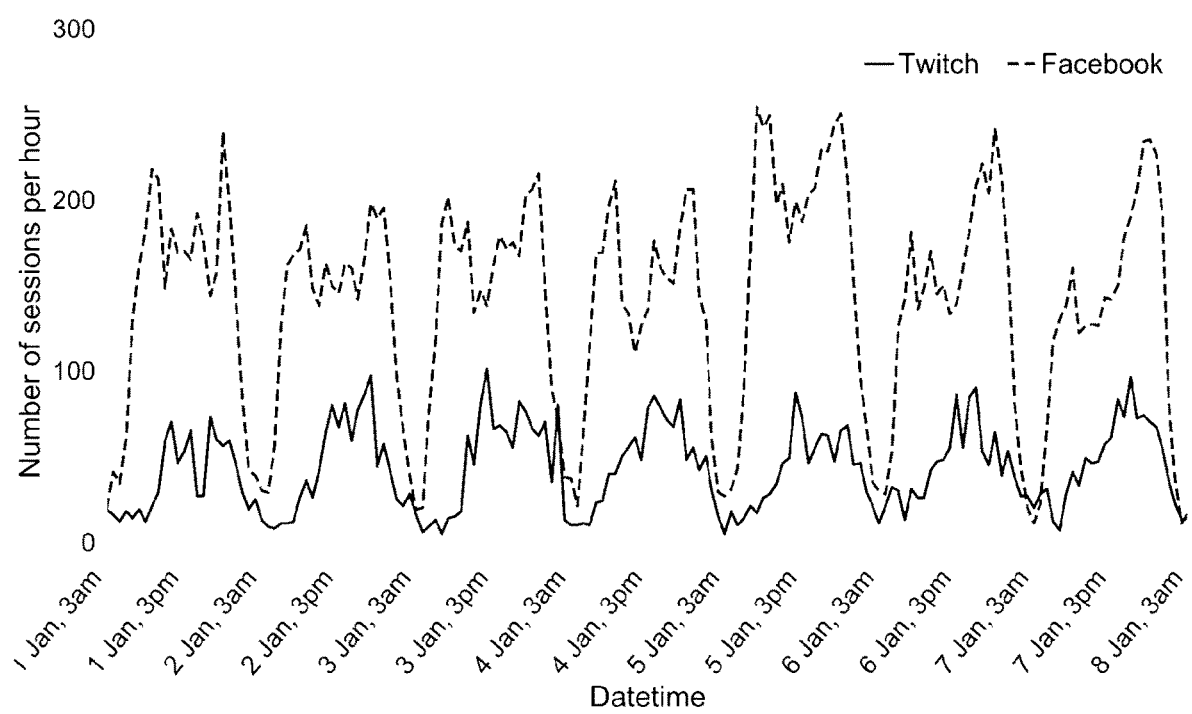
FIG. 50 is a graph of the number of live streaming sessions per hour as a function of date-time in the ISP network.
Figure 51:
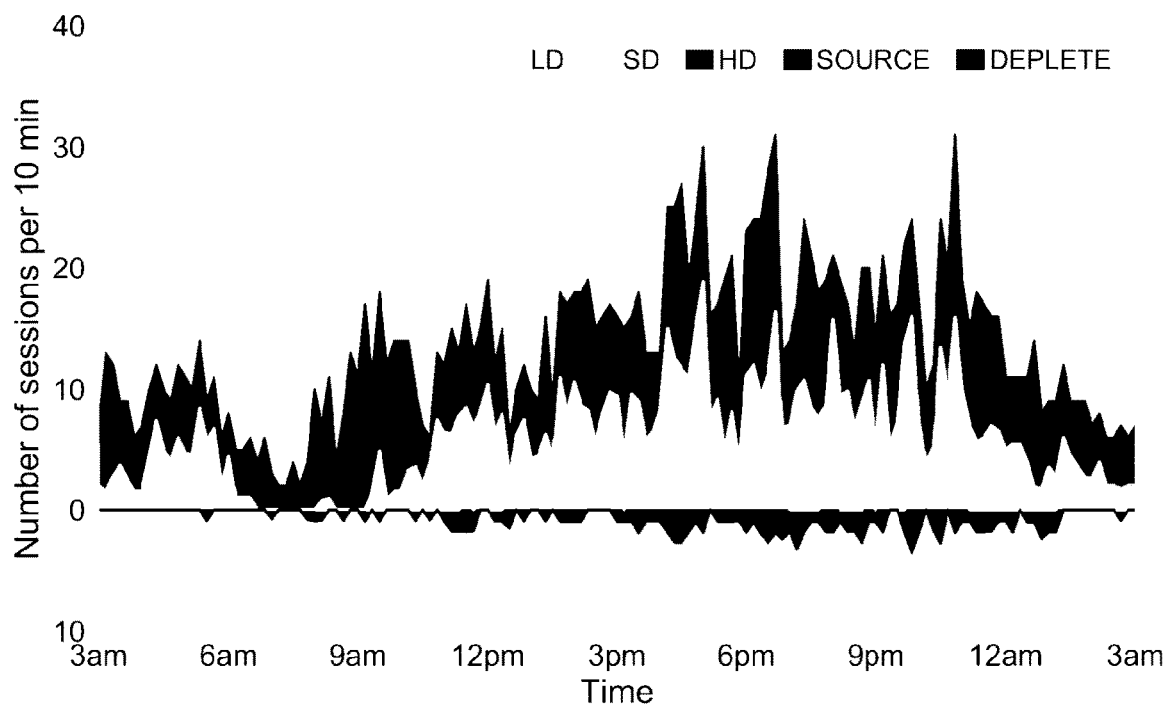
FIGS. 51 and 52 are graphs showing the daily QoE as a function of the time of day for different video resolutions, respectively for Twitch and Facebook live streaming; the QoE in this example is in terms of number of sessions with buffer depletions, shown as negative values below the x-axis, with the positive values above the x-axis representing the number of sessions of each video resolution (LD, SD, HD, and source) as a stack plot.
Figure 52:
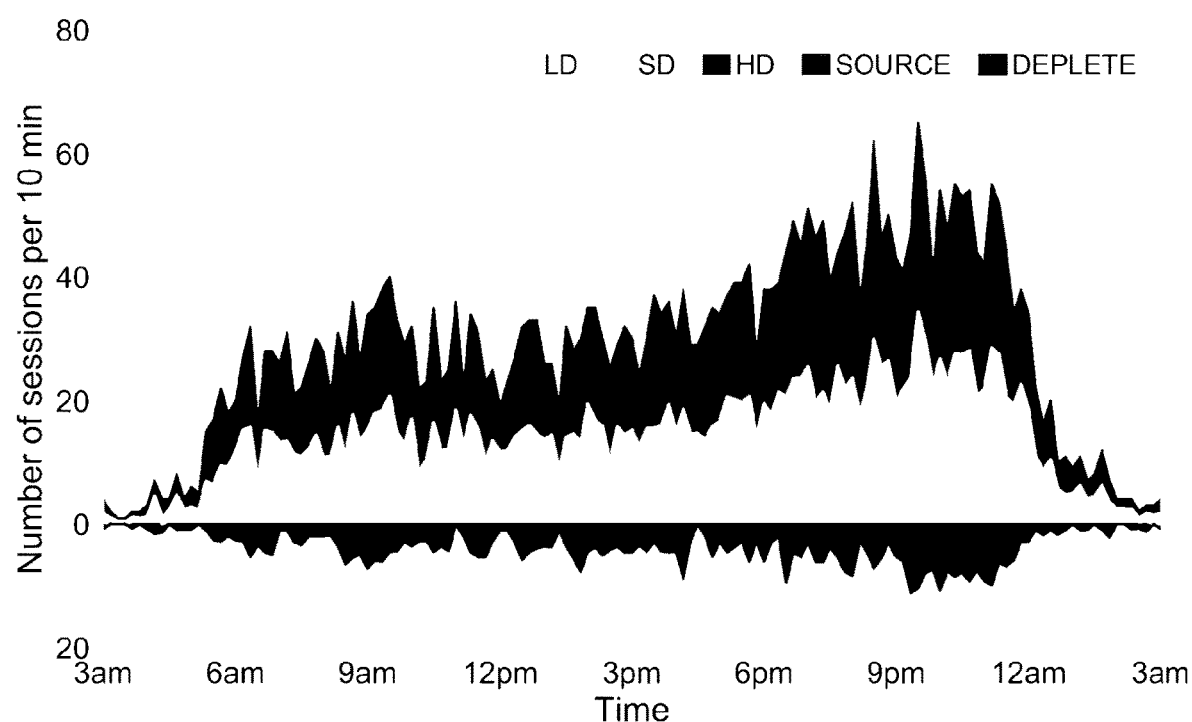

Finally, the aggregate usage patterns and QoE metrics collected from the deployment are shown in FIGS. 50 to 52. A daily pattern in the number of sessions watched per hour across both Twitch and Facebook is apparent from FIG. 50. Though Facebook Live has more streams than Twitch, the aggregate hours watched is roughly similar (2188 for Facebook versus 1912 for Twitch). It is also interesting to observe that Facebook usage peaks in the morning and evening, with a dip in the middle of the day; by contrast, Twitch usage starts later in the day, and continues late into the night (probably unsurprising given that Twitch is predominantly a platform for video garners who tend to be up at nights). FIGS. 51 and 52 show, as positive values above the x-axis, the total number of sessions and their constituent video resolutions for 24 hours starting from 3 am on 7th January for Twitch and Facebook, respectively. The corresponding QoE values in terms of the numbers of sessions with buffer depletions are shown as negative values below the x-axis. The following observations can be made: (a) A majority of Twitch video streams are played in SD and HD resolutions (40% and 31%, respectively) throughout the day, and this is similar for Facebook video streams (34% SD and 37% HD); (b) Video streams for both the providers seem to have multiple buffer depletion events in the evening peak hours between 6-10 pm when most people are active on the network leading to congestion; (c) Around 40% of the sessions that experience a buffer depletion (as detected by our model) also dropped their resolution immediately thereafter, indicating that Facebook and Twitch have highly adaptive resolution algorithms. Further analysis can be carried out on the collected metrics to gain insights such as identifying users who continuously have poor QoE and/or abandon viewing after multiple resolution switch or buffer depletion events. Such information would be useful to the network operator in predicting support calls and churn. It will be apparent from the above that the described apparatus can perform real-time in-network identification and experience measurement of live video streaming, and can be used by the network operator to better provision their network and/or dynamically prioritize traffic.

Self-Driven Network Assistance

The apparatuses and processes described above estimate in real-time the QoE of sensitive online services/applications such as video-on-demand streaming and live video streaming. The apparatuses and processes described below extend these by automatically reconfiguring the network to improve the experience of poorly performing applications. To realize this 'self-driven' network assistance, three tasks or sub-processes are executed automatically and sequentially: (a) "measurement", (b) "analysis and inference", and (c) "control", as represented by the closed-loop in FIG. 21.

In the described architecture, a programmable switch 2102 is placed inline on the link between the access network 2104 and the Internet 2106. In a typical ISP network, this link is the bottleneck (and hence the right place to do traffic shaping) as it multiplexes subscribers to a limited backhaul capacity. First, network traffic of a user application of interest (e.g., a video streaming application) is mirrored to the flow quantifier 106, which as described above in the context of the first embodiment, generates flow activity data representing quantitative metrics of network transport activity of the network flows of the user application. Next, this flow activity data is used by a corresponding trained classifier 302 (trained by way of a previously generated corresponding state classification model 204) to determine the current state of the application (analysis and inference) and to update a corresponding state-machine 2108 accordingly. If a critical event of the application behaviour (e.g., video re-buffering) is detected by the state-machine 2108, then an assist request is sent to a user experience controller (also referred to herein as the "actor module") 2110. Lastly, the actor requests changes (e.g., queue provision) to a switch controller 2112, which in turn sends "FlowMod" messages to the switch 2102, executing the corresponding action.

Figure 22:
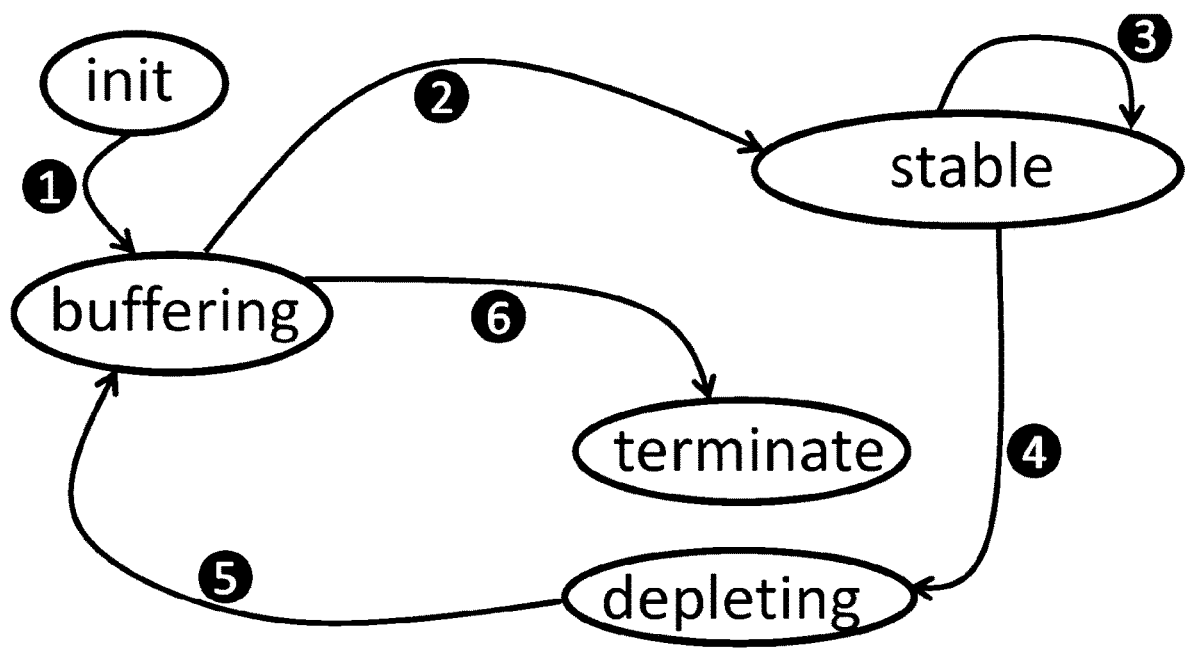
FIG. 22 is a state diagram showing example performance states and state transitions for a video streaming application.

In order to automatically infer the quality-of-experience, QoE of an application, its network behaviour is modelled using a corresponding state machine 2108. Every application begins in a "start" state when its first packet is seen on the network. Subsequently, it transitions to different states, depending on the type of application. For example, FIG. 22 shows an example of a performance state-machine for a video streaming application as a sequence of the following states: init→buffering→stable→stable→depleting→terminate. Depending upon the policies of the network operator for video streaming, a required action can be taken automatically at any of these states (e.g., when it is found at depleting state, a minimum amount of bandwidth is provisioned to the corresponding flows until the application returns to its stable state).

Data Collection

To realize this system architecture, it is necessary to acquire network flow activity data for the applications of interest, labelled by their behavioural states. This enables the network operator to train classifiers and build state machines that can infer application behaviour without requiring any explicit signals from either the application provider or the client application. In the described embodiment, the high-level architecture of the tool for generating this application dataset is the same as that shown in FIG. 1 and described above in the context of the Netflix QoE apparatus.

Labelling Application States

As described above, important application states need to be labelled so that the state machine can determine when a network assist is required. For example, stall/buffer-depletion, high latency, and lag/jitter states are crucial states for video streaming, online gaming, and teleconferencing applications, respectively. Having identified the important behavioural states of an application, the orchestrator 102 is configured to detect and label these states.

Measuring Network Activity

The network activity of applications can be measured in several ways, ranging from basic packet capture (expensive recording and processing) to proprietary HTTP loggers combined with proxies (limited scalability). In contrast to these approaches, the described embodiments strike a balance by capturing flow-level activity at a configurable granularity using conditional counters. This stores less data due to aggregation on a per-flow basis, and can be deployed using hardware accelerators like DPDK or can be implemented in the data-plane using P4, as described in P. Bosshart et al., *P4: Programming protocol-independent packet processors*, ACM SIGCOMM Computer Communication Review 44, 3 (2014), 87-95.

The flow quantifier 106 records flow-level activity by capturing packets from a network interface, the output records forming the training dataset. Each flow (i.e., 5-tuple) has a set of conditional counters associated with it: if an arriving packet satisfies the condition, then the corresponding counter increments by a defined value. For example, a counter to track the number of outgoing packets greater than a volume-threshold (important to identify video-streaming experience). Similarly, other basic counters (without any explicit condition) to track volume of a flow can be defined. The set of counters are exported at a configurable granularity (e.g., every 100 ms)—it depends on the complexity of application behaviour.

State Classification and State Machine

Figure 21:
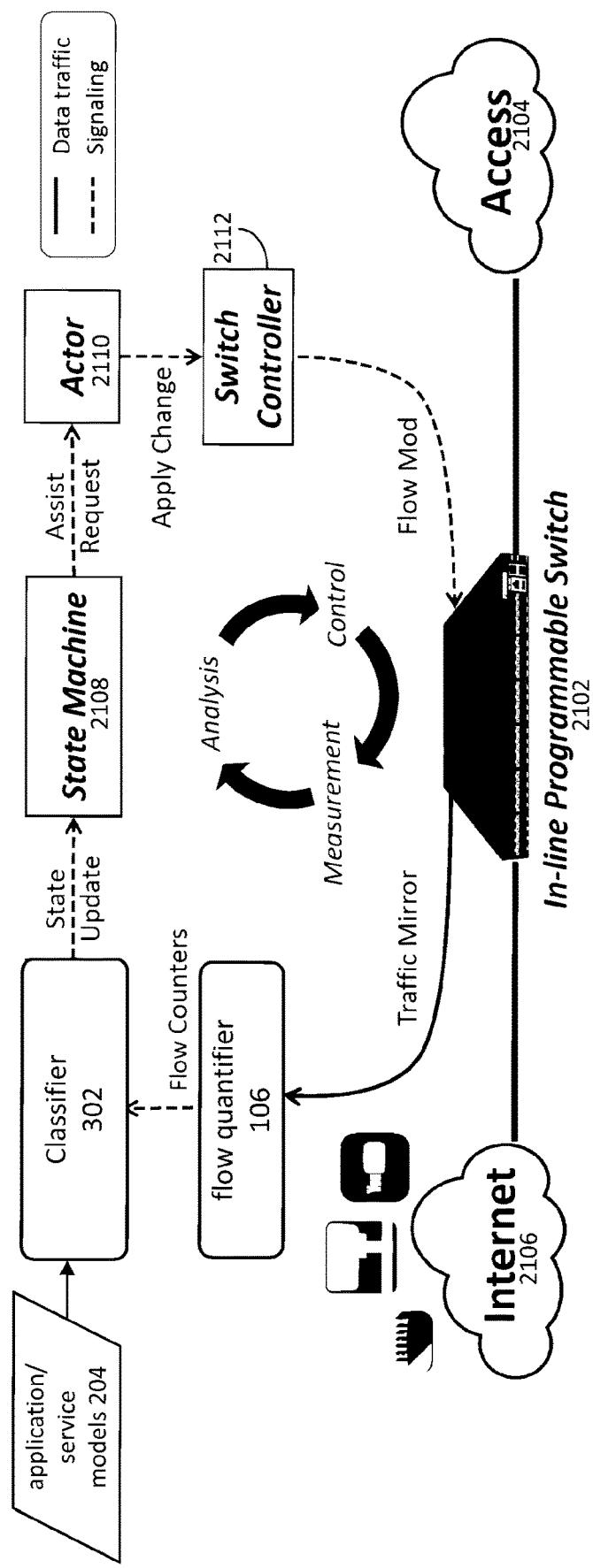
FIG. 21 is a block diagram of an apparatus for estimating quality of experience (QoE) of a user application in accordance with one embodiment of the present invention.

The training set consisting of multiple labelled application runs is used to train and generate a corresponding model 204 that is subsequently used by a classifier 302 to classify the real-time application state from its network activity patterns. Certain states can be identified from prior knowledge of the application (e.g., video streaming always starts in buffering state). For other states that require pattern recognition on the network activity, it is necessary to extract important traffic attributes computed over a time window (of, say, 10 seconds) and build an ML-based classifier. Thus, the State Classifier 302 requires rule-based and/or ML-based models 204 and together they classify the application's current state that is passed as an update to the state-machine 2108, as shown in FIG. 21.

State Machine Generation

The state machine 2108 of the application is generated using the behavioural state labels available in the dataset along with corresponding transitions. It is noted that all possible transitions might not occur for an application during data collection, and hence it may be necessary to edit the state machine 2108 manually prior to its deployment in the apparatus of FIG. 21.

Experience-Critical Events

The state machine 2108 that models application behaviour needs to be annotated with Experience-Critical (EC) events that require assistance from the network. When such events occur within the state machine 2108, a notification is sent out to the Actor module (in FIG. 21). There might be multiple types of EC events. For instance, a transition to a "bad" state (e.g., buffer depletion for video streaming) or spending long time in a certain state (e.g., prolonged buffering) indicate QoE impairments, and thus are considered as EC events.

Actor: Enhancing Experience

Upon receiving assist requests from the State Machine 2108, the user experience controller or "Actor" 2110 is responsible for enhancing the performance of the application via interaction with the Switch Controller 2112. Typically the application's poor performance can be alleviated by prioritizing its traffic over others in a congested scenario. This can be done in multiple ways, including but not limited to: (a) strict priority queues where priority levels are assigned depending on the severity of the assist requests, (b) weighted queues where more bandwidth is provisioned to applications in need, or (c) use packet colouring and assigning different drop probabilities to different colours, e.g., a two-rate three-color WRED mechanism. Assisting methods are confined by the capability of the programmable switching hardware 2102 and the APIs it exposes. Nonetheless, the actor 2110 needs to request the switch controller 2112 to map the flow(s) of the application to the prioritizing primitive (changing queues or coloring using meters, etc.). Note that the assisted application needs to be de-assisted after certain time for two reasons: (a) to make room for other applications in need (to be prioritized), and (b) the performance (QoE) of the assisted application has already improved. However, doing so might cause the application to suffer again and thus results in performance oscillation (i.e., a loop between assistance and de-assistance). To overcome this, the de-assisting policy is defined by the network operators using the network load (i.e., link utilization). A primitive policy is to de-assist an application when the total link utilization is below a threshold of, say, 70%. This ensures that the de-assisted application has enough resources to (at least) maintain the experience, if not improve it. These policies can be further matured, depending on the number and type of applications supported and also various priority levels defined by the operator.

Assisting Sensitive Applications

To demonstrate the performance of the state-based apparatus, it was used to automatically assist two applications, namely, Netflix (representative of bandwidth sensitive video streaming) and ping (representative of latency sensitive online gaming). Although ping is relatively simple when compared to actual gaming applications, the requirement of the application still remains the same, i.e., low latency.

Dataset and State Classification

Dataset

The data collection tool shown in FIG. 1 was used to orchestrate sessions of Netflix video streaming and ping as follows. For Netflix, a web client on a chrome browser (i.e., the Application block in FIG. 1) was controlled by a Python script (i.e., the Orchestrator) using the Selenium web automation library as described above in the context of the first embodiment. A bad experience was defined in terms of buffer depletion, which often also leads to bitrate degradation as the video client adapts to poor network conditions. Prior studies have found that chunks transfer in a flow starts by an upstream request packet of large size (other small upstream packets are generally ACKs for the contents received). To capture such transfers, three conditional counters were employed: "ByteCount" transferred both downstream and upstream, "PacketCount" both downstream and upstream, and "RequestCount" for upstream packets greater than a threshold (say, 500 Bytes). These flow counters were collected every 100 ms of over 6 hours of Netflix video playback.

For gaming (represented by ping), the experience metric of latency was measured both at the client-end and in the network using the flow quantifier 106. On the client, a python wrapper was used to read the output of the ping utility. On the network, the flow quantifier 106 keeps track of the ICMPv4 flow using the 4-tuple sourceIP, destIP, Protocol and ICMP ID. It calculates the latency by subtracting the timestamp in request and response packets. The latency measured from the network was slightly lower than measured on client, because it does not include the latency in the access network.

Classifying Buffer-State for Video Streaming

Figure 23:
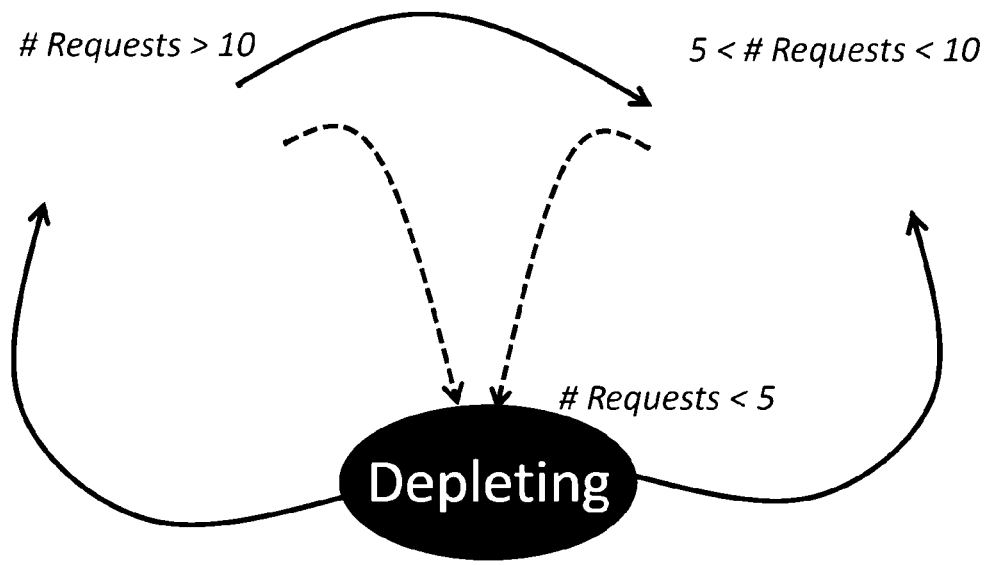
FIGS. 23 and 24 are respective state diagrams for state machines for sensitive applications, respectively a buffer-based state machine for video streaming, and a latency-based state machine for online gaming.

In the dataset, it was observed that the Netflix client: (a) in the bufferstable state, it requests one video chunk every 4 seconds, and an audio chunk every 16 seconds, (b) in the buffer-increase state, it requests contents at a rate faster than playback, and (c) in the buffer-depleting state, it requests fewer chunks than were being played. Given this knowledge of Netflix streaming, a decision tree-based classifier was applied to the number of requests over a window of 20 seconds. To maintain the buffer level over this window, the Netflix client should ideally request for 7 chunks, i.e., 5 video chunks (of 4 second duration) and 2 audio chunks (of 16 second duration). Thus, this naturally indicates a threshold to detect buffer increase (>7 chunk requests) and buffer depletion (<7 chunk requests). However, in practice, deviations from ideal behaviour are observed—therefore, the decision tree was modified by slightly broadening the threshold values as depicted in FIG. 23.

Classifying Latency-State for Gaming

Figure 24:
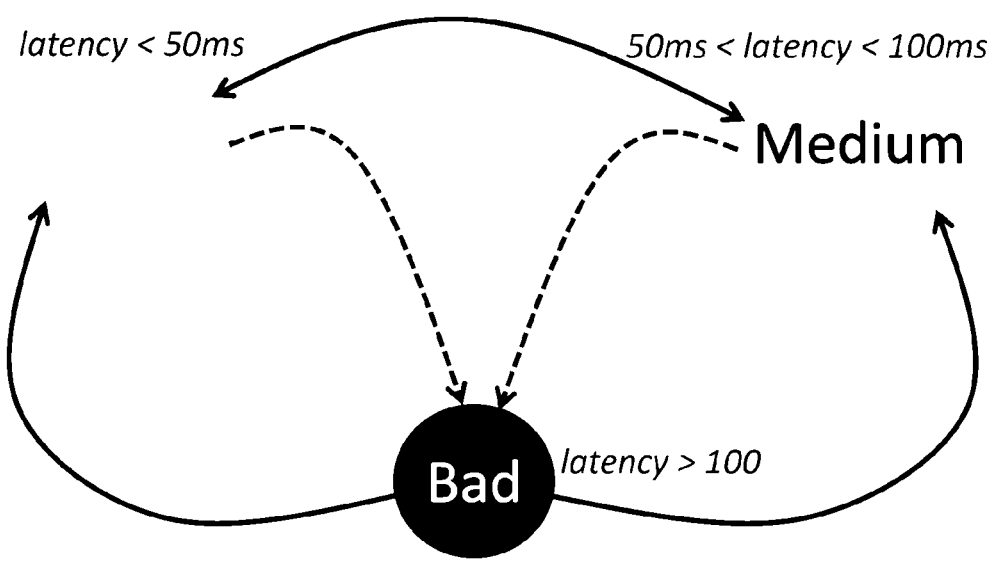

In multiplayer online gaming applications, an important experience metric is latency, which represents the end-to-end delay from the gaming client to either the servers or other clients (i.e., peers). The latency (also referred to as "lag", "ping rate", or simply "ping"), arises by the distance between end-hosts (which is static), and congestion in the network (which is dynamic) which causes packets to wait in queues. The described apparatus and process attempt to improve gaming performance by reducing the delays in congested networks. Although the latency requirements differ, depending on the type of game being played, typically at least a latency of under 100 ms is desired to have a smooth experience—although top gamers prefer a latency of at most 50 ms. Using the latency measurements, three states of gaming were defined as "good" (0-50 ms), "medium" (50-100 ms) and "bad" (>100 ms), as depicted in FIG. 24—these latency ranges were reported by players of various popular gaming applications such as Fortnite, Apex Legends and CS:GO. Any transition to the bad state triggers a notification requesting an assist to the actor 2110.

Performance Evaluation

With state machines 2108 and classification models 204 built, the efficacy of the apparatus and process is demonstrated by implementing the end-to-end system from measurement to action in a self-driving network, as shown in FIG. 21. The lab setup consists of a host on the access network running Ubuntu 16.04 with a quad-core i5 CPU and 4 GB of RAM. The access network 2104 is connected to the Internet 2106 via an inline SDN enabled switch 2102 (being a Noviflow model 2116 in the described embodiment). On the switch 2102, the maximum bandwidth of the ports was capped at 10 Mbps. Three queues (i.e., A, B, and C) were pre-configured on two ports (i.e., P1: upstream to the Internet and P2: downstream to the access) and are used to shape the traffic, assisting sensitive applications. Queue A is the lowest-priority default queue for all traffic, and is unbounded (though maximum is still 10 Mbps). Queue B has medium priority, and Queue C has the highest priority. This means that packets of the queue C are served first, followed by the queue B, and then the queue A.

Figure 25:
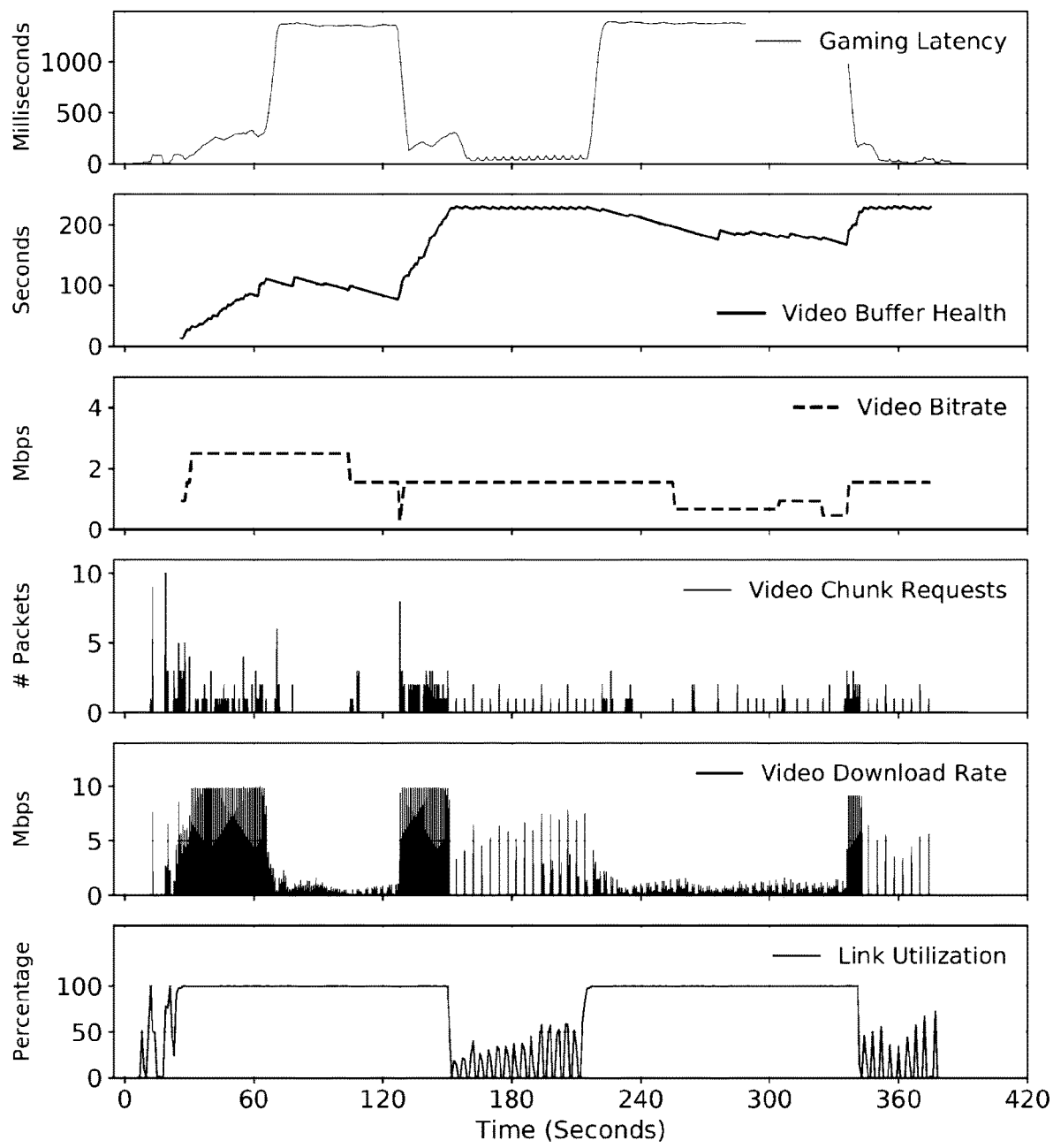
FIGS. 25 and 26 are respective sets of graphs illustrating the performance of sensitive applications without and with network assistance, respectively.

A scenario with three applications was configured—with the Netflix client on a Chrome browser representing a video streaming application, the ping utility representing gaming, and the iperf tool used to create cross-traffic on the link. First, the applications were used without any assistance, and wherein all network traffic is served by one queue without prioritizing any traffic (i.e., best-effort)—the resulting performance of applications being shown in FIG. 25. The flow of events is as follows. At t=0, a ping to 8.8.8.8 was initiated—this traffic persists during the entire experiment (400 seconds). At t=10, the chrome browser was automatically launched and logged in to Netflix. Ping latency (shown by solid orange lines), which was initially at around 2 ms, starts increasing to 100 ms once the user logs into Netflix. The virtual user loads a Netflix movie ("Pacific Rim") and starts playing it at t=30. From this point onward, the ping latency rises up to 300 ms, and Netflix requests chunks and transfers contents at its peak rates ("video chunk requests" plot)—the link utilization hits 100%, as shown in the bottom plot. On the Netflix client, the video buffer-health is increasing slowly (second plot from the top), and the client elects the highest available bitrate of 2560 kbps (third plot from the top).

At t=70, a downstream flow of UDP traffic was initiated with a max rate of 9 Mbps using the iperf tool to create congestion. Both sensitive applications immediately start to suffer with the link utilization remaining at 100%. The buffer level on the client starts depleting from 110 to 100, after which the Netflix client switches to a lower video bitrate. The video client does not request enough chunks as shown by a gap in the purple curve. It only starts sending out requests again at around t=100, when the video bitrate dropped. The ping suffers even more and the latency reaches to 1300-1400 ms. Once the download finishes at t=130, the video starts to ramp up its buffers, but at a lower bitrate (because it just detected poor network conditions) and reaches the stable buffer value of 4-minute at around t=140. The ping also displays a better performance with the latency between 300-400 ms (during video buffering), but it gets even better dropping to 100 ms when the video enters into its stable state. At t=220, another UDP traffic stream was initiated, which makes the applications suffer again. This time, the video application state transitions into the buffer-depleting state from the bufferstable state. Again, there are gaps in video chunk requests, clearly indicating a decrease in buffer, and subsequently the video download rate falls below 2 Mbps. Ping reacts similarly by reporting the latency of over a second. Upon completion of the download, both sensitive applications display acceptable performance.

A second scenario demonstrates automatic assistance from a self-driving network. In this scenario, the highest priority queue C was allocated to gaming applications, which will ensure reduction in latencies. The video streaming flows, when requiring assistance, are served by queue B. Note that the max-rate on the queue B was capped at 4 Mbps—when exceeded, the priority of exceeded packets becomes equal to of the queue A. If streaming video is given a pure priority over the default traffic, it will throttle the default traffic to almost 0.

Figure 26:
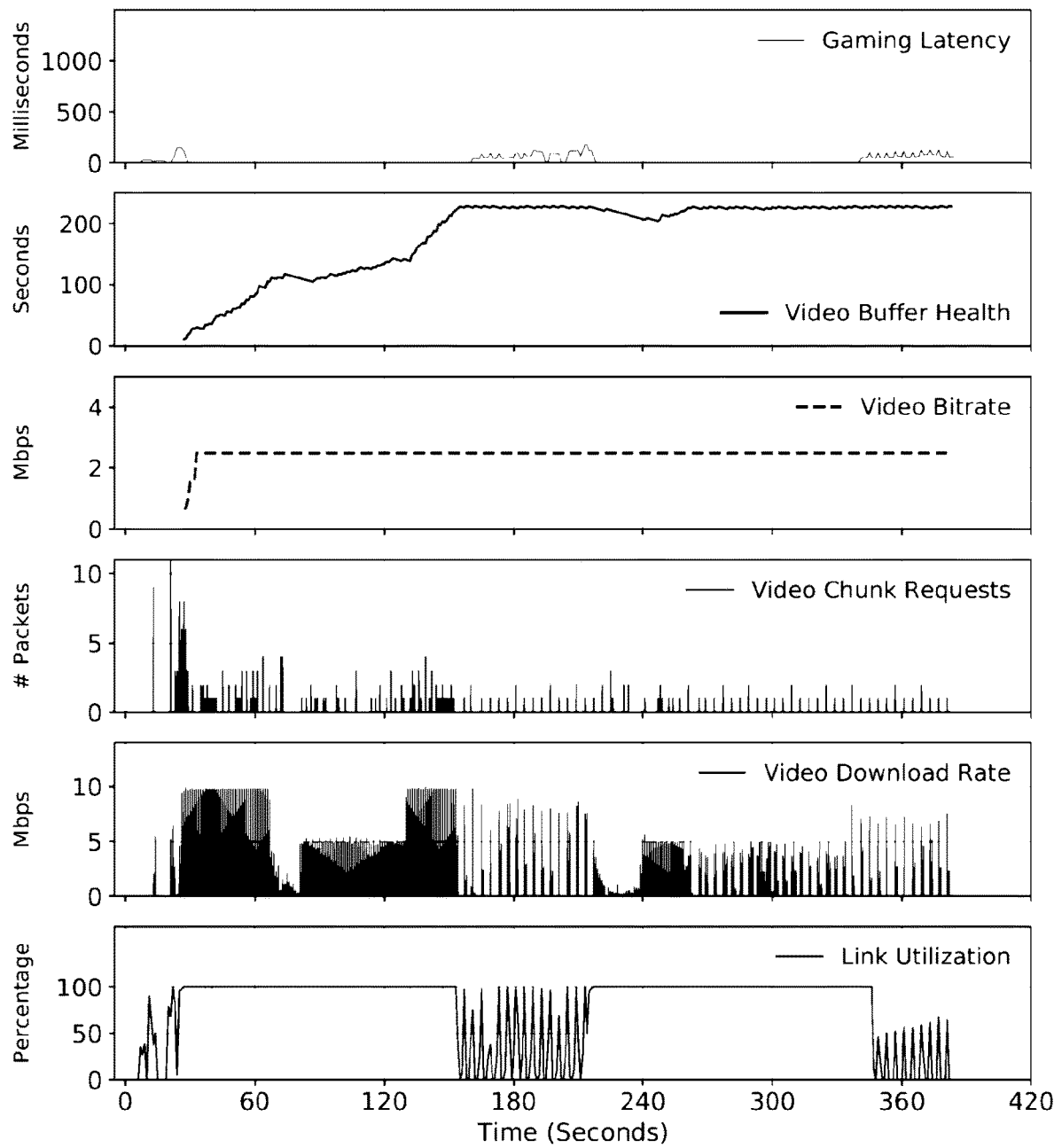

With these settings, a significant improvement in the experience of both sensitive applications was observed, as shown in FIG. 26. As described above, the scenario starts with only ping, where it reports a very low latency (i.e., <5 ms). Logging into Netflix at t=20 causes ping latency to go beyond 100 ms. First, the classifier finds the gaming application in the medium state (a transition from the good state) which results in a request for assistance. The actor 2110 elevates the ping experience by shifting its flow to queue C. Following this action, the ping latency immediately drops back to around 2 ms. Meanwhile, the video stream starts, and is detected to be in the buffer-increase state, given the large number of chunk requests. At t=70, when the UDP iperf traffic (i.e., download) is introduced, the buffer depletes, and no chunk requests are sent for a few seconds. The classifier 302 then detects the video state as buffer-depleting, which initiates an assist request. Within a few seconds, all flows corresponding to the video stream are pushed to queue B. Upon assisting the video, the buffer starts to rise again. Note that the buffer rises more slowly this time because the Netflix application is allocated about 4-5 Mbps due to the queue configuration. Nonetheless, this ensures that the video streaming application performs better without heavily throttling the download on the default queue. When the download stops, the buffer steeply rises until it enters the stable state. At this point, latency values go up to 100 ms. This happens due to a de-assist policy that pushes back the applications' traffic to the default queue when the link utilization falls below the 70% threshold (for video) and 40% threshold (for gaming), respectively.

At t=220, the iperf tool generates traffic again. As soon as the ping values go above 100 ms, the ping flow is assisted, and thus its performance is improved. Similarly, the video application is re-assisted because it is found in the buffer-depleting state. This time the video buffer fills up very quickly, taking the application back to its stable state. Note that the video stream is not de-assisted since the iperf traffic is still present (i.e., high link utilization), and the video download rate is capped at around 4-5 Mbps. Once the download traffic subsides (and thus the link utilization drops), both video stream and ping traffic are pushed back to the default queue A.

Many modifications will be apparent to those skilled in the art without departing from the scope of the present invention.

The invention claimed is:

1. A computer-implemented process for classifying video streams of an online streaming media service in real-time, the process being for use by a network operator, and including:
   processing packets of one or more network flows representing one or more video streams of the online service at a network location between a provider of the service and a user access network to generate flow activity data representing quantitative metrics of real-time network transport activity of each of the one or more network flows of the online service, the quantitative metrics including, for each said video stream, a corresponding time series of request packet counter values;
   applying a trained classifier to each said time series of request packet counter values to determine whether the request packet counter values for each said video stream are indicative of live video streaming; and
   in dependence upon the determination, to classify each of the one or more video streams as either a live video stream or as a video-on-demand stream.

2. The process of claim 1, including applying one or more further trained classifiers to the flow activity data to generate, for each video stream, corresponding user experience data representing real-time quality of experience of the video stream.

3. The process of claim 2, wherein, responsive to determining that the request packet counter values are indicative of a live video stream, the step of applying one or more further trained classifiers includes applying further classifiers to chunk features of the live video stream to generate corresponding user experience data representing real-time quality of experience of the live video stream.

4. The process of claim 2, wherein the user experience data represents a corresponding quality of experience state selected from a plurality of quality of experience states.

5. The process of claim 4, wherein the plurality of experience states include a maximum bitrate playback state, a varying bitrate playback state, a depleting buffer state, and a playback stall state.

6. The process of claim 1, wherein the user experience data represents one or more quantitative metrics of quality of experience.

7. The process of claim 6, wherein the online service is a streaming media service, and the one or more quantitative metrics of quality of experience include quantitative metrics of buffer fill time, bitrate and throughput.

8. The process of claim 6, wherein the one or more quantitative metrics of quality of experience include quantitative metrics of resolution and buffer depletion for live video streaming.

9. The process of claim 1, wherein the online service is a Twitch™, Facebook™ Live, or YouTube™ Live, live streaming service.

10. The process of claim 1, including, in dependence on the user experience data, automatically reconfiguring a networking component to improve quality of experience of the online service by prioritising one or more network flows of the online service over other network flows.

11. The process of claim 1, including training the classifier by processing packets of one or more training network flows of the online service to generate training flow activity data and chunk metadata (for videos) representing quantitative metrics of network transport activity of each of the one or more training network flows of the online service;
  generating corresponding training user experience data representing corresponding temporal quality of user experience of the online service; and applying machine learning to the generated training flow activity data and the generated training user experience data to generate a corresponding model for the classifier based on correlations between the quantitative metrics of network transport activity and the temporal quality of user experience of the online service.

12. Apparatus for classifying, in real-time, video streams of an online streaming media service, the apparatus being for use by a network operator, and including:
  a flow quantifier configured to process packets of one or more network flows representing one or more video streams of the online service at a network location between a provider of the service and a user access network to generate flow activity data representing quantitative metrics of real-time network transport activity of each of the one or more network flows of the online service, the quantitative metrics including, for each said video stream, a corresponding time series of request packet counter values for the online service; and
  a trained classifier configured to process each time series of request packet counter values to determine whether the request packet counter values are indicative of live video streaming, and, in dependence upon the determination, to classify each of the one or more video streams as either a live video stream or as a video-on-demand stream.

13. The apparatus of claim 12, including one or more further trained classifiers configured to process the flow activity data to generate, for each video stream, corresponding user experience data representing real-time quality of experience (QoE) of the video stream.

14. The apparatus of claim 13, wherein the one or more further trained classifiers are configured to process, in response to determining that the request packet counter values are indicative of a live video stream, chunk features of the live video stream to generate corresponding user experience data representing real-time quality of experience of the live video stream.

15. The apparatus of claim 13, wherein the user experience data represents a corresponding quality of experience state selected from a plurality of quality of experience states.

16. The apparatus of claim 15, wherein the plurality of experience states include a maximum bitrate playback state, a varying bitrate playback state, a depleting buffer state, and a playback stall state.

17. The apparatus of claim 13, wherein the user experience data represents one or more quantitative metrics of quality of experience.

18. The apparatus of claim 17, wherein the online service is a streaming media service, and the one or more quantitative metrics of quality of experience include quantitative metrics of buffer fill time, bitrate and throughput.

19. The apparatus of claim 17, wherein the online service provides live video streaming, and the one or more quantitative metrics of quality of experience include quantitative metrics of resolution and buffer depletion for live video streaming.

20. The apparatus of claim 12, wherein the online service is a Twitch™, Facebook™ Live, or YouTube™ Live, live streaming service.

21. The apparatus of claim 12, including a user experience controller configured to, in dependence on the user experience data, automatically reconfigure a networking component to improve quality of experience of the online service by prioritising one or more network flows of the online service over other network flows.

22. At least one computer-readable storage medium having stored thereon processor-executable instructions that, when executed by at least one processor, cause the at least one processor to execute the process of claim 1.

23. Apparatus for classifying, in real-time, video streams of an online streaming media service, the apparatus being for use by a network operator, and including a memory and at least one processor configured to execute the process of claim 1.

* * * * *